(12) United States Patent
Ohzuku et al.

(10) Patent No.: US 9,391,325 B2
(45) Date of Patent: *Jul. 12, 2016

(54) POSITIVE ELECTRODE ACTIVE MATERIAL, PRODUCTION METHOD THEREOF AND NON-AQUEOUS ELECTROLYTE SECONDARY BATTERY

(75) Inventors: Tsutomu Ohzuku, Nara (JP); Hiroshi Yoshizawa, Osaka (JP); Masatoshi Nagayama, Osaka (JP); Hizuru Koshina, Osaka (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 3268 days.

This patent is subject to a terminal disclaimer.

(21) Appl. No.: 11/431,919

(22) Filed: May 11, 2006

(65) Prior Publication Data
US 2006/0275664 A1 Dec. 7, 2006

Related U.S. Application Data

(63) Continuation-in-part of application No. 10/506,298, filed as application No. PCT/JP03/01997 on Feb. 24, 2003, now Pat. No. 7,541,114.

(30) Foreign Application Priority Data

Apr. 12, 2006 (JP) ................. 2006-109924

(51) Int. Cl.
*H01M 4/02* (2006.01)
*H01M 4/505* (2010.01)
(Continued)

(52) U.S. Cl.
CPC ............ *H01M 4/505* (2013.01); *C01G 23/005* (2013.01); *C01G 45/1242* (2013.01); *C01G 49/009* (2013.01); *C01G 51/54* (2013.01);
(Continued)

(58) Field of Classification Search
USPC ........................................................ 429/322
See application file for complete search history.

(56) References Cited

U.S. PATENT DOCUMENTS 4,702,977 A * 10/1987 Hiratsuka et al. .......... 429/218.1
5,079,109 A    1/1992 Takami et al.
(Continued)

FOREIGN PATENT DOCUMENTS

EP    0 744 780 A1    11/1996
EP    0 806 397 A1    11/1997
(Continued)

OTHER PUBLICATIONS

Chinese Office Action, w/ English translation thereof, issued in Chinese Patent Application No. CN 200710008195.4 dated Nov. 20, 2009.
(Continued)

*Primary Examiner* — Jacob Marks
(74) *Attorney, Agent, or Firm* — McDermott Will & Emery LLP

(57) ABSTRACT

In order to provide a 3V level non-aqueous electrolyte secondary battery with a flat voltage and excellent cycle life at a high rate with low cost, the present invention provides a positive electrode represented by the formula: $Li_{2\pm\alpha}[Me]_4O_{8-x}$, wherein $0\leq\alpha<0.4$, $0\leq x<2$, and Me is a transition metal containing Mn and at least one selected from the group consisting of Ni, Cr, Fe, Co and Cu, said active material exhibiting topotactic two-phase reactions during charge and discharge.

14 Claims, 25 Drawing Sheets

(51) Int. Cl.
*C01G 23/00* (2006.01)
*C01G 45/12* (2006.01)
*C01G 49/00* (2006.01)
*C01G 51/00* (2006.01)
*C01G 53/00* (2006.01)
*H01M 4/131* (2010.01)
*H01M 4/525* (2010.01)
*H01M 10/0525* (2010.01)
*H01M 2/16* (2006.01)
*H01M 4/1391* (2010.01)
*H01M 4/485* (2010.01)
*H01M 10/0569* (2010.01)
*H01M 10/42* (2006.01)

(52) U.S. Cl.
CPC .............. *C01G 53/54* (2013.01); *H01M 4/131* (2013.01); *H01M 4/525* (2013.01); *H01M 10/0525* (2013.01); *C01P 2002/52* (2013.01); *C01P 2002/72* (2013.01); *C01P 2002/76* (2013.01); *C01P 2002/77* (2013.01); *C01P 2002/82* (2013.01); *C01P 2002/88* (2013.01); *C01P 2004/03* (2013.01); *C01P 2004/62* (2013.01); *C01P 2006/40* (2013.01); *H01M 2/1653* (2013.01); *H01M 4/1391* (2013.01); *H01M 4/485* (2013.01); *H01M 10/0569* (2013.01); *H01M 2004/021* (2013.01); *H01M 2010/4292* (2013.01); *Y02E 60/122* (2013.01); *Y02P 70/54* (2015.11)

(56) References Cited

U.S. PATENT DOCUMENTS

| | | | |
|---|---|---|---|
| 5,264,201 A | 11/1993 | Dahn et al. | |
| 5,300,376 A | 4/1994 | Plichta et al. | |
| 5,370,948 A | 12/1994 | Hasegawa et al. | |
| 5,393,622 A | 2/1995 | Nitta et al. | |
| 5,506,077 A | 4/1996 | Koksbang | |
| 5,626,635 A | 5/1997 | Yamaura et al. | |
| 5,629,110 A | 5/1997 | Kobayashi et al. | |
| 5,631,104 A | 5/1997 | Zhong et al. | |
| 5,677,087 A | 10/1997 | Amine et al. | |
| 5,766,800 A * | 6/1998 | Manev et al. | 429/224 |
| 5,922,491 A | 7/1999 | Ikawa et al. | |
| 5,981,106 A | 11/1999 | Amine et al. | |
| 5,985,237 A | 11/1999 | Lu et al. | |
| 6,045,771 A | 4/2000 | Matsubara et al. | |
| 6,093,505 A | 7/2000 | Miura | |
| 6,159,637 A | 12/2000 | Shizuka et al. | |
| 6,168,887 B1 | 1/2001 | Dahn et al. | |
| 6,291,107 B1 | 9/2001 | Shimizu et al. | |
| 6,325,988 B1 | 12/2001 | Inoue et al. | |
| 6,352,794 B1 | 3/2002 | Nakanishi et al. | |
| 6,436,577 B1 | 8/2002 | Kida et al. | |
| 6,482,550 B1 | 11/2002 | Imachi et al. | |
| 6,492,064 B1 * | 12/2002 | Smart et al. | 429/330 |
| 6,551,744 B1 | 4/2003 | Ohzuku et al. | |
| 6,582,854 B1 | 6/2003 | Qi et al. | |
| 6,627,353 B1 * | 9/2003 | Munshi | 429/231.95 |
| 6,660,432 B2 | 12/2003 | Paulsen et al. | |
| 6,808,848 B2 | 10/2004 | Nakanishi et al. | |
| 7,078,128 B2 | 7/2006 | Lu et al. | |
| 7,541,114 B2 * | 6/2009 | Ohzuku et al. | 429/322 |
| 2002/0045091 A1 * | 4/2002 | Kamei et al. | 429/62 |
| 2002/0055045 A1 * | 5/2002 | Michot et al. | 429/307 |
| 2002/0076580 A1 * | 6/2002 | Tudron | 429/1 |
| 2002/0081485 A1 * | 6/2002 | Takekawa et al. | 429/60 |
| 2002/0187398 A1 * | 12/2002 | Mikhaylik et al. | 429/234 |
| 2002/0192148 A1 * | 12/2002 | Kweon et al. | 423/594 |
| 2002/0197533 A1 | 12/2002 | Gao et al. | |
| 2003/0054251 A1 | 3/2003 | Ohzuku et al. | |
| 2003/0082448 A1 | 5/2003 | Cho et al. | |
| 2003/0082452 A1 | 5/2003 | Ueda et al. | |
| 2003/0082453 A1 * | 5/2003 | Numata et al. | 429/231.95 |
| 2003/0087154 A1 | 5/2003 | Ohzuku et al. | |
| 2003/0170540 A1 | 9/2003 | Ohzuku et al. | |
| 2003/0207176 A1 | 11/2003 | Yoon et al. | |
| 2004/0058243 A1 | 3/2004 | Ohzuku et al. | |
| 2004/0072072 A1 | 4/2004 | Suzuki et al. | |
| 2004/0126660 A1 | 7/2004 | Ohzuku et al. | |
| 2005/0079416 A1 | 4/2005 | Ohzuku et al. | |
| 2005/0147889 A1 | 7/2005 | Ohzuku et al. | |
| 2005/0260496 A1 | 11/2005 | Ueda et al. | |
| 2006/0204847 A1 | 9/2006 | Ohzuku et al. | |
| 2007/0009424 A1 | 1/2007 | Ohzuku et al. | |

FOREIGN PATENT DOCUMENTS

| | | |
|---|---|---|
| EP | 0 989 622 A1 | 3/2000 |
| EP | 1 295 851 A1 | 3/2003 |
| EP | 1 309 022 A2 | 5/2003 |
| JP | 3244314 | 10/1991 |
| JP | 05-283076 | 10/1993 |
| JP | 08-171910 | 12/1994 |
| JP | 07-085878 | 3/1995 |
| JP | 07-320784 | 12/1995 |
| JP | 07-335261 | 12/1995 |
| JP | 08-138670 | 5/1996 |
| JP | 08-171910 | 7/1996 |
| JP | 8-298115 | 11/1996 |
| JP | 09-045326 | 2/1997 |
| JP | 9-69362 | 3/1997 |
| JP | 09-92285 | 4/1997 |
| JP | 09-129230 | 5/1997 |
| JP | 09-129230 A | 5/1997 |
| JP | 09-147867 | 6/1997 |
| JP | 09-199127 | 7/1997 |
| JP | 09-231973 | 9/1997 |
| JP | 10-3921 | 1/1998 |
| JP | 10-027609 | 1/1998 |
| JP | 10-027626 | 1/1998 |
| JP | 10-027627 | 1/1998 |
| JP | 10-69910 | 3/1998 |
| JP | 10-81521 | 3/1998 |
| JP | 10-199525 | 7/1998 |
| JP | 10-316431 | 12/1998 |
| JP | 11-1323 A | 1/1999 |
| JP | 11-025980 | 1/1999 |
| JP | 11-60243 | 3/1999 |
| JP | 11-060246 | 3/1999 |
| JP | 11-072544 | 3/1999 |
| JP | 11-073962 | 3/1999 |
| JP | 11-167919 | 6/1999 |
| JP | 11-292547 | 10/1999 |
| JP | 11-312522 | 11/1999 |
| JP | 11-321951 | 11/1999 |
| JP | 11-339802 | 12/1999 |
| JP | 2000-082466 | 3/2000 |
| JP | 2000-113872 | 4/2000 |
| JP | 2000-133262 | 5/2000 |
| JP | 2000-149923 | 5/2000 |
| JP | 2000-340230 | 12/2000 |
| JP | 2000-348725 | 12/2000 |
| JP | 2001-185145 | 7/2001 |
| JP | 2001-185153 | 7/2001 |
| JP | P2001-195353 A | 7/2001 |
| JP | 2001-210324 | 8/2001 |
| JP | 2001-243952 | 9/2001 |
| JP | 2002-042889 | 2/2002 |
| JP | 2002-63900 | 2/2002 |
| JP | P2002-42813 A | 2/2002 |
| JP | 2002-208441 | 7/2002 |
| JP | 2002-338250 | 11/2002 |
| JP | 2003-137555 | 5/2003 |
| JP | 2003-238165 | 8/2003 |
| KR | 10-2001-0081180 | 8/2001 |
| KR | 2000-0017619 | 3/2003 |
| WO | WO 98/50308 | 11/1998 |
| WO | WO 98/57386 | 12/1998 |

(56) References Cited

FOREIGN PATENT DOCUMENTS

WO     WO 02/40404 A1     5/2002
WO     WO 03/075376 A1     12/2003

OTHER PUBLICATIONS

European Search Report issued in European Patent Application No. EP 03707026.5 dated Nov. 14, 2008.
Dong, Dianquan et al., "Synthesis of $LiCu_{0.5}Mn_{1.5}O_4$ and its Li+ extraction/insertion reaction in aqueous solution," Database CA [online] Chemical Abstracts Service; XP-002502577.
Ohzuku, Tsutomu et al., "Electrochemistry of Manganese Dioxide in Lithium Nonaqueous Cell," Journal of the Electrochemistry Society, vol. 137, No. 3, 1990, pp. 769-775, XP-002502572.
Shigemura, H. et al., "Structure and Electrochemical Properties of $LiFe_xMn_{2-x}O_4$ ($0 \leq x \leq 0.5$) Spinal as 5 V Electrode Material for Lithium Batteries," Journal of the Electrochemistry Society, vol. 148, No. 7, 2001, pp. A730-A736, XP-002502573.
Sigala, C. et al., "Positive electrode materials with high operating voltage for lithium batteries: $LiCr_yMn_{2-y}O_4$ ($0 \leq y \leq 1$)," Solid State Ionics, vol. 81, No. 3-4, 1995, pp. 167-170, XP-002502574.
Ohzuku, Tsutomu et al., "Synthesis and Characterization of $Li[Ni_{1/2}Mn_{3/2}]O_4$ by Twp-Step Solid State Reaction," Journal of the Ceramic Society of Japan, vol. 110, No. 5, May 1, 2002, pp. 501-505, XP-002502575.
Kanamura, Kiyoshi et al., "Electrochemical Characteristics of $LiNi_{0.5}Mn_{1.5}O_4$ Cathodes with Ti or Al Current Collectors," Journal of the Electrochemical Society, vol. 149, No. 3, 2002, pp. A339-A345, XP-002502576.
Ariyoshi, Kingo et al., "Topotactic Two-Phase Reactions of $Li[Ni_{1/2}Mn_{3/2}]O_4$ (P4₃32) in Nonaqueous Lithium Cells," Journal of the Electrochemistry Society, vol. 151, No. 2, 2004, pp. A296-A303, XP-002502626.
United States Office Action issued in U.S. Appl. No. 10/506,298, mailed Jan. 9, 2009.
Amine, K., et al., "A New Three-Volt Spinel $Li_{1+x}Mn_{1.6}Ni_{0.5}O_4$ for Secondary Lithium Batteries", J. Electrochem. Soc., May 1996, pp. 1607-1613, vol. 143, No. 5, The Electrochemical Society, Inc.
Taiwanese Office Action with written opinion dated on Feb. 21, 2008.
U.S. Office Action issued in corresponding U.S. Appl. No. 10/250,647, mailed on Mar. 26, 2007.
Rossen, E., et al., "Structure and electrochemistry of $Li_xMn_xNi_{1-y}O_2$", Solid State Ionics, Apr. 6, 1992, pp. 311-318, vol. 57, Elsevier Science Publishers B.V., North Holland.
"Solid-State Redox Reactions of $LiNi_{1/2}Co_{1/2}O_2$ (R3m) for 4 Volt Secondary Lithium Cells", Ueda et al., J. Electrochem. Soc., vol. 141, No. 8, Aug. 1994 © The Electrochemical Society, Inc. pp. 2011-2014.
Cho, T. et al., "Preparation of Layered $Li[Ni_{1/3}Mn_{1/3}Co_{1/3}]O_2$ as a Cathode for Lithium Secondary Battery by Carbonate Coprecipitation Method," Chemistry Letters, Feb. 24, 2004, p. 704-705, vol. 33 No. 6, The Chemical Society of Japan, Japan.
Ohzuku, T. et al., "Comparative Study of $LiCoO_2$, $LiNi_{1/2}Co_{1/2}O_2$ and $LiNiO_2$ for 4 Volt Secondary Lithium Cells," The Journal of The International Society of Electrochemistry, Jun. 1993, p. 1159-1167, vol. 38 No. 9, Pergamon Press.
Ohzuku, T. et al., "Why transition metal (di) oxides are the most attractive materials for batteries," Solid State Ionics, Aug. 1994, p. 202-211, vol. 69 No. 3,4, North-Holland, The Netherlands.
Ohzuku, T. et al., "Solid State Electrochemistry of Intercalation Compound of $LiAl_{1/2}Ni_{1/2}O_2$(R3m) for Lithium-Ion Batteries," Electrochemistry of Intercalation, (1998), p. 1209-1214, Volume No. 12, The Electrochemical Society of Japan, Japan.
Ohzuku, T. et al., "Synthesis and Characterization of $LiNiO_2$ (R3m) for Rechargeable Nonaqueous Cells," Chemistry Express, vol. 6, No. 3, Mar. 1991, pp. 161-164, Kinki Chemical Society, Japan.
Ohzuku, T. et al., "New Route to Prepare $LiNiO_2$ for 4-Volts Secondary Lithium Cells," Chemistry Express, vol. 7, No. 9, pp. 689-692, 1992, Kinki Chemical Society, Japan.
Ohzuku, T. et al., "Synthesis and Characterization of $LiAl_{1/4}Ni_{3/4}O_2$ (R3m) for Lithium-Ion (Shuttlecock) Batteries,"Journal of the Electrochemical Society, Dec. 1995, p. 4033-4039, vol. 142 No. 12, The Electorchemical Society, Inc.
Observations of a third party submitted to Japanese Patent Application No. 2000-227858 corresponding to U.S. Pat. No. 6,551,744.
Observations of a third party submitted to Japanese patent application No. 2002-303294 corresponding to U.S. Appl. No. 10/277,989.
Yoshio, M. et al., "Preparation and properties of $LiCo_yMn_xNi_{1-x-y}O_2$ as a chathode for lithium ion batteries," Journal of Power Sources, Aug. 17, 1998, p. 176-181, vol. 90, Elsevier.
Lu, Z. et al., "Layered $Li[Ni_xCo_{1-2x}Mn_x]O_2$ Cathode Materials for Lithium-Ion Batteries," Electrochemical and Solid-State Letters, Jun. 4, 2001, p. A200-A203, vol. 12, The Electrochemical Society, Inc.
Terada, Y. et al., "In Situ XAFS Analysis of $Li(Mn, M)_2 O_4$(M=Cr, Co, Ni) 5V Cathode Materials for Lithium-Ion Secondary Batteries," Journal of Solid State Chemistry, Feb. 2001, p. 286-291, vol. 156 Issue 2, Academic Press.
Lu, Z. et al., Layered Cathode Materials $Li[Ni_xLi_{(1/3-2x/3)}Mn_{(2/3-x/3)}]O_2$ for Lithium-Ion Batteries, Electrochemical and Solid-State Letters, 4(11) A191-194, 2000, The Electrochemical Society, Inc.
Park, H. et al., "Relationship between Chemical Bonding Character and Electrochemical Performance in Nickel-Substituted Lithium Manganese Oxides," J. Phys. Chem., May 3, 2001, p. 4860-4866, vol. 105, American Chemical Society.
Neudecker, B.J. et al., "Lithium Manganese Nickel Oxides $Li_x(Mn_yNi_{1-y})_{2-x}O_2$," J. Electrochem. Soc., Dec. 1998, p. 4148-1459, vol. 145, No. 12, The Electrochemical Society, Inc.
Korean Office Action issued in Korean Patent Application No. 10-2006-0100852, dated Jan. 17, 2007.
Japanese Office Action issued in Japanese Patent Application No. 2003-281871, dated Feb. 1, 2007.
Lu et al., "Superlattice Ordering of Mn, Ni, and Co in Layered Alkali Transition Metal Oxides with P2, P3, and O3 Structures," Chem. Mater, p. 3583-3590, vol. 12, American Chemical Society.
Abraham, et al., "Surface changes on $LiNi_{0.8}Co_{0.2}O_2$ particles during testing of high power lithium-ion cells," Electrochemistry Communications, May 2002, p. 620-625, vol. 4, Elsevier.
Japanese Office Action issued in Japanese Patent Application No. 2002-303294, dated Mar. 1, 2007.
West et al., "Introduction for Solid-State Chemistry," Kodansha-Scientific, Mar. 20, 1996, with partial translation.
Yoshio et al., "Lithium-ion Secondary Battery," Nikkan Kogyo Shinbunsha, Mar. 29, 1996, with partial translation.
Saka, K, "Study of Crystal Electron microscope for researchers of material study," Uchida Rokakuho, Nov. 25, 1997, with partial translation.
Japanese Society of Microscopy, Kanto Division, "Technique of Electron microscope technique for advanced material evaluation," Asakura-shoten, Dec. 15, 1991, with partial translation.
Kato, M., "Analysis of X-ray diffraction analysis," Uchida Rokakuho, Apr. 20, 1990, with partial translation.
Rossen, E., et al., "Structure and Electrochemsitry of $Li_xMn_yNi_{1-y}O_2$", Solid State Ionics, 1992, p. 311-318, vol. 57, Elsevier Science Publishers B.V.
Korean Office Action, with English translation, issued in Korean Patent Application No. KR 10-2007-0016724 dated May 9, 2008.
Japanese Office Action issued in Patent Application No. 2002-129134 dated on Jun. 12, 2008.
Chinese Office Action, with an English Translation, Issued in Patent Application No. 2007100081954 dated on Jun. 6, 2008.
United States Office Action issued in U.S. Appl. No. 10/250,647 dated on Sep. 15, 2008.
Ohzuku, Tsutomu., et al. "A 3-Volt Lithium-Ion Cell with $Li[Ni_{1/2}Mn_{3/2}]O_4$ and $Li[Li_{1/3}Ti_{5/3}]O_4$: A method to Prepare Stable Positive-Electrode Material of Highly Crystallized $Li[Ni_{1/2}Mn_{3/2}]O_4$" Chemistry Letters 2001, pp. 1270-1271.
Ohzuku, Tsutomu., et al. "Solid-State redox potentials for $Li[Me_{1/2}Mn_{3/2}]O_4$ (Me: 3d-transition metal) having spinel-framework structures: a series of 5 volt materials for advanced lithium-ion batteries." Journal of Power Sources pp. 90-94.

(56) References Cited

OTHER PUBLICATIONS

Besenhard, J. O., ed., "Handbook of battery materials" © Wiley-VCH, 1999.

Wu, X., et al. "Improvement of electrochemical properties of $LiNi_{0.5}Mn_{1.5}O_4$ spinel" Department of Chemistry, Pohang University of Science and Technology, accepted Jan. 10, 2002.

Wang, G. X. et al., "Spinel $Li[Li_{1/3}Ti_{5/3}]O_4$ as an anode material for lithium ion batteries" Energy Storage Materials Program, Institute for Superconducting and Electronic Materials, University of Wollongong, accepted Apr. 27, 1999.

Qiming Zhong et al.; "Synthesis and Electrochemistry of $LiNi_xMn_{2-x}O_4$", *J. Electrochem. Soc./The Electrochemical Society. Inc.*; c.Jan. 1997; vol. 144, No. 1.

\* cited by examiner

FIG. 4
(a)
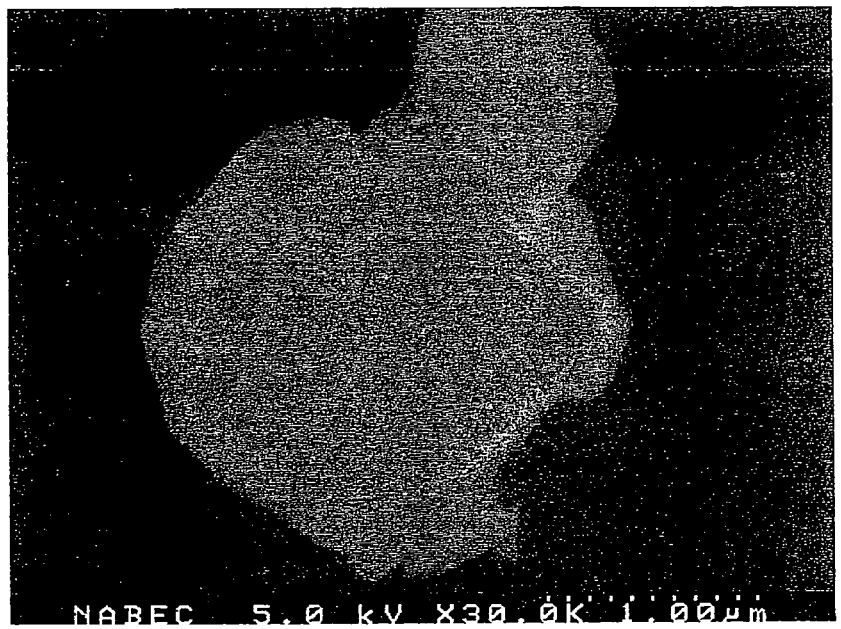
×30K
(b)
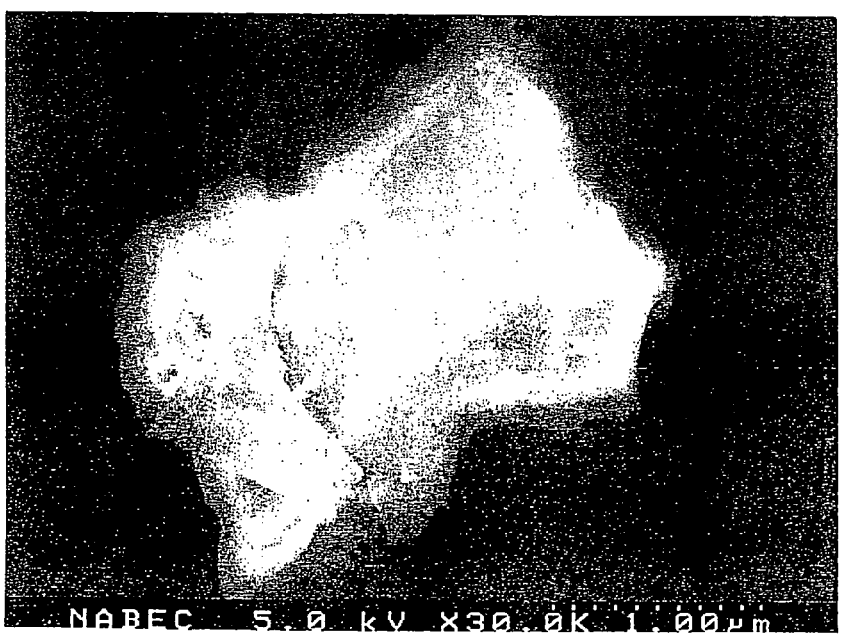
×30K

×10K

×10K

FIG. 7
(a)
×10K
(b)
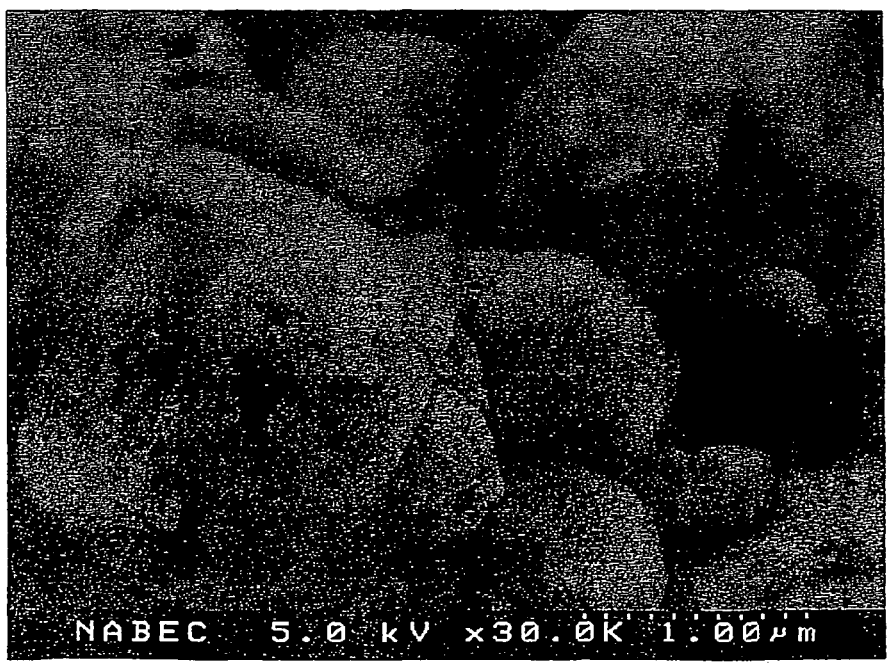
×30K

FIG. 8
(a)
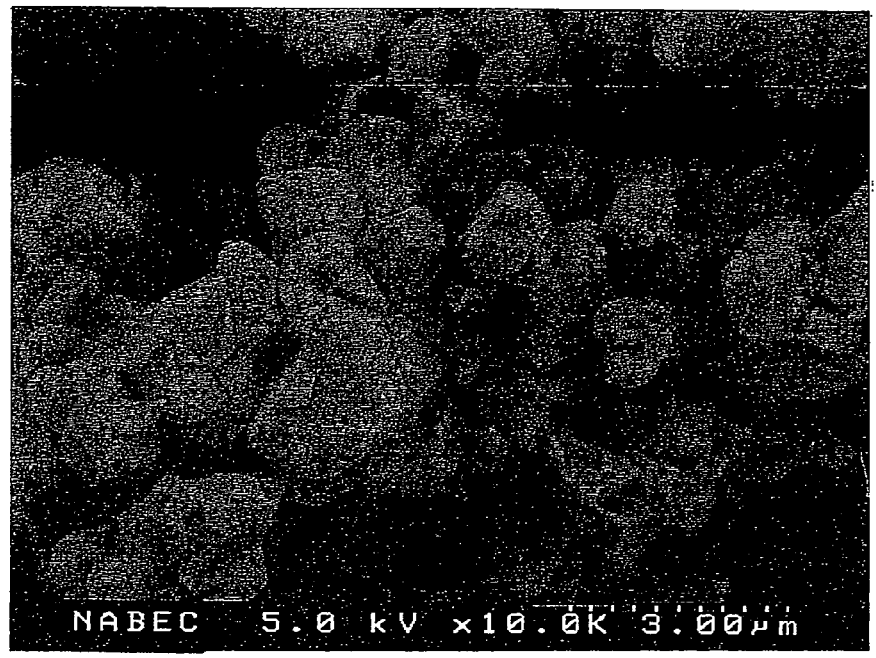
×10K
(b)
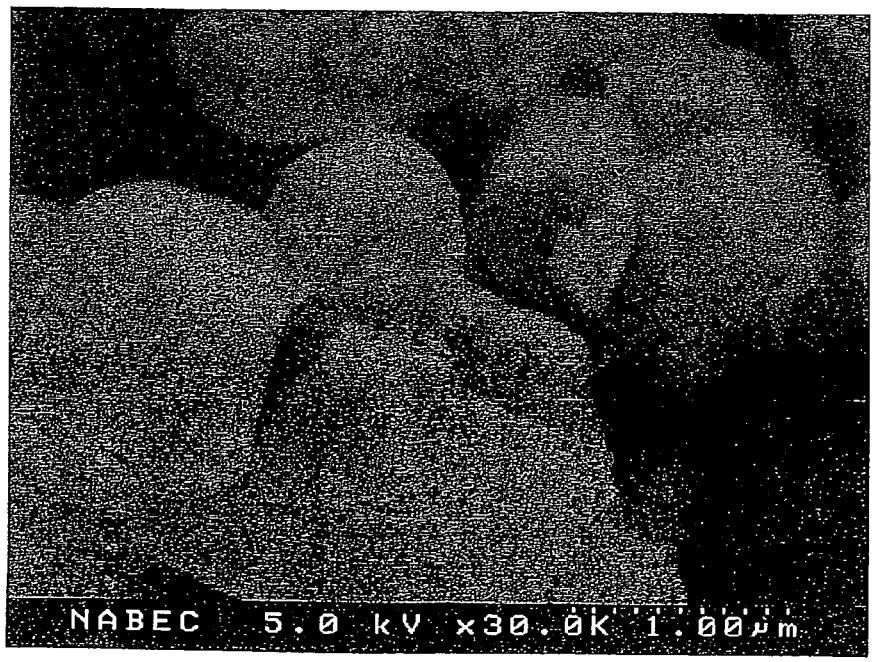
×30K

F I G. 1 4
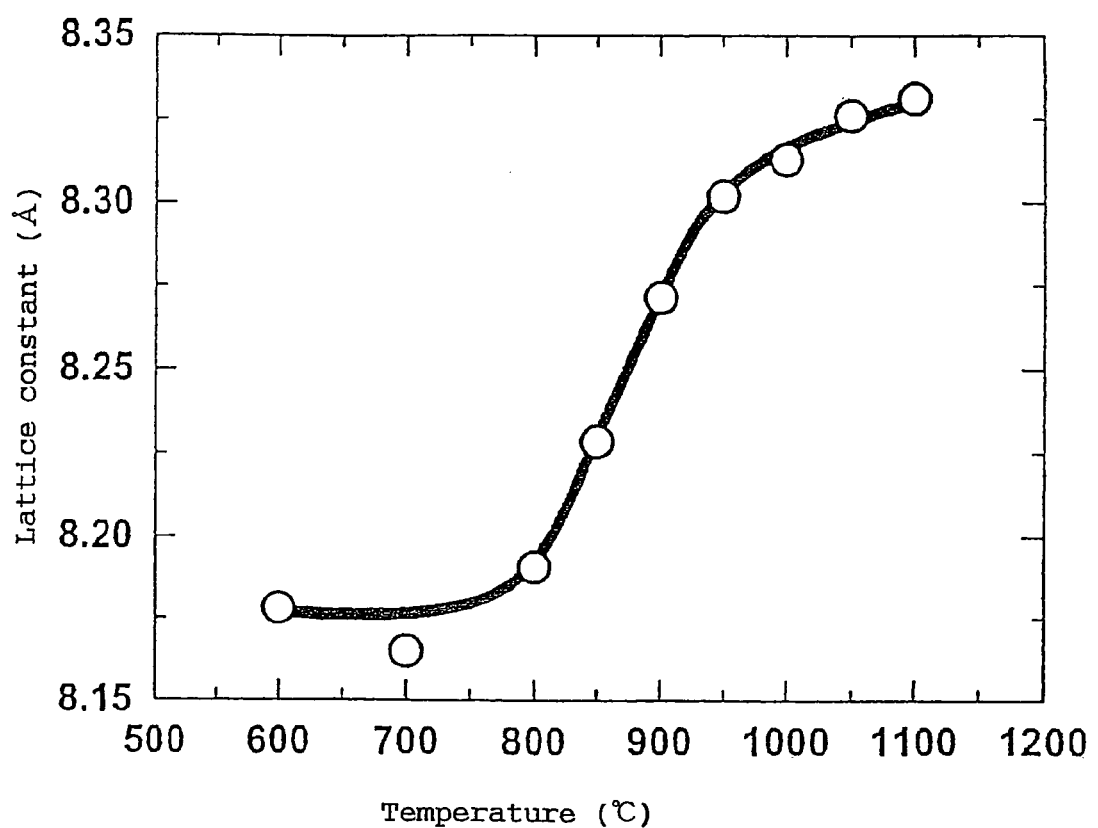

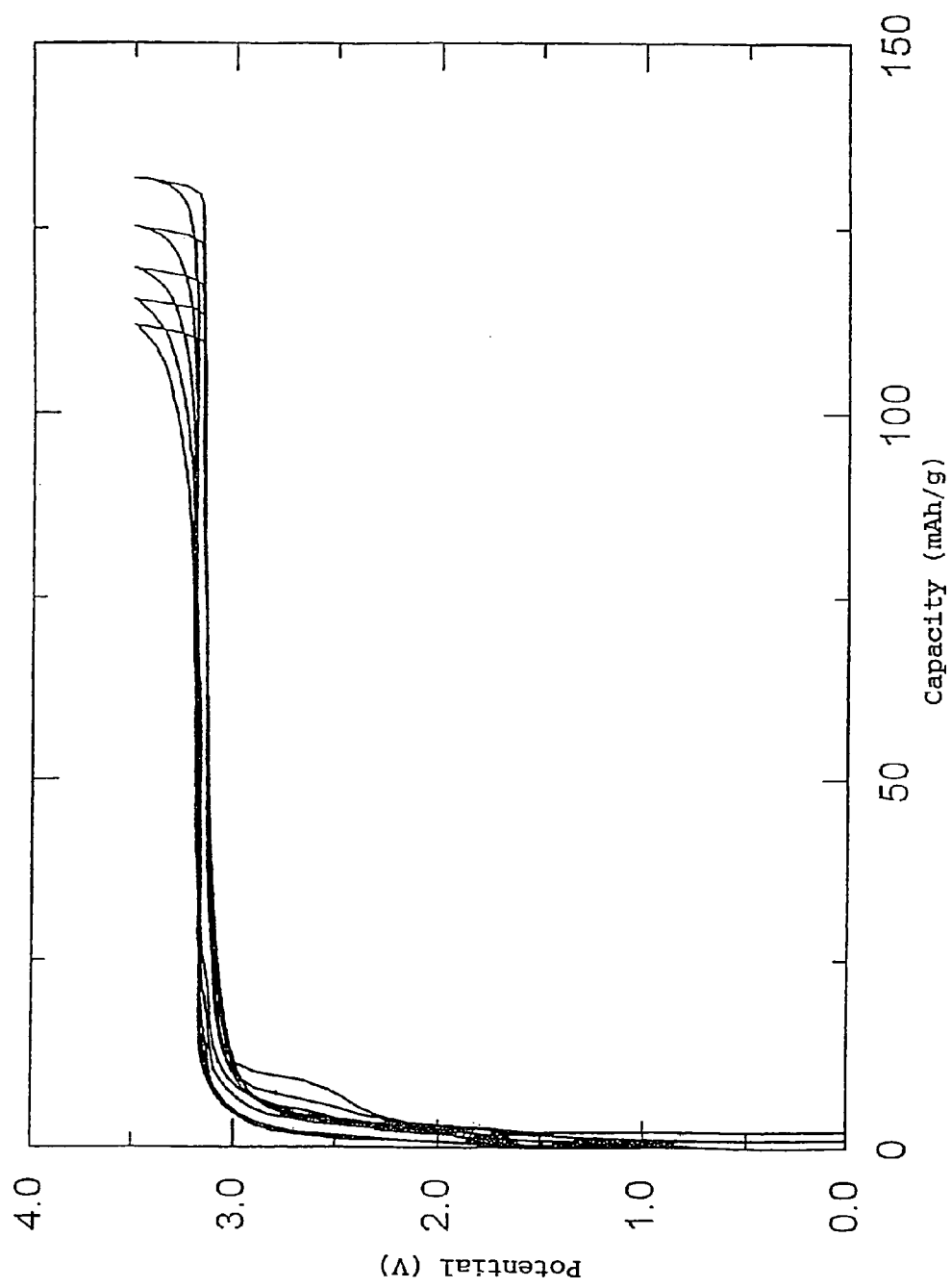

F I G. 1 8
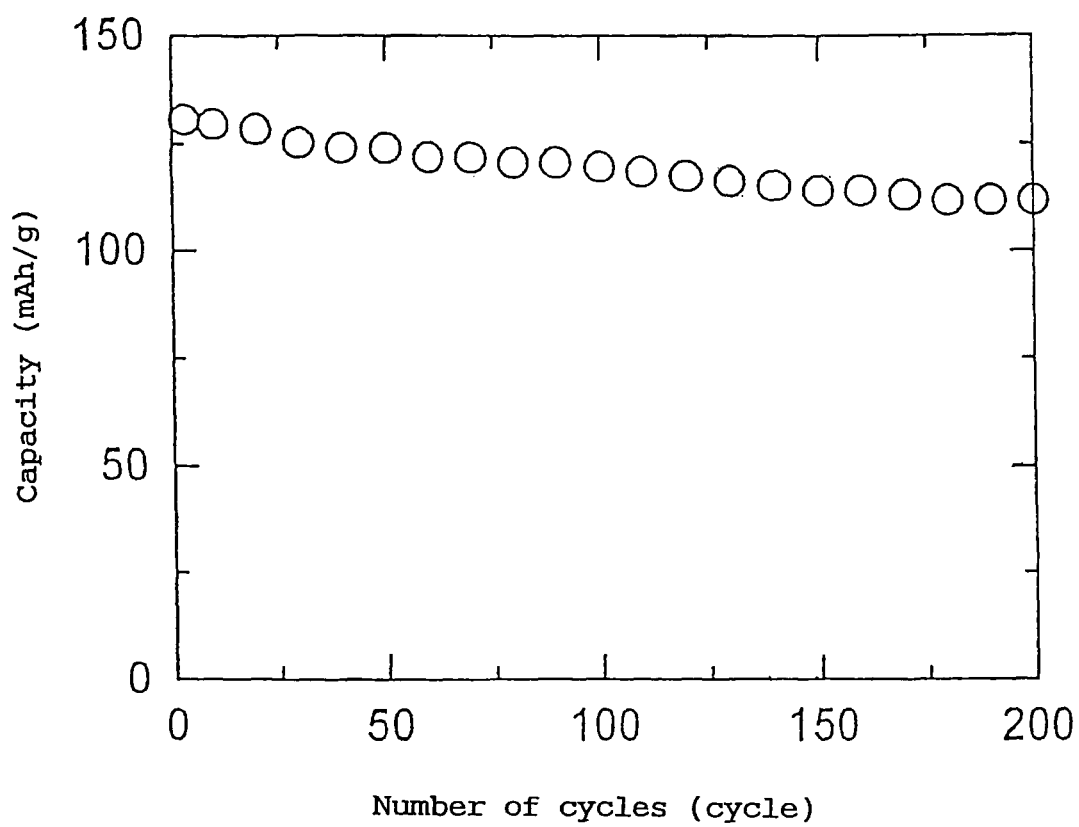

POSITIVE ELECTRODE ACTIVE MATERIAL, PRODUCTION METHOD THEREOF AND NON-AQUEOUS ELECTROLYTE SECONDARY BATTERY

CROSS-REFERENCE TO RELATED APPLICATIONS

This application is a continuation-in-part of application Ser. No. 10/506,298, which is the U.S. National Phase under 35 U.S.C. §371 of International Application No. PCT/JP03/01997 filed on Feb. 24, 2003.

BACKGROUND OF TNE INVENTION

The present invention relates to a positive electrode active material and a non-aqueous electrolyte secondary battery using the same.

Non-aqueous electrolyte secondary batteries used as power sources for mobile communication devices and portable electronic devices in recent years are characterized by high potential force and high energy density. Examples of positive electrode active materials used for non-aqueous electrolyte secondary batteries include lithium cobalt oxide ($LiCoO_2$), lithium nickel oxide ($LiNiO_2$), manganese spinel ($LiMn_2O_4$), etc. These active materials have a voltage of not less than 4 V relative to that of lithium. On the other hand, a carbon material is usually used in the negative electrode, which is combined with the above-mentioned positive electrode active material to give a 4V level lithium ion battery.

The need has been increasing for batteries not only with high energy density, but also with improved high rate characteristics and improved pulse characteristics. Charging/discharging at a high rate imposes an increased load on the active material, making it difficult to maintain the cycle life by conventional techniques.

Some devices require batteries that have such high rate discharge performance and yet exhibit a flat battery voltage in the charge/discharge curves. Batteries with a positive electrode active material having a layered structure such as lithium cobalt oxide ($LiCoO_2$) or lithium nickel oxide ($LiNiO_2$) usually exhibit relatively flat S-shaped charge/discharge curves. Accordingly, it is difficult to maintain a flat charge/discharge voltage during high rate charging/discharging. Since the positive electrode active material repeatedly expands and contracts to a great degree in the layer direction during charging/discharging, the stress resulting therefrom reduces the cycle life particularly at the time of high rate charging/discharging.

The positive electrode active materials are recognized to have relatively flat-shaped charge/discharge curves. However, from the viewpoint of determination of the remaining capacity, they are considered as not suitable for determining the remaining capacity because accurate analysis in a narrow potential range is necessary. Particularly, when lithium is intercalated into the negative electrode during charging, the potential of the negative electrode rapidly drops to about 0.1 V and, after that, the negative electrode absorbs lithium at a given potential. As for the positive electrode active materials, since $LiMn_2O_4$ having a spinel structure in particular exhibits flatter charge and discharge curves than lithium cobalt oxide ($LiCoO_2$) and lithium nickel oxide ($LiNiO_2$) both having a layered structure, $LiMn_2O_4$ is considered as not suitable for determining the remaining capacity.

In order to determine the remaining capacity of a non-aqueous electrolyte secondary battery, usually, current and time other than voltage are detected and a calculation is then made in an integrated circuit based on the above information to yield the remaining capacity of a battery, which is typified by, for example, the method of Japanese Laid-Open Patent Publication No. Hei 11-072544.

In order to monitor the completion of charging, Japanese Laid-Open Patent Publication No. 2000-348725 proposes to use $LiMn_2O_4$ as a positive electrode active material and $Li_4Ti_5O_{12}$ and natural graphite as negative electrode active materials. This technique enables the monitoring of the completion of charging by creating a potential difference in the potential of the negative electrode. The reference discloses a negative electrode comprising $Li_4Ti_5O_{12}$ whose potential persists at 1.5 V and natural graphite whose potential persists at 0.1 V.

Now, the following describes a conventionally proposed battery system comprising a positive electrode containing a conventional positive electrode active material having a spinel structure and a negative electrode containing a lithium-containing titanium oxide having a spinel skeleton.

For example, Japanese Laid-Open Patent Publication No. Hei 11-321951 proposes a positive electrode active material represented by the formula: $Li_{(1+x)}Mn_{(2-x-y)}M_yO_z$, where $0 \leq x \leq 0.2$, $0.2 \leq y \leq 0.6$, $3.94 \leq z \leq 4.06$, and M is nickel or a compound composed of nickel as an essential component and at least one selected from aluminum and transition elements, and a method for synthesizing the positive electrode active material without an impurity of NiO. To be specific, a mixture comprising a manganese compound and a metal M compound is baked at 900 to 1100° C., and the mixture is baked again with a lithium compound.

This method, however, involves a reaction between manganese and a metal M, that is, a reaction between solids. Accordingly, it is difficult that the above two is incorporated uniformly. In addition, since the baking is performed at a high temperature of not less than 900° C., reactivity with lithium is reduced after the baking, making it difficult to obtain the desired positive electrode active material.

Japanese Laid-Open Patent Publication No. Hei 9-147867 discloses a positive electrode active material comprising an intercalation compound having a spinel crystal structure and being represented by the general formula: $Li_{x+y}M_zMn_{2-y-z}O_4$ where M represents a transition metal, $0 \leq x < 1$, $0 \leq y < 0.33$, and $0 < z < 1$. The disclosed positive electrode active material is capable of charging/discharging at a potential of not less than 4.5 V relative to that of $Li/Li^+$.

Japanese Laid-Open Patent Publication No. Hei 7-320784 discloses a battery comprising a positive electrode containing $Li_2MnO_3$ or $LiMnO_2$ as an active material and a negative electrode containing lithium-intercalated $Li_{4/3}Ti_{5/3}O_4$ or $LiTi_2O_4$ as an active material. Japanese Laid-Open Patent Publication No. Hei 7-335261 discloses a battery comprising a positive electrode containing a lithium cobalt oxide ($LiCoO_2$) and a negative electrode containing a lithium titanium oxide ($Li_{4/3}Ti_{5/3}O_4$). Further, Japanese Laid-Open Patent Publication No. Hei 10-27609 discloses a battery comprising: a negative electrode containing, as an active material, lithium, a lithium metal, or a lithium-titanium oxide with a spinel-type structure; a positive electrode containing, as an active material, a lithium-manganese oxide with a spinel-type structure ($Li_{4/3}Mn_{5/3}O_4$); and an electrolyte comprising LiN($CF_3SO_2)_2$ as a solute and a solvent mixture of not less than two components including ethylene carbonate.

Japanese Laid-Open Patent Publication No. Hei 10-27626 discloses to use a lithium-containing transition metal oxide ($LiA_xB_{1-x}O_2$) as a positive electrode active material and a lithium-titanium oxide ($Li_{4/3}Ti_{5/3}O_4$) as a negative electrode active material, and to set the actual content ratio of the negative electrode active material to the positive electrode active material to be not greater than 0.5. Japanese Laid-Open Patent Publication No. Hei 10-27627 discloses to use a lithium-manganese oxide ($Li_{4/3}Mn_{5/3}O_4$) as a positive electrode active material, and a lithium-titanium oxide ($Li_{4/3}Ti_{5/3}O_4$) and lithium in the negative electrode, and to set the molar ratio of the lithium-titanium oxide to the lithium-manganese oxide to be not greater than 1.0, and the molar ratio of the lithium to the lithium-titanium oxide to be not greater than 1.5.

Furthermore, Japanese Laid-Open Patent Publication No. 2001-243952 discloses a lithium secondary battery comprising: a positive electrode containing a positive electrode active material represented by the formula: $Li_{1-x}A_xNi_{1-y}M_yO_2$, where A is one or more selected from alkali metals except Li and alkali earth metals, M is one or more selected from Co, Mn, Al, Cr, Fe, V, Ti and Ga, $0 \leq x \leq 0.2$, and $0.05 \leq y \leq 0.5$, and comprising secondary particles formed by the aggregation of primary particles with a mean particle size of not less than 0.5 µm; and a negative electrode containing, as a negative electrode active material, a lithium-titanium composite oxide represented by the formula: $Li_aTi_bO_4$, where $0.5 \leq a \leq 3$, and $1 \leq b \leq 2.5$.

Still furthermore, Japanese Laid-Open Patent Publication No. 2001-210324 discloses a battery comprising: a positive electrode containing, as a positive electrode active material, a lithium-manganese composite oxide represented by the composition formula: $Li_{1+x}M_yMn_{2-x-y}O_{4-z}$, where M is one or more selected from Ti, V, Cr, Fe, Co Ni, Zn, Cu, W, Mg and Al, $0 \leq x \leq 0.2$, $0 \leq y < 0.5$, and $0 \leq z < 0.2$, having a half peak width of the (400) peak of not less than 0.02 θ and not greater than 0.1 θ (θ is an angle of diffraction) obtained from a powdered X-ray diffraction using CuKα radiation, and whose primary particles are octahedron in shape; and a negative electrode containing, as a negative electrode active material, a lithium-titanium composite oxide represented by the composition formula: $Li_aTi_bO_4$, where $0.5 \leq a \leq 3.1$, and $1 \leq b \leq 2.5$.

Some of the conventional techniques, however, cannot completely solve the above-mentioned problems such as improving high rate characteristics and pulse characteristics. For example, charging/discharging at a high rate imposes an increased load on the active material to cause structural damage, thus making it difficult to maintain the cycle life. In addition, since a lithium cobalt oxide and a graphite material, both having a layered structure, repeatedly expand and contract to a great degree in the layer direction during charging/discharging, a stress is given to the active material and an electrolyte exudes from between electrodes, thus reducing the cycle life particularly at the time of high rate charging/discharging. Accordingly, in order to extend the cycle life of such batteries, it is important to prevent the expansion and contraction of the active material.

Batteries used as power sources for electronic devices preferably exhibit a flat-shaped discharge curve, and are required to exhibit a flat voltage even during such high rate discharging. However, batteries currently in practical use exhibit either an S-shaped discharge curve in which the voltage gradually decreases, or a flat discharge curve in which the battery voltage suddenly decreases at the end of charging. The former has the problem that it should have a flatter voltage although it is not difficult to monitor the remaining capacity thereof. In the case of the latter, on the other hand, the voltage difference is extremely small until the end of discharging, so that it is very difficult to monitor the remaining capacity of the battery. Accordingly, obtaining a battery whose remaining capacity can be moderately monitored remains one of the problems.

Meanwhile, demand is also increasing for large batteries such as an assembled battery (battery pack) in which a plurality of conventional batteries as described above are connected in series. In such assembled battery, however, because of heat generation during charge and discharge, a temperature difference occurs between the batteries at the outer side and those at the inner side. Specifically, the batteries at the outer side have a lower temperature than those at the inner side. Because of this, the batteries at the outer side have larger polarization in the assembled battery, and, therefore a difference of capacity occurs between the batteries at the outer side and those at the inner side, which causes poor overcharge cycle life as assembled battery.

In view of the above, an object of the present invention is to solve these problems. To be specific, an object of the present invention is to provide a non-aqueous electrolyte secondary battery with improved rate characteristics, improved cycle life, improved safety and improved storage life designed by optimizing the composition and crystal structure of a positive electrode active material, a method for synthesizing the above, the selection of battery systems, an electrolyte, current collector materials for positive and negative electrodes, a separator, the content ratio between positive and negative electrode active materials, and the like. The present invention further provides a non-aqueous electrolyte secondary battery containing a positive electrode active material having flat charge/discharge curves and whose remaining capacity can be easily monitored by deliberately creating a voltage difference at the end of discharging.

Another object of the present invention is to provide a non-aqueous electrolyte secondary battery, which can achieve an assembled battery particularly having excellent overcharge cycle characteristic because of reduced temperature difference, even when a plurality of the non-aqueous electrolyte secondary batteries are connected in series, in parallel, or in series-parallel.

BRIEF SUMMARY OF THE INVENTION

1. Positive Electrode Active Material

The present invention relates to a positive electrode active material represented by the composition formula: $Li_{2\pm\alpha}[Me]_4O_{8-x}$, where $0 \leq \alpha < 0.4$, $0 \leq x < 2$, and Me is a transition metal containing Mn and at least one selected from the group consisting of Ni, Cr, Fe, Co and Cu, the material exhibiting topotatic two-phase reactions during charge and discharge.

The phase of the transition metal preferably has a 2×2 superlattice in the positive electrode active material.

It is preferred that the ratio between Mn and other transition metal is substantially 3:1 in the positive electrode active material.

It is preferred that the positive electrode active material has a spinel-framework-structure with space group symmetry of Fd3m in which Li and/or Me locate at the 16(c) sites.

The difference between the charge and discharge potentials of the positive electrode active material is preferably 0.2 to 0.8 V.

The positive electrode active material preferably has a lattice constant attributed to a cubic crystal of not greater than 8.3 Å.

Preferably, the positive electrode active material is not only in the form of an octahedral shape. In other words, the positive electrode active material particles are preferably in the form of icositetrahedron, rhombic dodecahedron, or tetradecahedron with 8 hexagons and 6 quadrangles.

The positive electrode active material preferably comprises a mixture of crystal particles with a particle size of 0.1 to 8 μm and secondary particles of the crystal particles with a particle size of 2 to 30 μm.

2. Method for Producing Positive Electrode Active Material

The present invention relates to a method for producing a positive electrode active material comprising: (1) a step of mixing Mn and a compound containing at least one selected from the group consisting of Ni, Cr, Fe, Co and Cu to give a raw material mixture; or a step of synthesizing a eutectic compound containing a Mn compound and at least one selected from the group consisting of Ni, Cr, Fe, Co and Cu; (2) a step of mixing the raw material mixture or eutectic compound with a lithium compound; and (3) a step of subjecting the compound obtained by the step (2) to a first baking at a temperature of not less than 600° C., whereby a positive electrode active material represented by the formula: $Li_{2\pm\alpha}[Me]_4O_{8-x}$, where $0\leq\alpha<0.4$, $0\leq x<2$, and Me is a transition metal containing Mn and at least one selected from the group consisting of Ni, Cr, Fe, Co and Cu, said material exhibiting topotatic two-phase reactions during charge and discharge is obtained.

The first baking is preferably performed at a temperature of not less than 900° C.

The production method preferably comprises a step of performing a second baking at a temperature lower than that of said first baking after said first baking.

In this case, the second baking is preferably performed at a temperature of 350 to 950° C.

More preferably, the second baking is performed at a temperature of 650 to 850° C.

Still more preferably, the production method further comprises a step of rapidly cooling the positive electrode active material after the first baking and/or the second baking.

The rapid cooling is preferably performed at a temperature decrease rate of not less than 4.5° C./min, more preferably at a temperature decrease rate of not less than 10° C./min.

The rapid cooling is preferably performed until the temperature reaches room temperature.

3. Non-Aqueous Electrolyte Secondary Battery

The present invention further relates to a non-aqueous electrolyte secondary battery comprising a positive electrode containing the above-described positive electrode active material, a negative electrode containing a titanium oxide, a non-aqueous electrolyte and a separator, characterized in that the battery has a practical charging/discharging region of 2.5 to 3.5 V and a practical average voltage of 3V level.

The titanium oxide preferably has a spinel structure.

The titanium oxide is preferably $Li_4Ti_5O_{12}$.

The non-aqueous electrolyte secondary battery has a potential difference of 0.2 to 0.8 V in an operating discharge voltage.

The positive and negative electrodes preferably have a current collector made of aluminum or an aluminum alloy.

The non-aqueous electrolyte preferably comprises at least one selected from the group consisting of propylene carbonate, γ-butyrolactone, γ-valerolactone, methyl diglyme, sulfolane, trimethyl phosphate triethyl phosphate and methoxymethylethyl carbonate.

The separator is preferably made of non-woven fabric.

The non-woven fabric preferably comprises at least one selected from the group consisting of polyethylene, polypropylene and polybutylene terephthalate.

The weight ratio of the negative electrode active material to the positive electrode active material is preferably not less than 0.5 and not greater than 1.2.

BRIEF DESCRIPTION OF THE SEVERAL VIEWS OF THE DRAWING

FIG. 4(a) shows the SEM image of a positive electrode active material in accordance with the present invention in cross section and FIG. 4(b) shows the SEM image of a conventional positive electrode active material in cross section.

FIG. 7 shows the SEM images of positive electrode active material particles produced under the conditions of Case 3.

FIG. 8 shows the SEM images of positive electrode active material particles produced under the conditions of Case 4.

FIG. 14 shows the lattice constant change of a positive electrode active material produced through a rapid cooling.

FIG. 17 shows the charge/discharge behavior of a battery system in accordance with the present invention.

FIG. 18 shows the cycle life of a battery system in accordance with the present invention until 200 cycles.

DETAILED DESCRIPTION OF THE INVENTION

Figure 1:
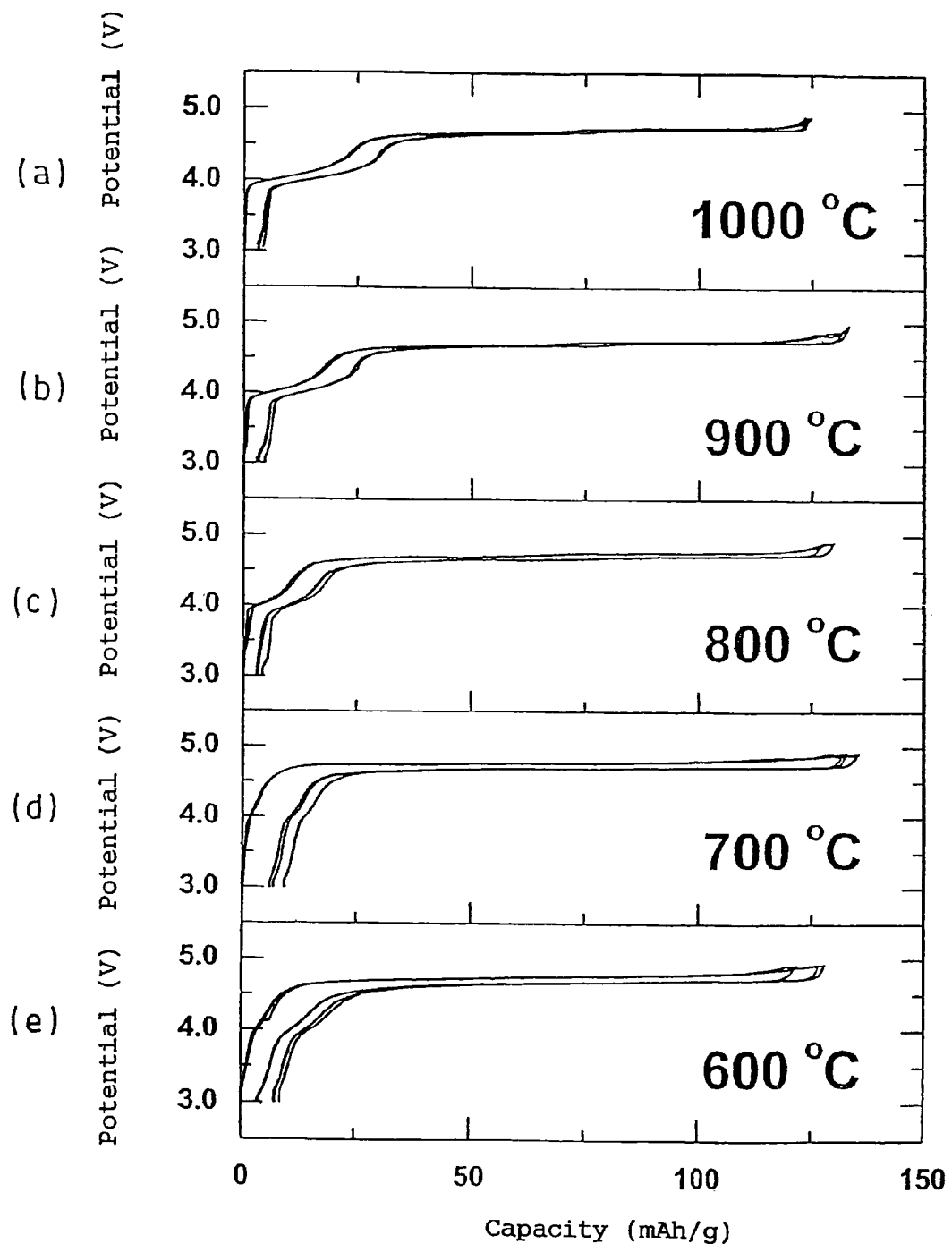
FIG. 1 shows graphs illustrating the electrochemical characteristics of positive electrode active materials obtained by baking the mixture of a eutectic compound and a lithium compound in air at temperatures of 1000° C. (a), 900° C. (b), 800° C. (c), 700° C. (d) and 600° C. (e) for 12 hours (first baking).

The present invention can provide a non-aqueous electrolyte secondary battery with a flat charge/discharge voltage, excellent high rate characteristics and excellent cycle life by optimizing design matters such as a new composition of a positive electrode active material, a new method for synthesizing a positive electrode active material, materials for battery elements other than a positive electrode active material, and the content ratio between positive and negative electrode active materials.

If an appropriate battery system is designed using a positive electrode active material of the present invention, a potential difference can be freely created at around the end of discharging. Thereby, it is possible to accurately determine the remaining capacity of a non-aqueous electrolyte secondary battery in accordance with the present invention, and to add an alarm function that accurately informs a loss of power capacity.

Since a positive electrode active material in accordance with the present invention exhibits a flat-shaped discharge curve, by using, for example, $Li_4Ti_5O_{12}$ which exhibits a flat-shaped discharge curve in the negative electrode, it is possible to obtain a battery that exhibits a flat-shaped discharge curve desirable for electronic devices.

In addition, since such battery in accordance with the present invention provides a voltage of 3V level, it can be utilized in devices such as cameras, digital cameras, game machines, portable MD players and headset stereos instead of a conventional lithium primary battery or a conventional combination of two dry batteries, whereby remarkable effect is obtained.

Moreover, using the non-aqueous electrolyte secondary battery of the present invention, an assembled battery or module battery particularly having excellent overcharge cycle characteristic can be achieved.

1. Synthesis of Positive Electrode Active Material of the Present Invention

The present invention relates to a positive electrode active material represented by the composition formula: $Li_{2\pm\alpha}[Me]_4O_{8-x}$, where $0 \leq \alpha < 0.4$, $0 \leq x < 2$, and Me is a transition metal containing Mn and at least one selected from the group consisting of Ni, Cr, Fe, Co and Cu, the material exhibiting topotatic two-phase reactions during charge and discharge. The composition formula preferably satisfies $0 \leq x < 1.3$.

The following explains a positive electrode active material in accordance with the present invention using $Li[Ni_{1/2}Mn_{3/2}]O_4$ as a representative example. It is to be understood that the explanation can also be applied to a positive electrode active material with a different composition within the scope of the aforesaid formula.

$Li[Ni_{1/2}Mn_{3/2}]O_4$ can be synthesized by mixing raw materials such as an oxide containing constituent elements, a hydroxide and/or a carbonate at a desired composition to give a mixture, which is then baked (first baking). In this case, however, it is necessary to make the particles of the materials all the same size and to thoroughly mix them in order to achieve a uniform reaction. Besides, the synthesis requires an advanced powder technology.

At the same time, $Li[Ni_{1/2}Mn_{3/2}]O_4$ can also be synthesized by coprecipitating nickel and manganese in an aqueous solution in the form of hydroxide or carbonate. In this case, the synthesis can be relatively easily performed because it is possible to uniformly disperse nickel and manganese, both of which are unlikely to be dispersed, in the particle beforehand.

Accordingly, in the examples of the synthesis thereof described below, an eutectic compound obtained as a hydroxide is used and lithium hydroxide is used as a lithium compound. After they are thoroughly mixed, the obtained mixture is baked (first baking). It is also possible to ensure the reaction by forming the mixture of hydroxide obtained through a eutectic reaction and lithium hydroxide into pellets.

FIG. 1 shows graphs illustrating the electrochemical characteristics of the positive electrode active materials obtained by baking the mixture of the eutectic compound and the lithium compound in air at temperatures of 1000° C. (a), 900° C. (b), 800° C. (c), 700° C. (d) and 600° C. (e) for 12 hours (first baking). Specifically, $[Ni_{1/4}Mn_{3/4}](OH)_2$ obtained through a eutectic reaction and $LiOH \cdot H_2O$ were thoroughly mixed to give a mixture, which was then formed into pellets and the resulting formed product was baked to give a $Li[Ni_{1/2}Mn_{3/2}]O_4$.

A test cell was produced as follows and the electrochemical characteristics thereof were measured.

First, 80 parts by weight of $Li[Ni_{1/2}Mn_{3/2}]O_4$, 10 parts by weight of acetylene black as a conductive agent and 10 parts by weight of polyvinylidene fluoride (PVDF) as a binder were mixed to give a mixture, which was then diluted with N-methyl-2-pyrrolidone (NMP) to give a paste. The paste was applied onto a current collector made of aluminum foil. The current collector with the paste applied was dried in a vacuum at 60° C. for 30 minutes, which was then cut into 15 mm×20 mm pieces. Subsequently, the cut piece of current collector was further dried in a vacuum at 150° C. for 14 hours to give a test electrode.

A counter electrode was produced by attaching a lithium metal sheet on a stainless steel. As a separator, a porous film made of polyethylene was used. An electrolyte solution was obtained by mixing ethylene carbonate (EC) and dimethyl carbonate (DMC) in a volume ratio of 3:7, and 1.0 M of $LiPF_6$ was then dissolved in the obtained solvent mixture.

The test electrode, the separator and the metal lithium were stacked in this order. After the electrolyte solution was fed thereinto, the stack was clamped between holders made of stainless steel by applying an appropriate pressure from outside to give a test cell. The obtained test cell was repeatedly charged and discharged between 3.0 to 5.0 V at a current density of 0.17 mA/cm².

As is apparent from FIG. 1, the positive electrode active materials obtained by baking at any of the temperatures had a high discharge voltage of 4.6 to 4.8 V relative to that of lithium metal and a discharge capacity of about 125 mAh/g. It also shows that the higher the baking temperature was, the more excellent the polarization characteristics were.

It is also clear that the voltage difference at around 4 V regularly increased as the baking temperature was increased. The present invention exploits such phenomenon to provide a battery suitable for electronic devices and whose remaining capacity can be detected. In other words, it is possible to control the desired timing for detecting the remaining capacity by changing the baking temperature. The difference appeared at around 4 V, and the range was 0.2 to 0.8 V, which was not as remarkable a change as several V. Accordingly, if a battery with such a difference is used in an electronic device, such trouble as the shutdown of the power source of the electronic device will not occur.

As described above, a positive electrode active material in accordance with the present invention can be produced by mixing a raw material mixture or a eutectic compound with a lithium compound, which is then subjected to a first baking and subsequently the ambient temperature is gradually decreased (gradual cooling). The conditions for the first baking and the gradual cooling are as follows.

| First baking | Lower limit: 600° C., preferably 900° C. |
| --- | --- |
| | Upper limit: 1000° C. |
| | Time: 2 to 72 hours |
| Cooling rate | Lower limit: 4.5° C./min. |
| | Upper limit: 10° C./min. |

2. Control of Voltage Difference at the End of Discharge and Improvement of Polarization Characteristics in Positive Electrode Active Material As the baking temperature is higher, the degree of the polarization gets smaller as previously stated. In this case, however, the range of the 4V region becomes greater. Certainly, it is preferred to freely control the range of the 4V region while the polarization is controlled to be small. In order to achieve this object, the present inventors extensively studied the synthesis method.

Figure 2:
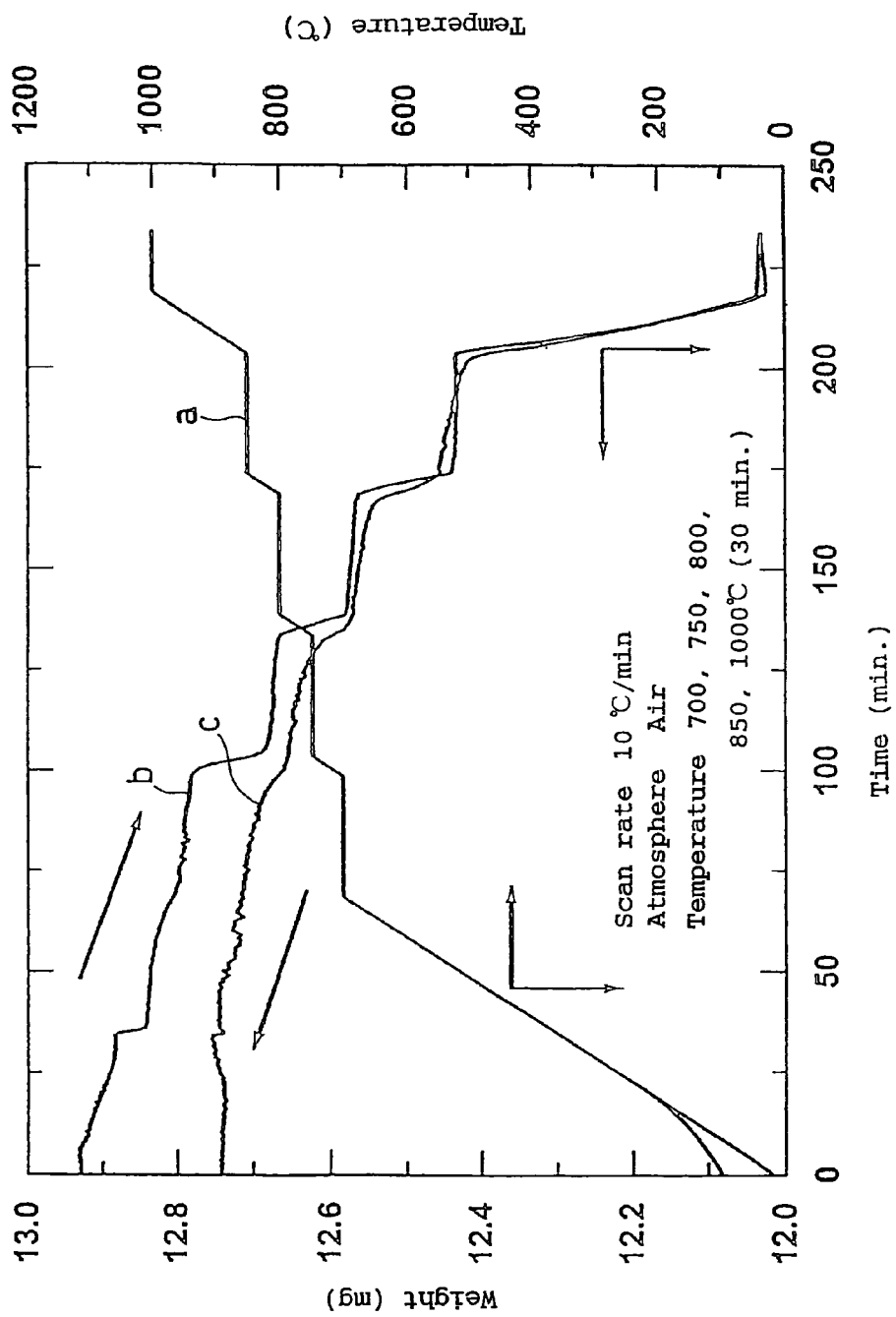
FIG. 2 shows the TG curve (thermogravimetric analysis) of a positive electrode active material after the first baking.

FIG. 2 shows the TG curve (thermogravimetric analysis) of a positive electrode active material after the first baking. The positive electrode active material used here was obtained by baking $Li[Ni_{1/2}Mn_{3/2}]O_4$ at a low temperature of 500° C. This positive electrode active material was heated with the temperature increased by 50° C. from 700 to 850° C. The positive electrode active material was held at each temperature and the temperature was increased stepwise. When the temperature was decreased, the temperature was controlled in the same manner. The temperature increase rate was 10° C./min. and the ambient atmosphere was air.

In FIG. 2, "a" represents temperature, "b" represents weight change when the temperature was increased, and "c" represents weight change when the temperature was decreased. In FIG. 2, there is observed a random weight reduction, which is considered to be due to moisture. In the temperature increase from 400 to 1000° C., the weight monotonously decreased in the range of 700 to 1000° C. On the other hand, when the weight change when the temperature was decreased is observed, the weight was increased (recovered) in an amount equal to the amount of weight decreased, following the rate of this experiment. It is apparent that the weight was almost completely recovered although the rate was slower until 700° C. This weight increase is presumed to be because oxygen once released at a high temperature returned to the positive electrode active material by re-baking (second baking), in other words, by reoxidation of the positive electrode active material. Accordingly, it suggests that the temperature of the positive electrode active material obtained after the first baking is preferably decreased at a rate of not greater than 10° C./min.

Figure 3:
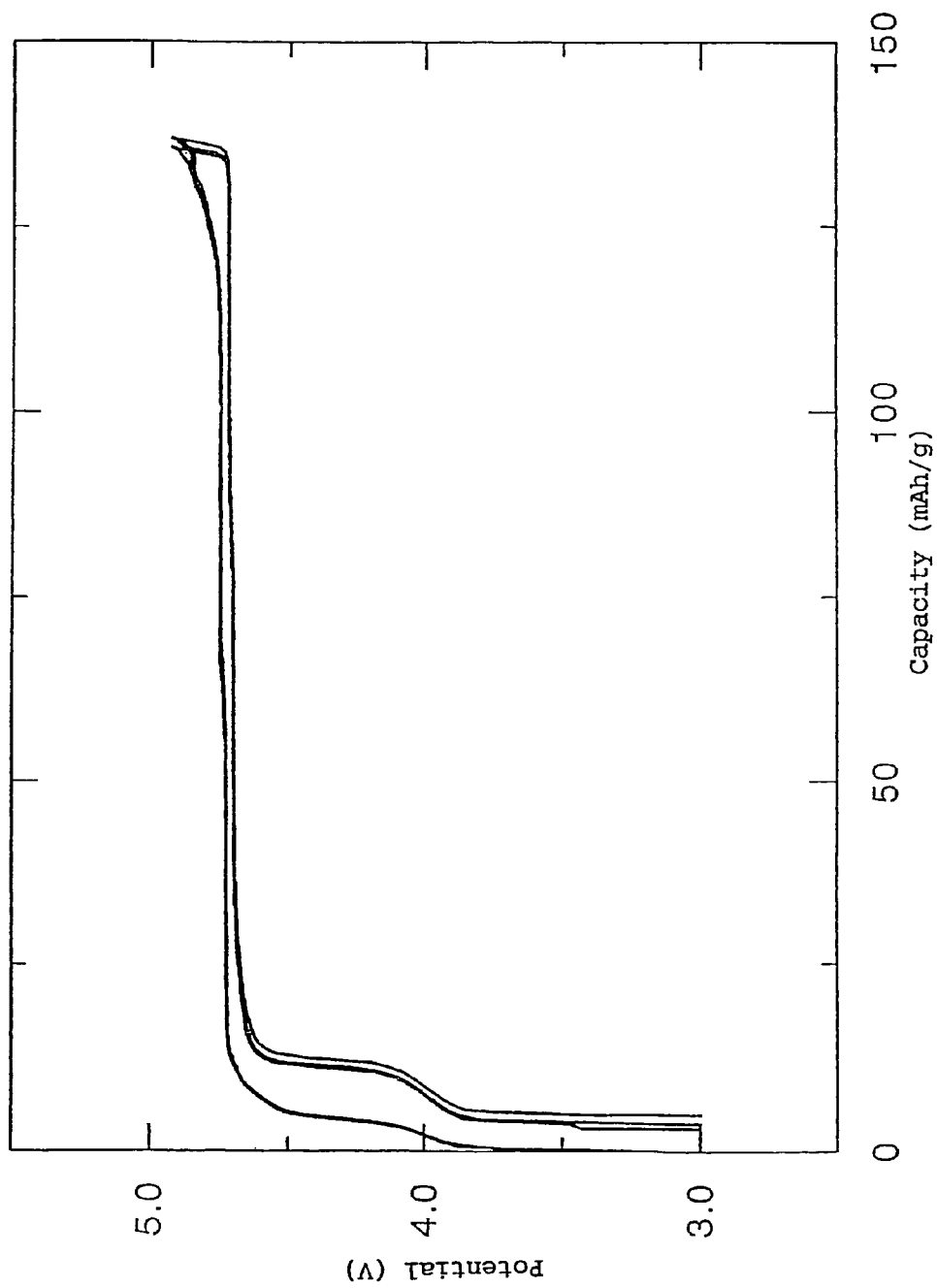
FIG. 3 shows the charge/discharge curves of a positive electrode active material in accordance with the present invention obtained by the first baking at 1000° C. for 12 hours and then the second baking at 700° C. for 48 hours.

Then, the charge/discharge curves of the positive electrode active material obtained by the first baking at 1000° C. for 12 hours and then the second baking at 700° C. for 48 hours are shown in FIG. 3. The results show that the positive electrode active material has a charge/discharge capacity of about 135 mAh/g, a voltage difference of about 15 mAh/g at around 4 V, and excellent polarization characteristics.

As described above, it is even possible to control the voltage difference at around 4 V in the positive electrode active material, which is obtained by baking at a high temperature of 1000° C. (first baking), by re-baking (second baking) the positive electrode active material, for example, at a lower temperature of 700° C. like the positive electrode active material baked at 700° C. as shown in FIG. 1.

Since the positive electrode active material subjected to the first and second bakings has been baked at 1000° C. once, it possesses grown crystalline particles having no micropores and therefore has a high packing density. In addition, this positive electrode active material is superior in polarization characteristics.

As described above, from the viewpoint of voltage difference and polarization characteristics, the positive electrode active material in accordance with the present invention is preferably produced by mixing a raw material mixture or a eutectic compound with a lithium compound, which is then subjected to the first baking and then the second baking. The conditions for the first baking and the second baking are as follows.

| First baking | Lower limit: 600° C., preferably 900° C. |
| --- | --- |
| | Upper limit: 1000° C. |
| | Time: 2 to 72 hours |
| Second baking | Lower limit: 350° C., preferably 650° C. |
| | Upper limit: 950° C., preferably 850° C. |
| | Time: 2 to 72 hours |

From the results and the electrochemical characteristics evaluation shown in FIG. 2, it is clear that it is preferred that the first baking is performed at 600 to 1000° C. or more, preferably 900 to 1000° C., the temperature is rapidly cooled to 350 to 950° C., and then the second baking is performed at 350 to 950° C., preferably 650 to 850° C.

It is possible to improve the polarization characteristics of the positive electrode active material to be obtained and, at the same time, to appropriately control the difference that appears at around 4 V in the charge/discharge curves. In the above experiment, the temperature increase rate during baking was 7.5° C./min. and the temperature decrease rate was 4.5° C./min.

(3) Control of Particle Morphology of Active Material

When the positive electrode active material is applied to a battery, the particle morphology of the positive electrode active material is an important factor, and it is no exaggeration to state that the control of the particle morphology thereof influences the improvement of lithium ion batteries currently available in capacity and performance.

In view of this, the present inventors extensively studied the preferred particle morphology of the positive electrode active material in accordance with the present invention and the control of the particle morphology thereof. As previously stated, in the method for producing the positive electrode active material in accordance with the present invention, it is preferred to perform the first baking at a high temperature (not less than 900° C.) and then the second baking intended for reoxidation.

Accordingly, a cross-section image of a particle of the positive electrode active material in accordance with the present invention obtained by the first baking at 1000° C. for 12 hours and the second baking at 700° C. for 48 hours was taken by SEM. The obtained SEM image is shown in FIG. 4(a) (magnification: 30,000 times). FIG. 4(b) shows an SEM image of a positive electrode active material obtained in the same manner as the positive electrode active material of FIG. 4(a) was obtained, except that the second baking was not performed.

From FIG. 4, it is clear that the crystalline particle of the positive electrode active materials is well grown because they were once baked at 1000° C. It is also clear that the particle has no micropores inside thereof, and therefore is a particle with a high packing density although it is a primary particle with a size of 2 to 3 μm.

Further, the particle morphology of the positive electrode active material (the external shape in particular) significantly influences a coating density and a packing density when an electrode plate is produced using the positive electrode active material. Japanese Laid-Open Patent Publication No. 2001-210324 provides a proposal regarding particle morphology. Specifically, it teaches that the shape of primary particle should be an octahedron. The positive electrode active material in accordance with the present invention preferably has a shape totally different from an octahedral shape, which will be explained below, and therefore is obviously different from the above prior art in this regard.

First, the method for controlling the particle morphology is explained using the case of producing $Li[Ni_{1/2}Mn_{3/2}]O_4$ as a representative example. It is to be noted that positive electrode active materials having other compositions within the scope of the present invention also exhibited a similar tendency.

Figure 5:
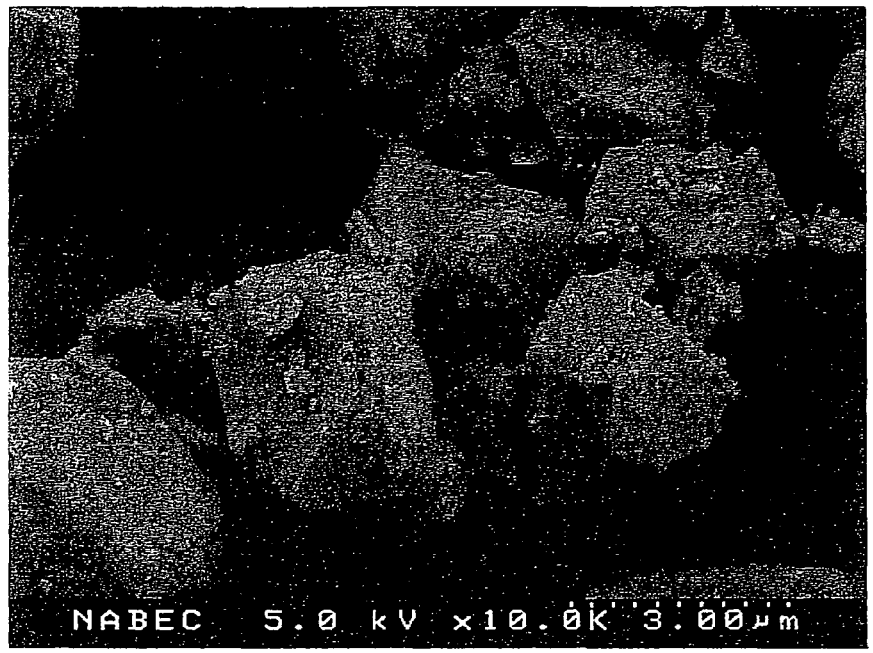
FIG. 5 shows the SEM image of positive electrode active material particles produced under the conditions of Case 1.

(i) Case 1 (FIG. 5)

The first baking was performed by increasing the temperature from room temperature to 1000° C. for about 3 hours and holding the temperature at 1000° C. for 12 hours. After the first baking, the temperature was decreased from 1000° C. to room temperature for 2 hours (cooling rate of 8° C./min.).

Figure 6:
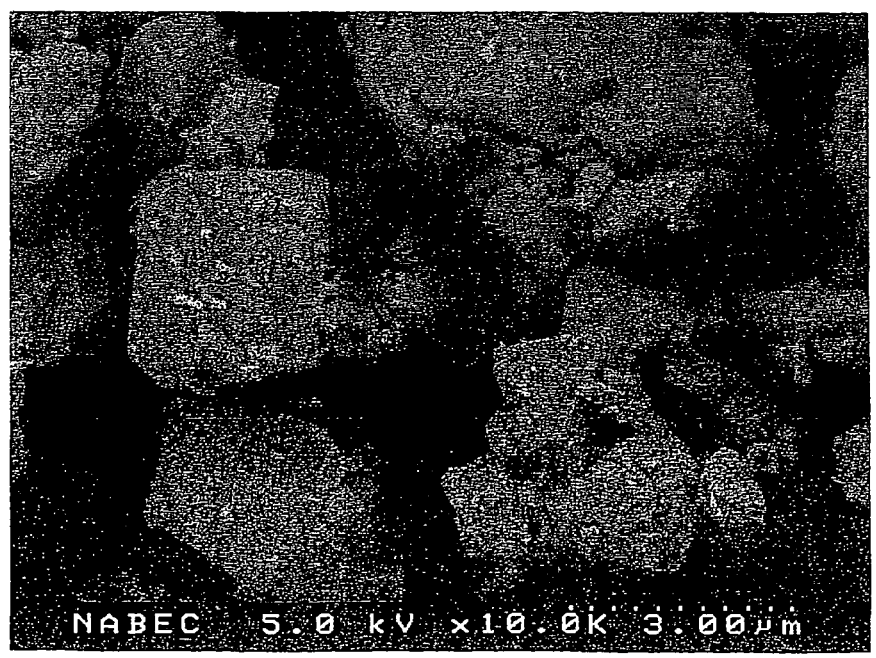
FIG. 6 shows the SEM image of positive electrode active material particles produced under the conditions of Case 2.

(ii) Case 2 (FIG. 6)

The first baking was performed by increasing the temperature from room temperature to 1000° C. for about 3 hours and holding the temperature at 1000° C. for 12 hours. The second baking was performed by decreasing the temperature from 1000 to 700° C. for 30 minutes and holding the temperature at 700° C. for 48 hours.

After the second baking, the temperature was decreased from 700° C. to room temperature for 1.5 hours (cooling rate of 7.5° C./min.).

(iii) Case 3 (FIG. 7)

The first baking was performed by increasing the temperature from room temperature to 1000° C. for about 3 hours and holding the temperature at 1000° C. for 12 hours. After the first baking, the temperature was rapidly cooled from 1000° C. to room temperature.

The second baking was performed by increasing the temperature to 700° C. for about 1 hour and holding the temperature at 700° C. for 48 hours.

After the second baking, the temperature was decreased from 700° C. to room temperature for 1.5 hours.

(iv) Case 4 (FIG. 8)

The first baking was performed by increasing the temperature from room temperature to 1000° C. for about 3 hours and holding the temperature at 1000° C. for 12 hours. After the first baking, the temperature was rapidly cooled from 1000° C. to room temperature.

Roughly classified, Cases 3 and 4 included a rapid cooling step while Cases 2 and 3 included a reoxidation (second baking) step at 700° C.

FIGS. 5 to 8 show the SEM images of the particulate positive electrode active materials produced under the conditions of Cases 1 to 4, respectively. As is obvious from these SEM images, the particulate positive electrode active materials in accordance with the present invention are not in the form of an octahedron. Although it is difficult to identify such shape, it can be said that the positive electrode active materials are in the form of an icositetrahedron or rhombic dodecahedron. More specifically, it can be said that the positive electrode active materials are in the form of a tetradecahedron with 8 hexagons and 6 quadrangles. In FIGS. 7 and 8, the magnification of (a) was 1000 times and that of (b) was 30000 times.

It is clear that the rapid cooling step significantly influences the control of the particle morphology. The particle boundary of the positive electrode active materials obtained form Cases 1 and 2 is sharp whereas that of the positive electrode active materials obtained from Cases 3 and 4 is curved. This indicates that the boundary became curved by performing the rapid cooling step.

When the positive electrode active materials obtained from Cases 1 to 4 were applied onto electrode plates for batteries, the use of the positive electrode active material with curved boundary enabled high density filling because the fluidity of powder or applied paste was improved. As described above, unlike the particles in the form of an octahedron proposed by the prior art, the positive electrode active material in accordance with the present invention is in the form of icositetrahedron or rhombic dodecahedron, more specifically, in the form of a tetradecahedron with 8 hexagons and 6 quadrangles. Presumably, this particle morphology contributes to achieve improved battery characteristics. The positive electrode active material in accordance with the present invention preferably comprises a mixture of crystal particles with a particle size of about 0.1 to 8 μm and secondary particles of the crystal particles with a particle size of 2 to 30 μm.

As described above, from the viewpoint of controlling the particle morphology, the positive electrode active material in accordance with the present invention is preferably produced by mixing a raw material mixture or a eutectic compound with a lithium compound, which is then subjected to a first baking and a rapid cooling. Additionally, a second baking may be performed after the rapid cooling. The conditions for the first baking, the rapid cooling and the second baking are as follows.

| | |
|---|---|
| First baking | Lower limit: 600° C., preferably 900° C. |
| | Upper limit: 1000° C. |
| | Time: 2 to 72 hours |
| Cooling rate | 10° C./min. or more, |
| | preferably 20° C./min. or more, |
| | most preferably 50° C./min. or more |
| Second baking | Lower limit: 350° C., preferably 650° C. |
| | Upper limit: 950° C., preferably 850° C. |
| | Time: 2 to 72 hours |

Figure 9:
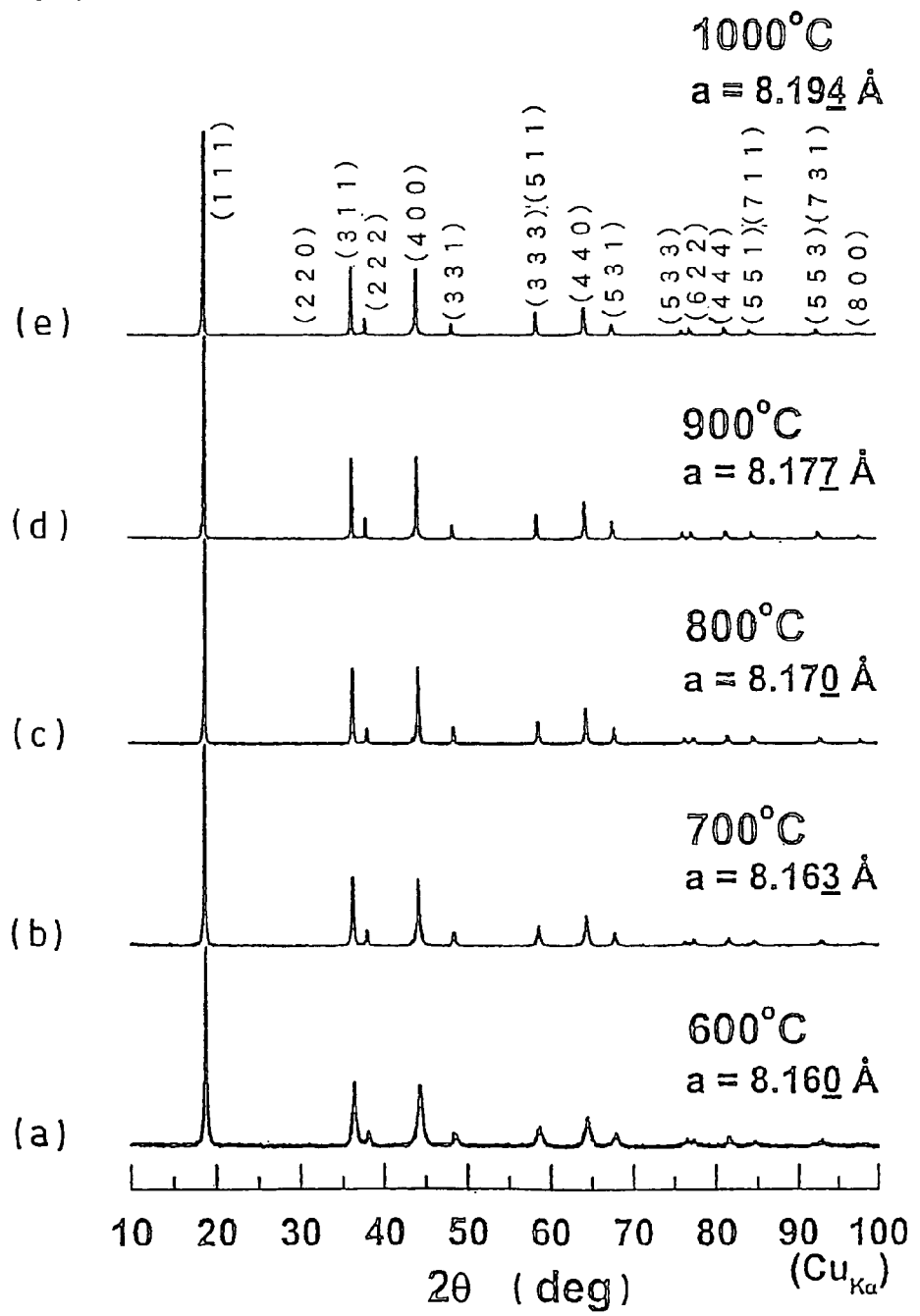
FIG. 9 shows the X-ray diffraction patterns of the positive electrode active materials in accordance with the present invention produced at different temperatures in the first baking.

(4) Crystal Structure, X-Ray Diffraction Pattern and FT-IR Signal of Positive Electrode Active Material In terms of crystal structure, the positive electrode active material in accordance with the present invention has a spinel-framework-structure. FIG. 9 shows the X-ray diffraction patterns of the positive electrode active materials in accordance with the present invention produced at different temperatures in the first baking. In FIG. 9, (a) to (e) show the X-ray diffraction patterns of the positive electrode active materials produced by the first baking at 600° C., 700° C., 800° C., 900° C. and 1000° C., respectively. The composition of the positive electrode active material was $Li[Ni_{1/2}Mn_{3/2}]O_4$.

When Miller indices were assigned as cubic crystal in the obtained X-ray diffraction patterns, all peaks were able to be assigned as shown in FIG. 9. From FIG. 9, it is found that the peaks in the case of the first baking at a high temperature are sharper, exhibiting the improvement in crystallinity.

Figure 10:
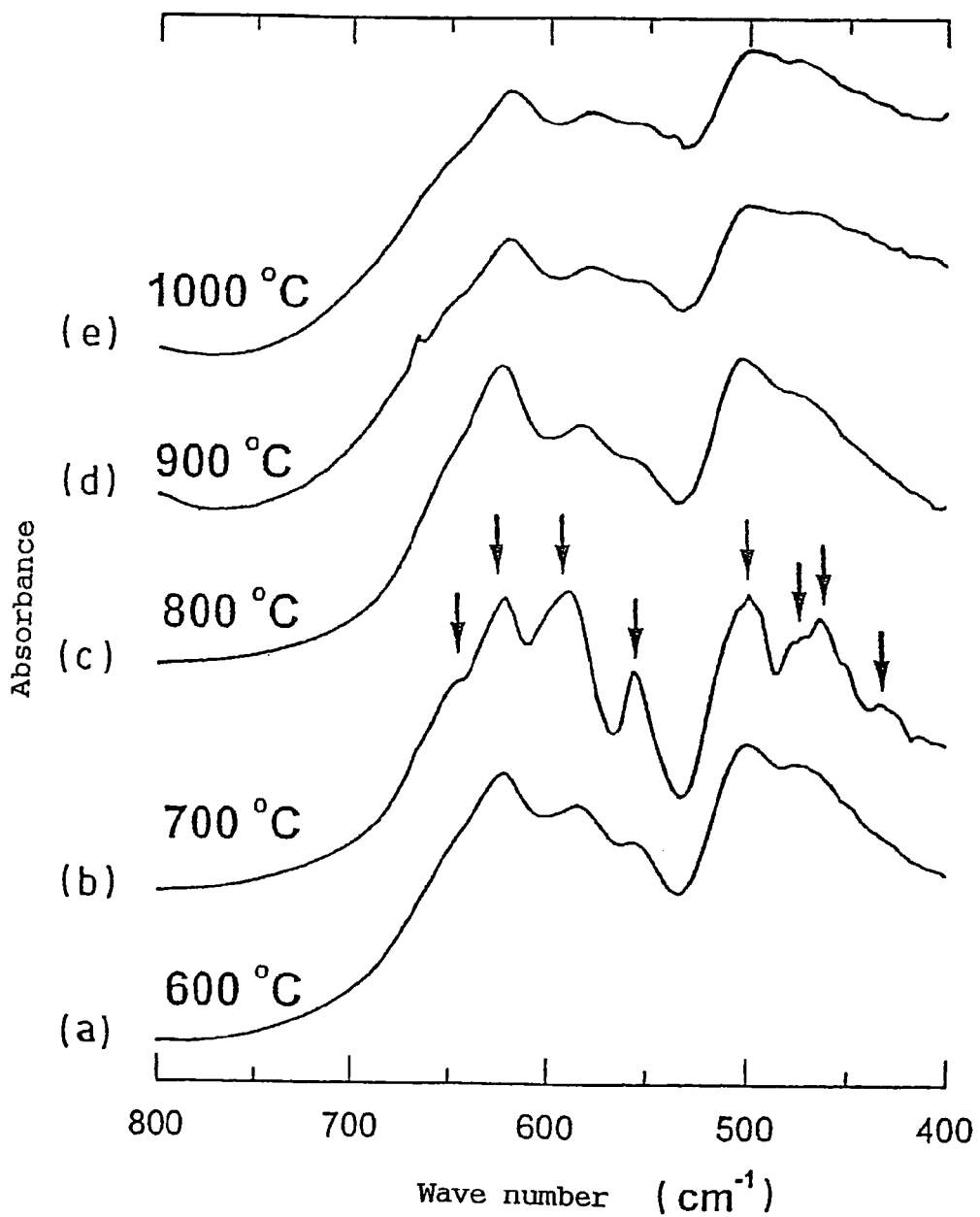
FIG. 10 shows the FT-IR analysis results of the positive electrode active materials in accordance with the present invention produced at different temperatures in the first baking.

Then, the FT-IR analysis results of the positive electrode active material shown by (a) to (e) in FIG. 9 are shown by (a) to (e) in FIG. 10. Eight sharp peaks are observed in the case (b) of the positive electrode active material obtained at 700° C., and it is obvious that the peaks become broad in both cases of over 700° C. and less than 700° C. This indicates that the fist baking at 700° C. is preferred in terms of crystal arrangement.

Regardless of performing the rapid cooling or not, almost similar X-ray diffraction patterns can be obtained by the second baking. In order to study the crystal structure in more detail, the X-ray diffraction patterns of the positive electrode active materials obtained from Cases 3 and 4 described previously were compared.

Figure 11:
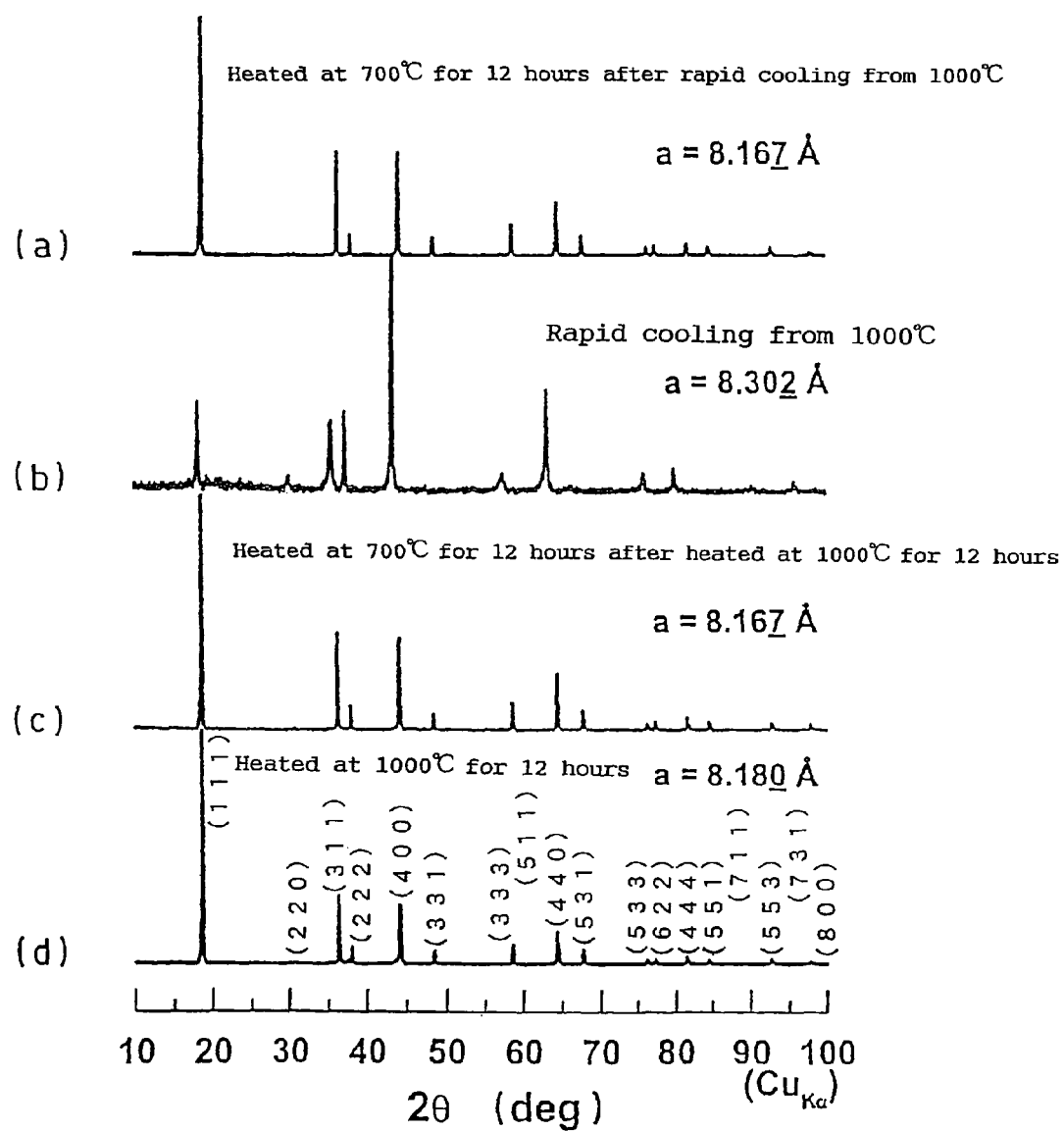
FIG. 11 shows the X-ray diffraction patterns of the positive electrode active materials in accordance with the present invention produced under various different conditions.
Figure 12:
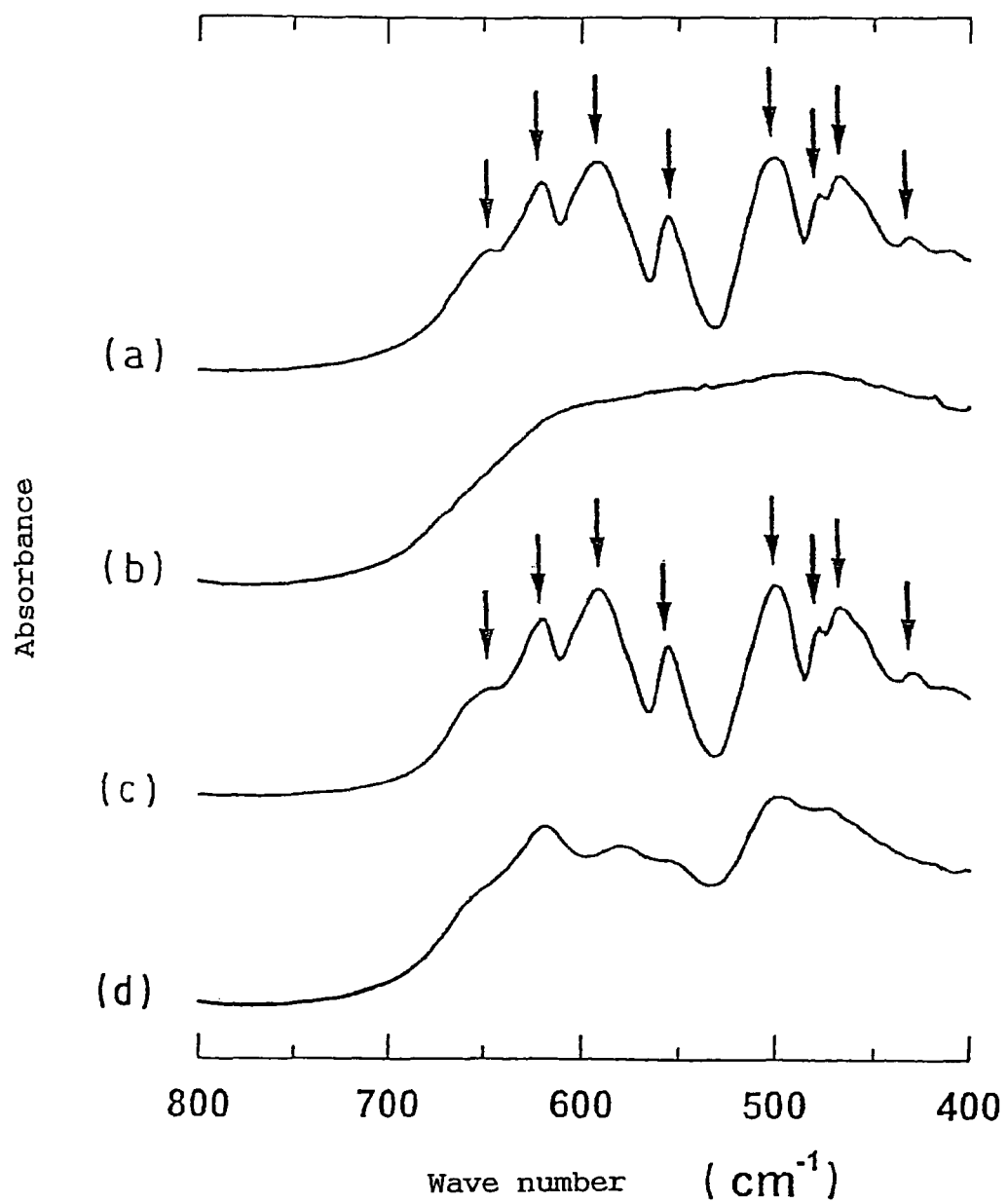
FIG. 12 shows the FT-IR analysis results of the positive electrode active materials in accordance with the present invention synthesized under various different conditions.

FIG. 11 shows the X-ray diffraction patterns of the positive electrode active material (a) obtained from the above Case 3 and the positive electrode active material (b) obtained from the above Case 4, and FIG. 12 shows their FT-IR analysis results. The difference between them is whether they were subjected to the reoxidation process or not. In view of this, the structural analysis of the X-ray diffraction pattern of the rapidly cooled sample was performed. As a result, the following has become clear and this is thought to be the cause of the effect of the present invention.

It can be said that the positive electrode active material in accordance with the present invention has the formula: $Li_{2\pm\alpha}[Me]_4O_{8-x}$, where $0\leq\alpha<0.4$, $0\leq x<2$, preferably $0\leq x<1.3$, and Me is a transition metal containing Mn and at least one selected from the group consisting of Ni, Cr, Fe, Co and Cu. In the following, an explanation is given using a specific example in which $\alpha$ is set to 0 ($\alpha=0$) in order to make it easier to understand.

In the atomic arrangement of the spinel structure belonging to the space group symmetry of Fd3m of $LiMn_2O_4$, lithium element occupies the 8a sites, a transition metal element Me (Mn) occupies the 16d sites and oxygen occupies the 32e sites. However, the 16c sites are usually vacant. The positive electrode active material in accordance with the present invention is characterized by arranging an element in the 16c sites.

In other words, in the positive electrode active material of the present invention, the control of the voltage difference in the above discharge curve is achieved by controlling the amount of an element to be present in the 16c sites.

When the X-ray diffraction pattern of the sample of the positive electrode active material produced by the first baking and the rapid cooling (without the second baking, in other words, without reoxidation) is analyzed, it was found that the X-ray diffraction pattern could be well fitted by assuming that Me was present in the 8a sites at about 1/5, in the 16c sites at 2/5 and in the 16d sites at 7/4. From this, it is presumed that the oxygen in the spinel structure leaves as the temperature is increased to 1000° C., thereby the transition metal is reduced and considerable amounts of lithium element and transition metal element respectively move to the 8a sites and 16c sites. Because of this phenomenon, a rock-salt-type-structure is formed in a part of the spinel structure of the positive electrode active material in accordance with the present invention.

Since the above sample obtained by the first baking and the rapid cooling was not subjected to the reoxidation process for reinfection of oxygen, it can be represented by $Li_{1.2}Me_{2.4}O_4$, judging from the result of the above-mentioned TG curve. Me contains Ni and Mn in a ratio of 1:3.

Further, the X-ray diffraction patterns shown in FIG. 11 indicate that the rock-salt-type-structures reversibly return to the spinel structures by the reoxidation (second baking) in the positive electrode active material (a) which was obtained by the first baking, the rapid cooling and the reoxidation (second baking) at 700° C., and the positive electrode active material (c) which was obtained by the first baking (1000° C.), and subsequently the reoxidation (second baking) at a lower temperature of 700° C. Such flexible crystal structures of the positive electrode active material contribute to the stability of the crystal structure in the case where a stress is given to the positive electrode active material due to high rate charge/discharge cycles; as a result, presumably a long life can be achieved.

Further, in the FT-IR analysis results shown in FIG. 12, eight peaks are clearly observed in the case of the positive electrode active materials (a) and (c) obtained through the reoxidation (second baking) process.

Contrary to the above, the X-ray diffraction patterns and FT-IR analysis results of the positive electrode active materials obtained simply by the first baking, which were reoxidized when the temperature was decreased are respectively shown by (b) and (d) in FIGS. 11 and 12. From the X-ray diffraction patterns of these positive electrode active materials, it seems that these positive electrode active materials also have a similar spinel-framework-structure to the positive electrode active material obtained by the reoxidation (second baking). However, the FT-IR analysis results are distinctly different because eight peaks cannot be observed clearly. Also, such eight peaks cannot theoretically predicted from the local symmetry of the Fd3m of the spinel structure. Accordingly, it is possible to identify the positive electrode active material in accordance with the present invention by the FT-IR analysis results. This method is effective in identifying the positive electrode active material whose charge/discharge curves substantially have no voltage difference.

Now, an explanation is given on $\alpha$ and x values in the composition formula: $Li_{2\pm\alpha}[Me]_4O_{8-x}$, where $0\leq\alpha<0.4$, $0\leq x<2$, preferably $0\leq x<1.3$, and Me is a transition metal containing Mn and at least one selected from the group consisting of Ni, Cr, Fe, Co and Cu.

$\alpha$ value is an element to be changed to control the particle growth. If the $\alpha$ value is less than 2 in the stoichiometric composition, it is possible to control the particle growth during the synthesis, and the surface area is likely to be increased. Conversely, if the $\alpha$ value is greater than that, it is possible to facilitate the particle growth. Accordingly, in the case of designing the particles according to the characteristics required for a battery, the particle growth can be controlled by changing the composition ratio of lithium. The range of the $\alpha$ value is substantially about ±0.4. If the range (range of variation) exceeds this value, the inherent function of the positive electrode active material could be harmed.

On the other hand, as previously stated, since the positive electrode active material obtained by the first baking at 1000° C. and the rapid cooling is represented by $Li_{1.2}Me_{2.4}O_4$, the x value can be calculated to be 1.33. The x can be considered to be 2 because the amount of oxygen returns to the stoichiometric composition by reoxidation (second baking). However, the upper limit of the x is practically 1.3. In view of these facts, especially the fact that oxygen returns by the reoxidation, the present inventors set the x range to be $0\leq x<1.3$.

Figure 13:
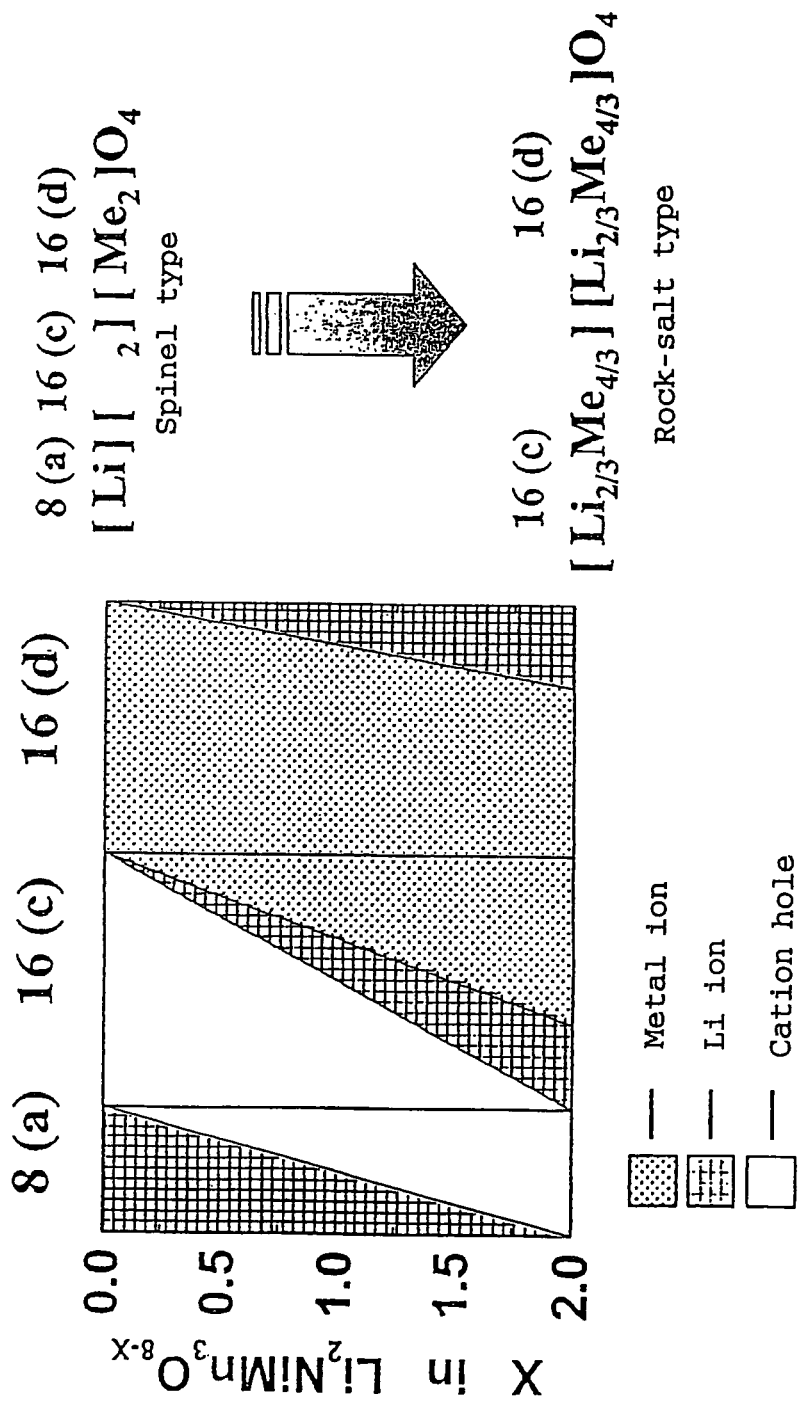
FIG. 13 shows a graph illustrating the occupancy of elements in each of the atomic sites of the crystal structure of a positive electrode active material in accordance with the present invention.

Now, the occupancy of each of the atomic sites in the crystal structure of the positive electrode active material in accordance with the present invention is shown in FIG. 13. FIG. 13 is a graph schematically showing that the x value versus the occupancy of the elements in each of the sites. As shown in FIG. 13, it is possible to freely control the voltage difference that appears in the discharge curve by introducing each of the elements into each site to effectively use originally vacant sites.

In view of this and the analysis results of XAFS and the like together, it is considered that the voltage difference in the 4V region is attributed to the electrochemical reaction: $Mn^{3+} \rightarrow Mn^{4+}$ and the voltage difference in the 5V (4.7 V) region is attributed to the electrochemical reaction: $Ni^{2+} \rightarrow Ni^{4+}$. It was found that the voltage difference of the above-mentioned two positive electrode active material samples obtained through the rapid cooling can also be freely controlled by performing the reoxidation process a few times after the rapid cooling.

When identifying the positive electrode active material in accordance with the present invention by the X-ray diffraction patterns or the unit lattice, the following points are noted from the above explanation. In order to obtain a positive electrode active material with little voltage difference (i.e. practically almost unobservable voltage difference), it is preferable to consider the following points.

FIG. 14 shows the lattice constant change of the positive electrode active material, which is produced through the rapid cooling. From this figure, it is concluded that the preferred lattice constant is not greater than 8.33 Å, more preferably not greater than 8.25 Å, most preferably not greater than 8.2 Å.

From the capacity and the shape of the discharge curves, it was found that the most preferred ratio between Mn and the other transition metal element was substantially 3:1. Although the specific cause thereof is not known, it is presumed that, when the ratio is 3:1, the transition metal phases in the framework of the spinel structure can form a superlattice of [2×2] and this effect has some influence thereon. From the electron beam diffraction analysis, superlattice spots are observed in this direction, so that the formation of the superlattice of [2×2] can be confirmed.

Although Japanese Laid-Open Patent Publication No. Hei 9-147867 provides a description on high voltage positive electrode active materials, it only discloses the composition and simple structure thereof and there is no disclosure on the preferred production method and temperature range. To be specific, it only discloses that raw materials are simply mixed and then baked, and broad baking temperatures. The positive electrode active material in accordance with the present invention, on the other hand, has an effect superior to the positive electrode active material obtained based on such prior art and therefore is a novel material. To freely control the particle morphology by the conditions in the production method as the present invention suggests is not disclosed even in Japanese Laid-Open Patent Publication No. Hei 9-147867.

Looking at the crystal structure in particular, Japanese Laid-Open Patent Publication No. Hei 9-147867 states that Mn in $LiMn_2O_4$ having an ideal spinel structure is substituted with a transition metal or Li. This description is focused only on 16d sites and the specification clearly states, in the body thereof, that the invention differs significantly from $LiNiVO_4$ and the like. This means, in other words, that Japanese Laid-Open Patent Publication No. Hei 9-147867 describes that atoms are not present in the 8a sites and originally vacant 16d sites.

Contrary to the above, in the present invention, these sites are utilized to form a rock-salt-type-structure in a part of the positive electrode active material by appropriately controlling the conditions for the production method, and the structure is intentionally controlled by reoxidation (second baking). In short, a rock-salt-type-structure and a spinel-framework-structure are allowed to exist in the same crystal, and the ratio thereof is freely controlled. Additionally, in the case of the positive electrode active material with almost only spinel-framework-structures and whose discharge curve does not substantially have a voltage difference, the signal for identification is whether eight peaks are clearly observed in the FT-IR analysis or not.

(5) Topotactic Two-Phase Reaction

Batteries that exhibit a flat discharge curve are more advantageous for devices to be used. Generally, when the charge/discharge reaction of the positive electrode active material occurs in one phase, the discharge curve has the shape of S according to Nernst's equation. Although topotactic two-phase reactions proceed partially in a layered structure material such as lithium cobalt oxide or lithium nickel oxide, one-phase reactions proceed most of the time. Accordingly, a layered structure material inherently exhibits an S-shaped discharge curve. For this reason, a significant voltage drop occurs with polarization particularly at the end of high rate discharging, making it difficult to obtain a flat discharge curve.

Figure 15:
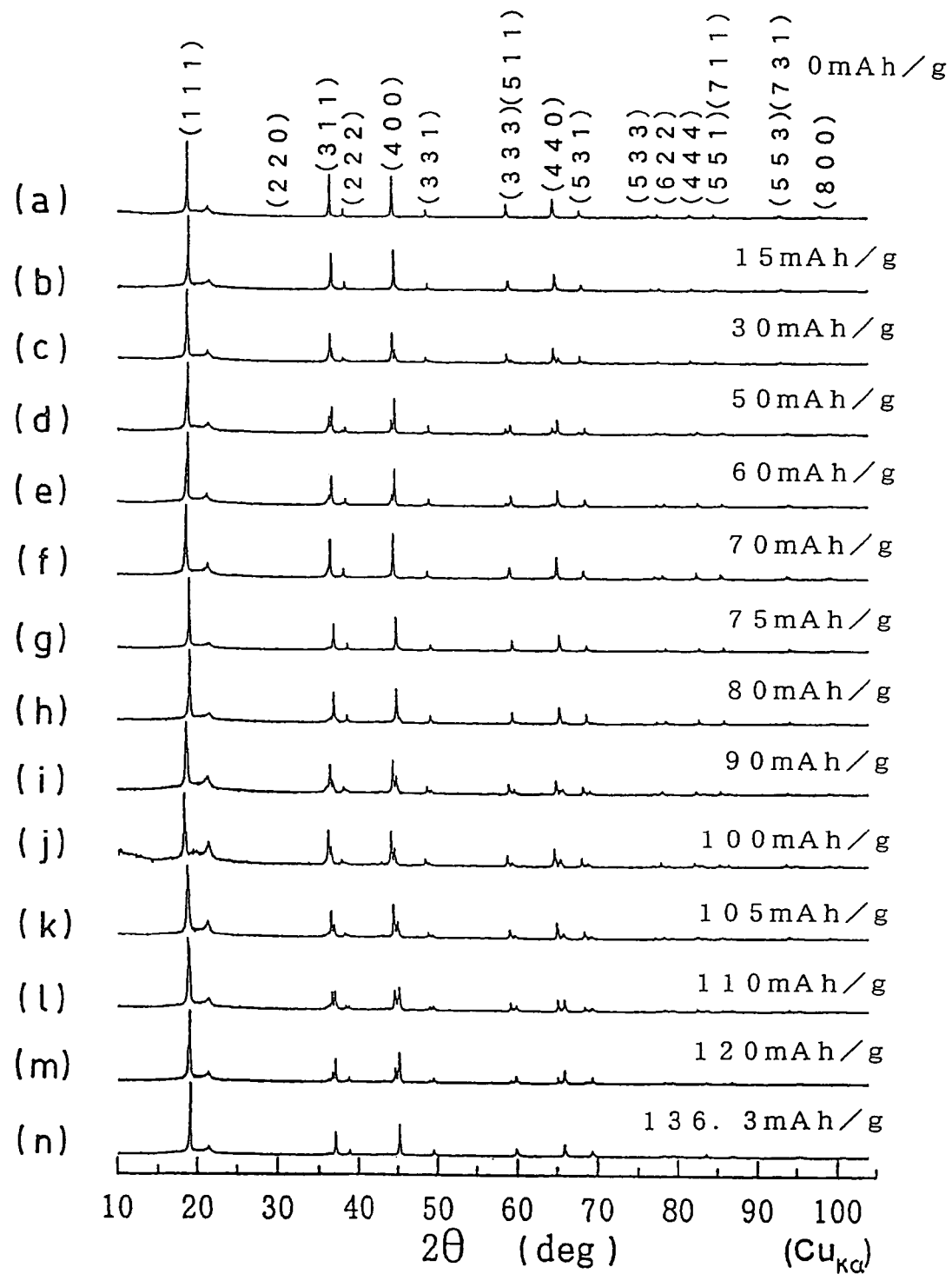
FIG. 15 shows the X-ray diffraction patterns of the positive electrode active material in accordance with the present invention during charging/discharging.

When the charging/discharge of the positive electrode active material proceeds as two-phase reaction, the discharge curve is inherently flat. Accordingly, a positive electrode active material having topotactic two-phases throughout the charging/discharging reaction is preferred. FIG. 15 shows the X-ray diffraction patterns of the positive electrode active material in accordance with the present invention during charging/discharging. In FIG. 15, (a) to (m) represent the case of 15 mAh/g, 30 mAh/g, 50 mAh/g, 60 mAh/g, 70 mAh/g, 75 mAh/g, 80 mAh/g, 90 mAh/g, 100 mAh/g, 105 mAh/g, 110 mAh/g, 120 mAh/g and 136.3 mAh/g. In FIG. 15, splits are observed in the peak changes at (111), (311) and (400), which indicates the fact that topotactic two-phase reactions proceed in the positive electrode active material.

Figure 16:
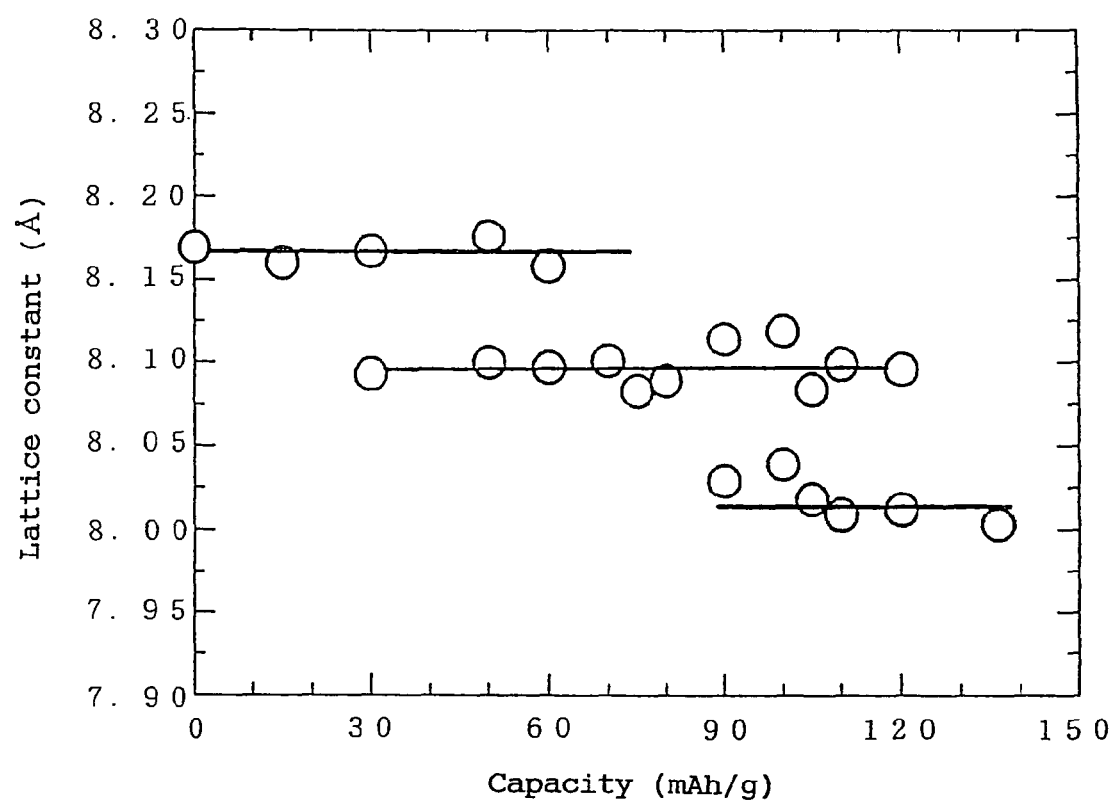
FIG. 16 shows the lattice constant change of a positive electrode active material during charging/discharging.

In order to facilitate the understanding, the change in lattice constant obtained from FIG. 15 when assigned as cubic crystal is shown in FIG. 16. The lattice constant in the portion where two lattice constants exist is calculated assuming that the positive electrode active material has two phases.

FIG. 16 illustrates that the discharge of the positive electrode active material in accordance with the present invention can be divided into the first half and the latter half, and topotactic two-phase reactions proceed in either case. In conventional $LiMn_2O_4$ with a spinel structure, topotactic two-phase reactions proceed in the first half of discharging, but one-phase reactions proceed in the latter half of discharging. Accordingly, topotactic two-phase reactions do not proceed throughout discharging. Unlike the conventional material, in the positive electrode active material in accordance with the present invention, topotactic two-phase reactions proceed throughout discharging to exhibit a flat and extremely good discharge curve.

(6) 3V Level Non-Aqueous Electrolyte Secondary Battery with Oxide Negative Electrode and Detection of Remaining Capacity A description is given on the advantage of a non-aqueous electrolyte secondary battery in which the positive electrode active material in accordance with the present invention is used in the positive electrode and a titanium oxide having a spinel structure is used in the negative electrode. The positive electrode active material in accordance with the present invention has a greater reversible capacity and better polarization characteristics than a conventional 4.5V level spinel-type positive electrode active material.

When $Li_4Ti_5O_{12}$ ($Li[Li_{1/3}Ti_{5/3}]O_4$) is used in the negative electrode, a 3V level battery can be obtained.

Japanese Laid-Open Patent Publication No. 2001-210324 proposes the use of a titanium-based oxide in the negative electrode. However, the publication only discloses in the body thereof a positive electrode active material which shows a positive electrode capacity in the potential range of 4.3 to 3.5 V. This is merely conventional $LiMn_2O_4$ or a positive electrode active material obtained by adding a trace amount of element to $LiMn_2O_4$ with the aim of improving the cycle life etc., which differs clearly from the positive electrode active material of the present invention with a charge/discharge range of 4.7 V. Therefore, the battery system disclosed in Japanese Laid-Open Patent Publication No. 2001-210324 is a 2.5V level battery system.

The battery system in accordance with the present invention, on the other hand, has a practical charge/discharge range of 2.5 to 3.5 V, the same range as currently available 3V level lithium primary batteries. In addition, the battery system in accordance with the present invention can be widely used because only one battery of the present invention is sufficient in devices that requires two dry batteries, and thus is advantageous.

In other words, a battery voltage difference of 0.5 V between the battery systems appears as an advantage or a disadvantage for practical use in the market. The 2.5V level battery system of Japanese Laid-Open Patent Publication No. 2001-210324 does not practically provide a great value. Further, Japanese Laid-Open Patent Publication No. Hei 9-147867 proposes a positive electrode active material with a charge/discharge potential of not less than 4.5 V. It also discloses a battery system in which carbon is used in the negative electrode, and its object is to realize a lithium ion battery with a high voltage of 4.5 V level, which differs from an object of the battery system in accordance with the present invention.

In the positive electrode active material in accordance with the present invention, a voltage difference in the discharge curve at the end of discharging can be freely controlled. This makes it possible to detect the remaining capacity if a battery system is appropriately selected. As previously stated, batteries that exhibit a flat-shaped discharge curve (discharge voltage) are more advantageous to electronic devices. This is, however, a disadvantage from the viewpoint of detection of the remaining capacity. According to the present invention, however, it is possible to design a positive electrode active material with a flat-shaped discharge curve in which a voltage difference can be freely controlled at the end of discharging.

Therefore, it is advantageous to use $Li_4Ti_5O_{12}$ ($Li[Li_{1/3}Ti_{5/3}]O_4$) as a negative electrode active material because the negative electrode preferably has a flat-shaped discharge curve.

The $Li_4Ti_5O_{12}$ ($Li[Li_{1/3}Ti_{5/3}]O_4$) and the positive electrode active material in accordance with the present invention have nearly the same capacity density. Accordingly, it is possible to obtain positive and negative electrode plates having the same thickness by using them in producing a battery. This is also an advantage in terms of battery characteristics. In commercially available battery systems with $LiCoO_2$/graphite or $LiMn_2O_4$/graphite, since the negative electrode has a high capacity density, a great difference occurs in thickness between the positive and negative electrode plates. This difference leads to a difference in diffusion of an electrolyte solution into electrodes. As a result, the rate balance between the positive and negative electrodes is disturbed, and a load is imposed on either of the electrode plates, accelerating the degradation of a battery.

This indicates that it is preferable to produce a battery system by combining the positive electrode active material in accordance with the present invention and $Li_4Ti_5O_{12}$ ($Li[Li_{1/3}Ti_{5/3}]O_4$).

The above-mentioned negative electrode active material exhibits a flat charge/discharge curve of 1.55 V relative to lithium. FIG. 17 shows the charge/discharge behavior of the battery system in which $Li[Ni_{1/2}Mn_{3/2}]O_4$ is used in the positive electrode and $Li[Li_{1/3}Ti_{5/3}]O_4$ is used in the negative electrode. FIG. 18 shows the cycle life of the battery system until 200 cycles. In FIG. 17, the horizontal axis represents discharge capacity of the positive electrode active material per unit weight. The charge/discharge was performed under the conditions of a current density of 0.17 $mA/cm^2$ and a constant current charge discharge of between 0 to 3.5 V.

As is apparent from FIG. 17, the battery system in accordance with the present invention exhibits a flat charge/discharge voltage with an average voltage of about 3.2 V as well as a voltage difference at the end of discharging. By using this voltage difference, it is possible to realize the display function that displays an accurate remaining capacity or the power off alarm function. This battery system has a usable charge/discharge range of 2.5 to 3.5 V, which is the same as that of 3V level lithium primary batteries.

Figure 19:
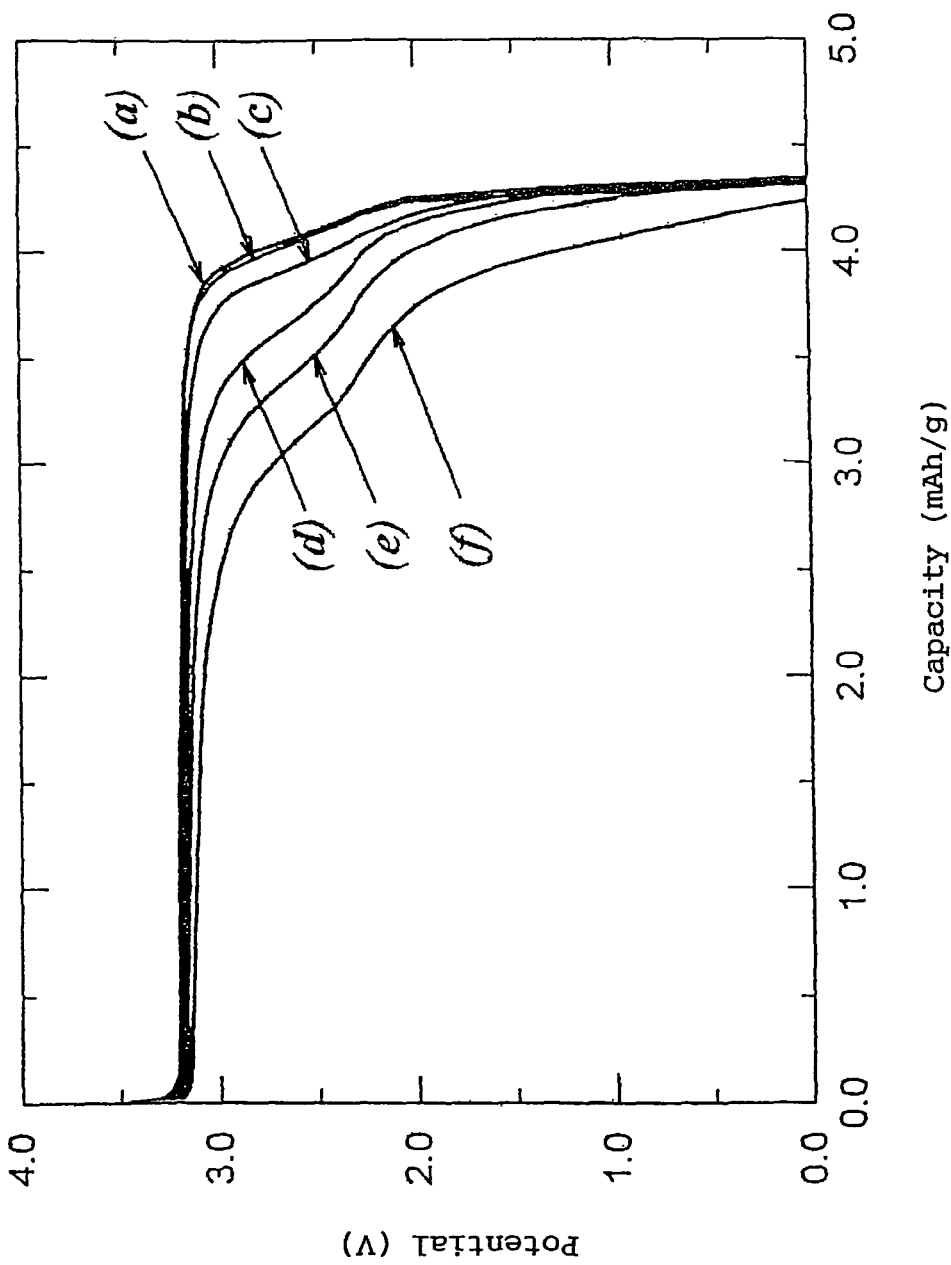
FIG. 19 shows the rate capability of a battery system with load in accordance with the present invention.

FIG. 19 shows the rate capability of this battery system with load. In FIG. 19, (a) to (f) respectively represent discharge behaviors at a current density of 0.1 $MA/cm^2$, 0.17 $mA/cm^2$, 0.33 $mA/cm^2$, 0.67 $mA/cm^2$, 1.0 $mA/cm^2$ and 1.67 $mA/cm^2$. Also from FIG. 19, it can be observed that the difference clearly appears in the discharge voltage although the load is significantly changed.

Figure 20:
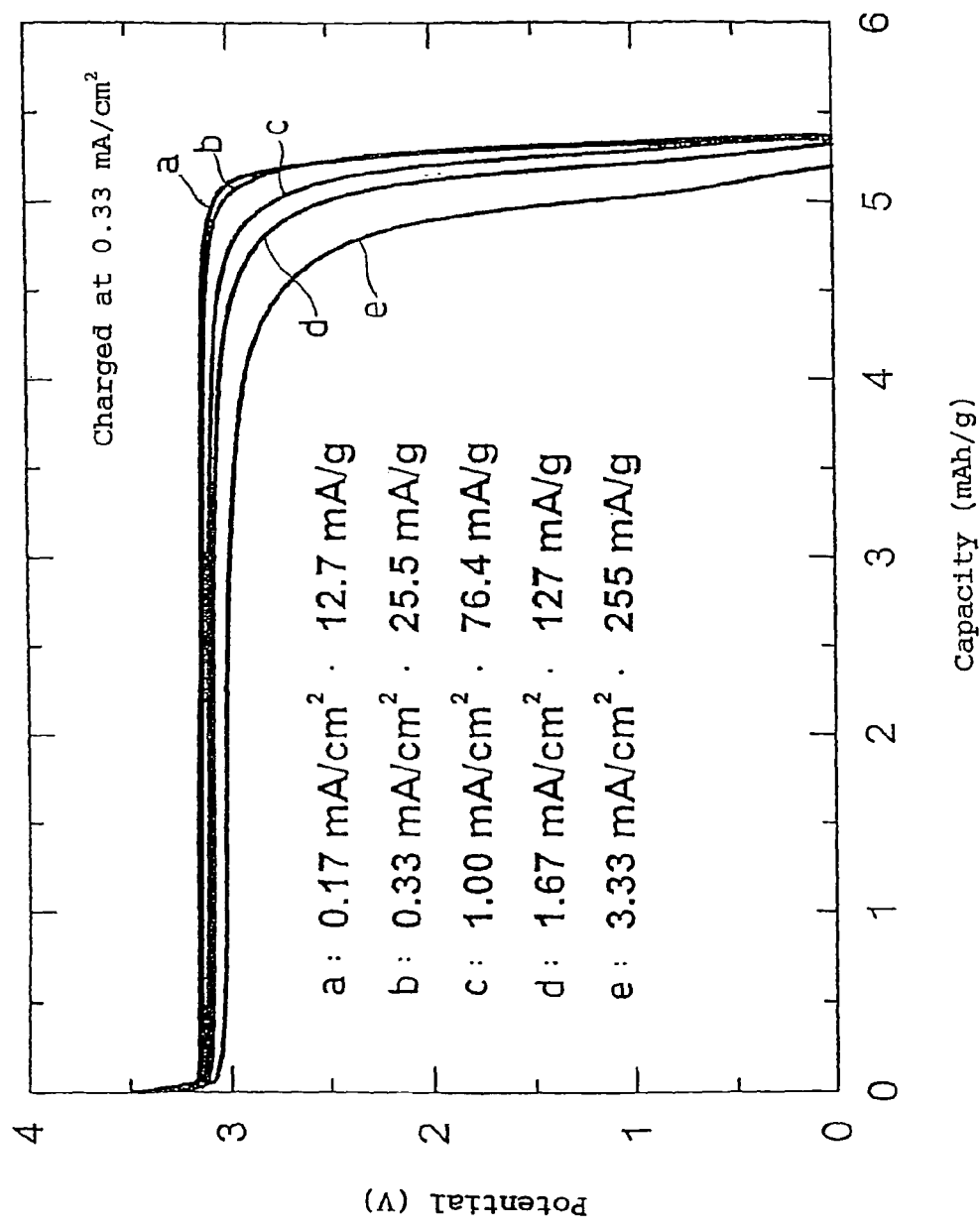
FIG. 20 shows the high rate discharge characteristics (without a difference) of a battery system in accordance with the present invention.

Contrary to the above, it is also possible to prevent this difference from appearing. FIG. 20 shows an example thereof. It is apparent that any clear difference did not appear even after the load was increased. The positive electrode active material used here was prepared by the first baking at 1000° C. and the second baking (reoxidation) at 700° C. Additionally, (a) to (e) in FIG. 20 respectively represent discharge behaviors at a current density of 0.17 $mA/cm^2$, 0.33 $mA/cm^2$, 1.0 $mA/cm^2$, 1.67 $mA/cm^2$ and 3.33 $mA/cm^2$.

The above-described negative electrode active material is a zero-strain insertion material that does not expand or contract during charging/discharging whereas graphite greatly expands and contracts during charging/discharging. The positive electrode active material in accordance with the present invention also does not greatly expand or contract during charging/discharging. By using this combination, it is possible to design a battery system in which the expansion and contraction does not practically occur. Accordingly, the degradation in cycle life, rate characteristics and temperature characteristics resulting from the degradation of active materials and the leakage of electrolyte solution outside the battery system due to the expansion and contraction is significantly improved.

Figure 21:
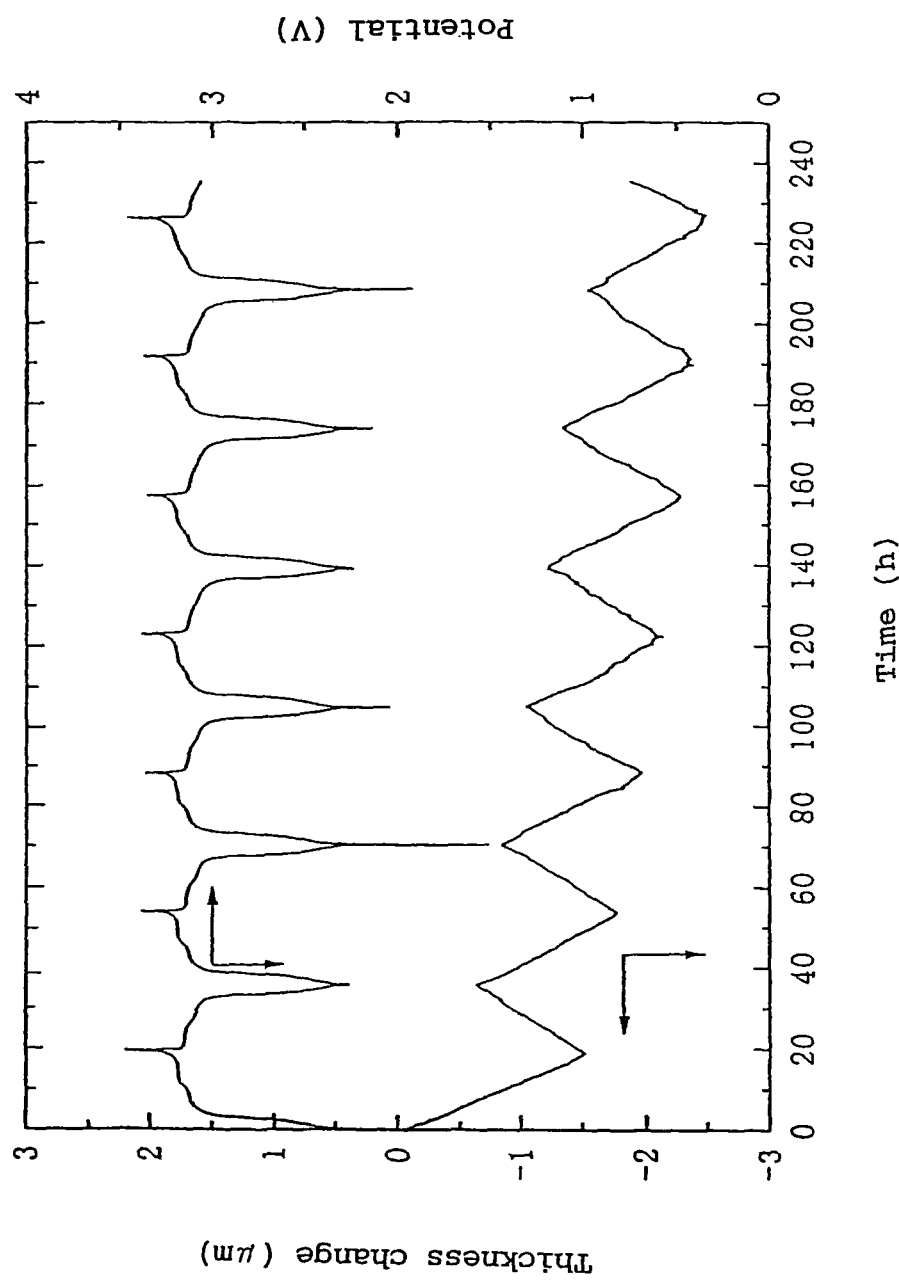
FIG. 21 shows the expansion and contraction during charging/discharging measured by a dilatometer.

FIG. 21 shows the expansion and contraction during charging/discharging measured by a dilatometer. The positive and negative electrode plates respectively had a thickness of 60 μm and 110 μm, and the thickness change of one stack obtained from the combination of one positive electrode plate and one negative electrode plate was measured.

FIG. 21 indicates that the measurement was performed with high precision because the expansion and contraction appear in response to charging/discharging. The difference thereof is about 1 μm, which only accounts for 0.6% of the battery. Since it is well known that $Li[Li_{1/3}Ti_{5/3}]O_4$ of the negative electrode is a material with no distortion that does not expand or contract at all, even if the change in the negative electrode is not taken into consideration, it can be said that only a 2% change occurred in the thickness of the positive electrode active material. When a conventional $LiCoO_2$/graphite type battery is charged, the thickness of the positive electrode expands by about 5% and that of the negative electrode expands by about 20%; therefore, the degree of the expansion and contraction is extraordinarily small in the battery in accordance with the present invention. Such extremely small expansion and contraction during charging/discharging is the main factor for longer cycle life. According to the present invention, the cycle life particularly when the battery is charged and discharged at a high rate is significantly improved, compared to conventional battery systems.

(7) Battery Capacity Design

When the capacity load of the battery is designed, it is necessary to regulate negative or positive electrode-limited capacity of either the positive or negative electrode. The capacity load is intentionally designed according to its application to the devices to be used, the characteristics of the materials to be used or the like. In the 3V level battery system in accordance with the present invention, the capacity of the negative electrode is preferably regulated. Specifically, the ratio (weight) of the negative electrode active material to the positive electrode active material should be set at not less than 0.5 and not greater than 1.2. When the ratio is 1.2, it appears that the positive electrode active material is formally regulated. However, since the theoretical charge/discharge capacity of the negative electrode active material per gram exceeds that of the positive electrode active material per gram, the negative electrode active material is practically regulated.

The following describes the reason why the battery system with regulated negative electrode is more preferred. A positive electrode usually has a potential of about 4.7 V, but, depending on the electrolyte solution to be used, it may have poor oxidation resistance. Accordingly, in terms of stability of electrolyte solution, it is disadvantageous to perform the completion of charging by increasing the potential of a positive electrode. Additionally, it is conceivable that, when lithium elements are completely removed from the positive electrode active material, oxygen is gradually released to cause the degradation of the active materials or the oxidation of the electrolyte solution due to oxygen, leading to the degradation of cycle life and battery characteristics.

(8) Current Collector for Positive and Negative Electrode Plates

Lithium ion secondary batteries currently available typically use a positive electrode current collector made of aluminum and a negative electrode current collector made of copper. They are used from the viewpoint of the potential of each electrode, and because they are superior in corrosion resistance. Japanese Laid-Open Patent Publications No. Hei 9-147867 and No. 2001-210324 explicitly states the use of aluminum and copper as positive and negative electrode current collectors, respectively.

The non-aqueous electrolyte secondary battery in accordance with the present invention preferably uses aluminum or an aluminum alloy in both positive and negative electrodes. The reason is as follows.

First, it is possible to reduce the battery weight as well as the cost by using aluminum instead of copper. In commercially available battery systems with a negative electrode made of graphite, because the potential of graphite is as small as 0.2 V or less relative to that of lithium metal, it was impossible to use aluminum in a current collector. This is because aluminum starts reacting with lithium ions at a higher potential than a potential at which the graphite in the negative electrode charges and discharges. In the battery system in accordance with the present invention, however, the charge/discharge potential of the negative electrode is as high as 1.5 V. This means aluminum, which does not start reacting unless the potential reaches that value or less, can be used. Further, when copper is used and the potential of the negative electrode is increased due to deep discharge or the like, copper ions are leached into the electrolyte solution. The copper ions are deposited on the negative electrode by recharging before the lithium insertion reaction, which inhibits the lithium insertion reaction. As a result, lithium is deposited as metal on the surface of the negative electrode in the form of needle-like crystals. This causes the deterioration of safety of the battery and the degradation of cycle life. The use of aluminum, however, does not cause the leach of metal ions or the redeposition.

When the charger for battery systems having a negative electrode with regulated capacity is out of order, excessive amount of lithium is supplied to the negative electrode by overcharging. In this case, if the negative electrode has a current collector made of copper, excessive amount of lithium is deposited on the negative electrode. Such needle-like crystals of lithium metal deteriorate the safety against overcharging of the battery. Aluminum, however, has sufficient capability of absorbing lithium. Therefore, when aluminum is used for a current collector for the negative electrode, lithium metal can be absorbed into the current collector without allowing the lithium metal to be deposited on the negative electrode during overcharging. As a result, the safety against overcharging of the battery will not be degraded.

(9) Non-Aqueous Electrolyte Solution

The preferred electrolyte solution of the 3V level non-aqueous electrolyte secondary battery in accordance with the present invention is described. An organic solvent to be used as an electrolyte solution possesses a potential window. Potential window is a gauge for oxidation resistance and reduction property, and it can be said that the wider the potential window is, the more stable the organic solvent is. In a typical $LiCoO_2$/graphite type non-aqueous electrolyte secondary battery, oxidation resistance is required until around 4.5 V which is the charge/discharge potential of cobalt and reduction resistance is required until around 0 V which is the charge/discharge potential of graphite (hereinafter, a potential relative to lithium metal is referred to as "potential"). Accordingly, the use of an organic solvent without a potential window that satisfies these requirements has been avoided.

Particularly, in the case of using graphite in the negative electrode to improve the reduction resistance, the use of a lactone type organic solvent has been regarded as difficult. Likewise, the use of propylene carbonate has been regarded as difficult because propylene carbonate is also decomposed during the charging/discharging of graphite. These solvents are less expensive, have a high dielectric constant and therefore are capable of completely dissolving a solute (salt) and superior in oxidation resistance. However, the use thereof is difficult. For the same reason, the use of trimethyl phosphate and triethyl phosphate is difficult although they are effective in extinguishing fire and superior in safety.

In the battery system in accordance with the present invention, all the above-mentioned solvents with useful characteristics can be used. Since the non-aqueous electrolyte secondary battery in accordance with the present invention use $Li_4Ti_5O_{12}$ ($Li[Li_{1/3}Ti_{5/3}]O_4$) in the negative electrode instead of graphite, the potential of the negative electrode is increased up to 1.5 V. Therefore, the reduction resistance which the solvent is required to have is significantly reduced. Due to the charge/discharge typical of graphite, the solvent such as propylene carbonate that is usually decomposed on the surface of the negative electrode can be used as an effective solvent.

Although the potential of the positive electrode is increased up to 4.7 V or more, these solvents can be used without any problem because the oxidation resistance thereof is not less than 5 V. It is considered that solvents superior in oxidation resistance such as sulfolane and methyl diglyme are suitable for the battery system of the present invention. It is also possible to use conventional solvents such as DEC (diethyl carbonate), MEC (methyl ethyl carbonate) and DMC (dimethyl carbonate) as a diluent for a solvent with high viscosity.

Particularly, in the present invention, a solvent containing acetonitrile (AN) is preferred. Because acetonitrile can dissolve a large amount of salt (solute) due to its high dielectric constant and has low viscosity, an electrolyte solution having very high conductivity can be obtained. In an assembled battery composed of a plurality of unit cells, a temperature difference is occured between the unit cells at the outer side and those at the inner side because of heat generation during charge and discharge. Using an electrolyte containing acetonitrile, the influence of the temperature difference will be small because the electrolyte has high conductivity. In other words, even if a temperature difference is occured, it does not seriously affect the charge/discharge behavior of the battery. Consequently, it is possible to maintain overcharge cycle life, in particular, at an appropriate level.

The solute (salt) that can be used in the present invention is not specifically limited, and conventional ones such as $LiPF_6$, $LiBF_4$ and a lithium salt of an organic anion can be used. In a conventional $LiCoO_2$/graphite type non-aqueous electrolyte secondary battery, a solvent mixture prepared by diluting EC (ethylene carbonate) having a high dielectric constant and extremely high viscosity with a solvent with low viscosity has been widely used in order to use graphite or to dissolve a solute (salt). For the reasons provided above, in the battery system in accordance with the present invention, it is possible to select the most suitable electrolyte solution according to the characteristics desired in the devices to be used without any limitation.

(10) Separator

A typical $LiCoO_2$/graphite type battery usually uses a porous film made of polyethylene or propylene as the separator. The separator is fairly expensive because the thin porous film is produced by melt-extruding a polymer material, which is then rolled in two axial directions. The main reason for requiring this film is considered as follows.

The potential of graphite used in the negative electrode is reduced to about the potential at which the lithium metal is deposited. This creates various defects. In some cases, a trace amount of lithium is partly deposited on the graphite surface by rapid charging or charging at a low temperature, and in some cases, cobalt or metal impurities are leached out by an excessive floating charge and deposited on the negative electrode.

In such cases, in the above-mentioned porous film having micropores, needle-like metal deposits can be suppressed by physical force, whereas, in a separator with larger micropores such as non-woven fabric, a micro short-circuit occurs in a short period of time. Further, separators have a shutdown function to suppress the increase of battery temperature at the time of overcharging in order to secure the safety against overcharging in the case where a charger is out of order. The function is to stop the current between electrodes by crushing the micropores of a separator when the temperature reaches a certain temperature (about 135° C.). For the above reason, an expensive porous film has been used in a conventional $LiCoO_2$/graphite type battery.

The negative electrode of the battery system in accordance with the present invention, on the other hand, has a potential of 1.5 V, which is much different from the potential at which lithium is deposited. Accordingly, the problem described above does not occur. Since lithium is absorbed when aluminum is used as a current collector for the negative electrode, such problem as metal deposition does not arise at all. Additionally, the positive electrode active material of the present invention does not contain excessive amount of lithium element like a cobalt type positive electrode active material, and therefore the battery system with the positive electrode active material of the present invention is extremely superior. In other words, it is not required to have the shutdown function with high precision that porous films have. For these reasons, in the battery system of the present invention, it is possible to use a non-woven fabric by preferably using a current collector for the negative electrode made of aluminum or an aluminum alloy.

Since a non-woven fabric is capable of retaining a large amount of electrolyte, rate characteristics, particularly pulse characteristics, can be greatly improved. In addition, unlike porous films, an advanced and complicated process is not necessary, so that a vast choice of separator materials can be obtained and the cost can be made lower. Considering its application to the battery system of the present invention, it is preferable to use, for example, polyethylene, polypropylene, polybutylene terephthalate and mixtures thereof as materials for the separator. Polyethylene and polypropylene are stable to electrolyte. In the case where the strength is required at high temperatures, polybutylene terphthalate is preferred. The preferred fiber diameter is about 1 to 3 μm. The nonwoven fabric whose fibers are partly joined by a calendarrolling technique is effective in reducing the thickness or increasing the strength.

(11) Non-Aqueous Electrolyte Secondary Battery

The following describes other constituent materials that can be used in producing a non-aqueous electrolyte solution (lithium) secondary battery including the positive electrode active material of the present invention.

As a conductive material in the positive electrode active material mixture used for producing the positive electrode in the present invention, any electron conductive material can be used without any limitation as far as it does not cause any chemical change in the produced battery. Examples thereof include graphites such as natural graphite (flake graphite and the like) and artificial graphite; carbon blacks such as acetylene black, ketjen black, channel black, furnace black, lamp black and thermal black; electroconductive fibers such as carbon fiber and metal fiber; carbon fluoride; powdered metals such as copper, nickel, aluminum and silver; electroconductive whiskers such as zinc oxide whisker and potassium titanate whisker; electroconductive metal oxides such as titanium oxide; and conductive organic materials such as polyphenylene derivative. They may be used singly or in any arbitrary combination thereof within the scope that does not impair the effect of the present invention.

Among them, particularly preferred are artificial graphite, acetylene black and powdered nickel. The amount of the conductive material is not specifically limited, but preferred amount is 1 to 50 wt %, and more preferred is 1 to 30 wt %. In the case where carbon or graphite is used, the preferred amount is 2 to 15 wt %.

The preferred binder to be used in the positive electrode material mixture of the present invention is a polymer with a decomposition temperature of 300° C. or more. Examples thereof include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethylvinylether-tetrafluoroethylene copolymer. They may be used singly or in any arbitrary combination thereof within the scope that does not impair the effect of the present invention.

Among them, particularly preferred are polyvinylidene fluoride (PVDF) and polytetrafluoroethylene (PTFE).

As a current collector for the positive electrode, any electronic conductor can be used without any limitation as far as it does not cause any chemical change in the produced battery. The materials used for the current collector include, for example, stainless steel, nickel, aluminum, titanium, various alloys, various carbons, and complexes comprising aluminum or stainless steel with the surface treated with carbon, nickel, titanium or silver.

Particularly, aluminum or an aluminum alloy is preferred. The surface of these materials may be oxidized. The surface of the current collector may be roughened to have concave and convex shape by surface treatment. The form thereof may be any form that is used in the field of batteries. There are, for example, a foil, a film, a sheet, a net, a punched sheet, a lath, a porous sheet, a foam, a molded article formed by fiber bundle and non-woven fabric. The thickness is not specifically limited, but preferably 1 to 500 μm.

As a negative electrode active material (negative electrode material) that can be used in the present invention, a titanium oxide such as $Li_4Ti_5O_{12}(Li[Li_{1/3}Ti_{5/3}]O_4)$ is particularly preferred. By using this negative electrode, it is possible to obtain a 3V level battery, to solve conventional problems and to greatly improve the battery performance as described above. On the other hand, it is also possible to use the positive electrode active material in accordance with the present invention alone. In this case, the following negative electrode can be used.

As a material for the negative electrode, any material capable of absorbing and desorbing lithium ions can be used such as lithium, a lithium alloy, an alloy, an intermetallic compound, a carbonaceous material, an organic compound, inorganic compound, a metal complex and an organic polymer compound. They may be used singly or in any arbitrary combination threreof within the scope that does not impair the effect of the present invention.

Examples of the lithium alloy include a Li—Al based alloy, a Li—Al—Mn based alloy, a Li—Al—Mg based alloy, a Li—Al—Sn based alloy, a Li—Al—In based alloy, a Li—Al—Cd based alloy, a Li—Al—Te based alloy, a Li—Ga based alloy, a Li—Cd based alloy, a Li—In based alloy, a Li—Pb based alloy, a Li—Bi based alloy and Li—Mg based alloy. In this case, the amount of lithium is preferably not less than 10 wt %.

Examples of the alloy and the intermetallic compound include a compound comprising a transition metal and silicon, a compound comprising a transition metal and tin, etc. Particularly, a compound comprising nickel and silicon is preferred.

Examples of the carbonaceous material include coke, pyrolytic carbon, natural graphite, artificial graphite, mesocarbon microbeads, graphite mesophase particles, gas phase growth carbon, virtified carbons, carbon fiber (polyacrylonitrile fiber, pitch fiber, cellulous fiber, gas phase grown carbon fiber), amorphous carbon and carbons obtained by baking organic materials. They may be used singly or in any arbitrary combination thereof within the scope that does not impair the effect of the present invention. Among them, preferred are graphite materials such as graphite mesophase particles, natural graphite and artificial graphite.

The carbonaceous material may contain, besides carbon, a different compound such as O, B, P, N, S, SiC and $B_4C$. The amount thereof is preferably 0 to 10 wt %.

As the inorganic compound, there are, for example, a tin compound and a silicon compound. As the inorganic oxide, there are, other than a titanium oxide mentioned above, a tungsten oxide, a molybdenum oxide, a niobium oxide, a vanadium oxide, an iron oxide, etc.

As the inorganic chalccogenide, there can be used, for example, iron sulfide, molybdenum sulfide and titanium sulfide.

As the organic polymer compound, there are, for example, polythiophene and polyacethylene. As the nitride, there are, for example, cobalt nitride, copper nitride, nickel nitride, iron nitride, manganese nitride, etc.

These negative electrode materials may be combined such as carbon and an alloy, or carbon and an inorganic compound.

The carbonaceous material used in the present invention preferably has a mean particle size of 0.1 to 60 μm, more preferably 0.5 to 30 μm. The preferred specific surface area is 1 to 10 $m^2$/g. Further, graphite with a distance between carbon hexagonal planes (d002) of 3.35 to 3.40 Å and a size of crystallites in c-axis direction (LC) of not less than 100 Å in the crystal structure there of is preferred.

In the present invention, a negative electrode material containing no Li (carbon or the like) can be used since the positive electrode active material contains Li. Such negative electrode material containing no Li may contain a trace amount of Li (about 0.01 to 10 parts by weight of 100 parts by weight of negative electrode material) because even if part of Li becomes inactive as a result of its reaction with the electrolyte, Li can be supplied from the negative electrode material.

In order to incorporate Li into the negative electrode active material as described above, for example, heated or melted lithium metal may be applied on the current collector with the negative electrode material attached thereon to impregnate the negative electrode material with Li, or Li may be electrochemically doped to the negative electrode material in the electrolyte solution by previously adding (pressure welding or the like) lithium metal to the electrode group.

As the conductive material in the negative electrode material mixture, similar to the conductive material in the positive electrode material mixture, any electronic conductive material can be used without any limitation as far as it does not cause any chemical change in the produced battery. In the case of using a carbonaceous material in the negative electrode material, the negative electrode material mixture may not contain the conductive material because the carbonaceous material itself has electron conductivity.

The binder used in the negative electrode material mixture may be a thermoplastic resin or a thermosetting resin, and preferred is a polymer with a decomposition temperature of 300° C. or higher. Examples include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Styrene-butadiene rubber, polyvinylidene fluoride, styrene-butadiene rubber and the like can also be used.

When a titanium oxide such as $Li_4Ti_5O_{12}$ ($Li[Li_{1/3}Ti_{5/3}]O_4$) is used as the negative electrode active material, the current collector for the negative electrode is preferably made of aluminum or an aluminum alloy for the previously-mentioned reason.

When a negative electrode active material other than the above is used, the following can be used. Any electronic conductor can be used without any limitation as far as it does not cause any chemical change in the produced battery. As materials constituting the current collector, there are used stainless steel; nickel; copper; titanium; carbon; copper or stainless steel with the surface treated with carbon, nickel, titanium, or silver; and an Al—Cd alloy, for example. Particularly, copper or a copper alloy is preferred. The surface of these materials may be oxidized. The surface of the current collector may be roughened by surface treatment. As the form of the negative electrode current collector, similar to the case of the positive electrode, there are used, for example, a foil, a film, a sheet, a net, a punched sheet, a lath, a porous sheet, a foam and a molded article formed by fiber bundle. The thickness is not specifically limited, but the one with a thickness of 1 to 500 µm is preferably used.

The electrode material mixture may contain a filler, a dispersing agent, an ion conducting material, a pressure reinforcing agent and other various additives, other than the conductive material and the binder. The filler may be any fibrous material as long as it does not cause any chemical change. Typically used are an olefin polymer fiber such as polypropylene and polyethylene, a glass fiber and a carbon fiber. The amount of the filler is not specifically limited, but preferred is 0 to 30 wt %.

The positive and negative electrodes used in the present invention may have, in addition to the material mixture layer containing the positive electrode active material or the negative electrode material, a base coat layer for enhancing the adhesion between the current collector and the material mixture layer, the conductivity, the cycle characteristics and the charge/discharge efficiency, and a protective layer for mechanically and chemically protecting the material mixture layer. The base coat layer and the protective layer may contain a binder, conductive particles or non-conductive particles.

As the separator, a non-woven fabric is particularly preferred as previously mentioned when a titanium oxide such as $Li_4Ti_5O_{12}$($Li[Li_{1/3}Ti_{5/3}]O_4$) is used in the negative electrode active material. When a negative electrode active material other than the above is used, the following can be used. An insulating microporous thin film with high ion permeability and a certain mechanical strength can be used. The film preferably has the function of closing the pores and increasing the resistance at a temperature of 80° C. or higher. From the viewpoint of the resistance to an organic solvent and hydrophobicity, there is used a sheet or a non-woven fabric made of polypropylene, polyethylene, an olefin polymer prepared by combining the above, or glass fiber.

The separator preferably has a pore size that does not allow the active material, the binder and the conductive material separated from the electrode sheet to pass, preferably 0.1 to 1 µm. The thickness of the separator is usually 10 to 300 µm. The porosity is determined in accordance with the permeability of electrons or ions, the materials to be used and the film thickness; it is preferably 30 to 80° C. The use of a flame retardant or incombustible material such as glass or a metal oxide film further improves safety of the battery.

As the non-aqueous electrolyte solution that can be used in the present invention, the electrolyte solution previously described is particularly preferred when a titanium oxide such as $Li_4Ti_5O_{12}$($Li[Li_{1/3}Ti_{5/3}]O_4$) is used in the negative electrode active material. When a negative electrode active material other than the above is used, the following electrolyte solution can be used.

The electrolyte solution is made of a solvent and a lithium salt dissolved in the solvent. The preferred solvent is single ester or an ester mixture. Particularly preferred are cyclic carbonates, cyclic carboxylic acid esters, non-cyclic carbonates and aliphatic carboxylic acid esters. More preferred are solvent mixtures containing cyclic carbonates and non-cyclic carbonates, solvent mixtures containing cyclic carboxylic acid esters, solvent mixtures containing cyclic carboxylic acid esters and cyclic carbonates.

Examples of the above-mentioned solvent and other solvent that can be used in the present invention are given below.

As the ester to be used as the non-aqueous solvent, there are, for example, cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

As the cyclic carbonate, EC, PC, VC and the like are particularly preferred. As the cyclic carboxylic acid ester, GBL and the like are particularly preferred. As the non-cyclic carbonate, DMC, DEC, EMC and the like are preferred. Optionally, aliphatic carboxylic acid esters may also be used. The amount of the aliphatic carboxylic acid ester is preferably 30% or less of the total weight of the solvent, and more preferably 20% or less.

The solvent of the electrolyte solution of the present invention may contain a well-known aprotic organic solvent, in addition to the above ester in an amount of 80% or more.

As the lithium salt dissolved in the solvent, for example, there are $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte solution alone or in any combination thereof within the scope that does not impair the effect of the present invention. Among them, it is particularly preferable to add $LiPF_6$.

For the non-aqueous electrolyte solution used in the present invention, an electrolyte solution containing at least ethylene carbonate and ethyl methyl carbonate, and $LiPF_6$ as a lithium salt, or as mentioned previously, an electrolyte solution containing at least acetonitrile and $LiBF_4$ or $LiPF_6$ as a lithium salt, is particularly preferable. An electrolyte solution containing GBL as the main solvent is also preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte solution used in the battery is not particularly specified, but a suitable amount should be used according to the amounts of the positive electrode active material and the negative electrode material and the size of the battery. The amount of the lithium salt to be dissolved in the non-aqueous solvent is not particularly specified, but preferred amount is 0.2 to 2 mol/l, and more preferably from 0.5 to 1.5 mol/l.

This electrolyte solution is usually impregnated or filled into the separator comprising, for example, a porous polymer, glass filter, or non-woven fabric before use. In order to make the electrolyte solution nonflammable, a halogen-containing solvent such as carbon tetrachloride or chlorotrifluoroethylene may be added into the electrolyte solution. Also, a carbon dioxide gas may be added into the electrolyte solution in order to confer suitability for high temperature storage.

Instead of the liquid electrolyte, the following solid electrolyte can also be used. The solid electrolyte is classified into inorganic and organic solid electrolytes.

As the inorganic solid electrolyte, nitrides of Li, halides of Li, and oxysalt of Li are well known. Among them, $Li_4SiO_4$, $Li_4SiO_4$—$LiI$—$LiOH$, $xLi_3PO_4$—$(1-x)Li_4SiO_4$, $Li_2SiS_3$, $Li_3PO_4$—$Li_2S$—$SiS_2$ and phosphorus sulfide compound are effectively used.

As the organic solid electrolyte, polymer materials such as polyethylene oxide, polypropylene oxide, polyphosphazone, polyaziridine, polyethylene sulfide, polyvinyl alcohol, polyvinylidene fluoride, polyhexafluoropropylene, and their derivatives, their mixtures and their complexes are effectively used.

It is also possible to use a gel electrolyte prepared by impregnating the organic solid electrolyte with the above non-aqueous liquid electrolyte. As the organic solid electrolyte, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and their derivatives, their mixtures and their complexes, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button type battery, the positive electrode active material mixture and negative electrode active material mixture are compressed into the shape of a pellet for use. The thickness and diameter of the pellet may be determined according to the size of the battery.

In the case of a sheet, cylindrical or rectangular type battery, the material mixture containing the positive electrode active material or the negative electrode material is usually applied (for coating) onto the current collector, and dried and compressed for use. A well-known applying method can be used such as a reverse roll method, direct roll method, blade method, knife method, extrusion method, curtain method, gravure method, bar method, casting method, dip method, and squeeze method. Among them, the blade method, knife method, and extrusion method are preferred.

The application is conducted preferably at a rate of from 0.1 to 100 m/min. By selecting the appropriate applying method according to the solution properties and drying characteristics of the mixture, an applied layer with good surface condition can be obtained. The application of the material mixture to the current collector can be conducted on one side of the current collector, or on the both sides thereof at the same time. The applied layers are preferably formed on both sides of the current collector, and the applied layer on one side may be constructed from a plurality of layers including a mixture layer. The mixture layer contains a binder and an electrically conductive material, in addition to the material responsible for the absorbing and desorbing lithium ions, like the positive electrode active material or negative electrode material. In addition to the mixture layer, a layer containing no active material such as a protective layer, a base coat layer formed on the current collector, and an intermediate layer formed between the mixture layers may be provided. It is preferred that these layers having no active material contain electrically conductive particles, insulating particles, a binder and the like.

The application may be performed continuously or intermittently or in such a manner as to form stripes. The thickness, length, and width of the applied layer is determined according to the size of the battery, but the thickness of one face of the applied layer which is dried and compressed is preferably 1 to 2000 μm.

As the method for drying or dehydrating the pellet and sheet of the material mixture, any conventional method can be used. In particular, the preferred methods are heated air, vacuum, infrared radiation, far infrared radiation, electron beam radiation and low humidity air, and they can be used alone or in any combination thereof.

The preferred temperature is in the range of 80 to 350° C., and most preferably 100 to 250° C. The water content of the battery as a whole is preferably 2000 ppm or less, and the water content for the positive electrode material mixture, negative electrode material mixture and electrolyte is preferably 500 ppm or less in view of the cycle characteristics.

For the sheet pressing method, any conventional method can be used, but a mold pressing method or a calender pressing method is particularly preferred. The pressure for use is not particularly specified, but from 0.2 to 3 t/cm$^2$ is preferable. In the case of the calender pressing method, a press speed is preferably from 0.1 to 50 m/min.

The pressing temperature is preferably from room temperature to 200° C. The ratio of the width of the positive electrode sheet to that of the negative electrode sheet is preferably 0.9 to 1.1, and more preferably 0.95 to 1.0.

The content ratio of the negative electrode active material to the positive electrode material is preferably set to the previously-described ratio from the viewpoint of regulating the capacity of the negative electrode when the positive electrode of the present invention and a negative electrode made of titanium oxide are used. However, in the case of using the positive electrode active material of the present invention alone, although the ratio cannot be specified because it differs according to the kind of the compound used and the formulation of the mixture, those skilled in the art would set an optimum value considering the capacity, cycle characteristics and safety.

The wound electrode structure in the present invention is not required to be a true cylindrical shape. It may be in any shape such as an elliptic cylinder whose cross section is an ellipse or a rectangular column having a prismatic shape or a rectangular face.

In the following, the present invention is described using representative examples, but it is to be understood that the present invention is not limited to them.

EXPERIMENT 1

Three different types of positive electrode active material samples were prepared under the synthesis conditions shown in the above section (3). A mixture obtained by thoroughly mixing $[Ni_{1/4}Mn_{3/4}](OH)_2$ obtained through a eutectic reaction and $LiOH \cdot H_2O$ was formed into pellets, which was then baked to give a positive electrode active material. Accordingly, the composition of the obtained positive electrode active material was $Li[Ni_{1/2}Mn_{3/2}]O_4$. The amount of oxygen was changed according to the synthesis condition. The electrochemical analysis of the obtained positive electrode active materials was performed in the manner shown in the above section (1).

(i) Production Example 1

The ambient temperature was increased from room temperature to 1000° C. for about 3 hours, maintained at 1000° C. for 12 hours and then decreased from 1000° C. to room temperature for 2 hours.

(ii) Production Example 1

The ambient temperature was increased from room temperature to 1000° C. for about 3 hours, maintained at 1000° C. for 12 hours, decreased from 1000° C. to 700° C. for 30 minutes, maintained at 700° C. for 48 hours and then decreased from 700° C. to room temperature for 1.5 hours.

(iii) Production Example 1

The ambient temperature was increased from room temperature to 1000° C. for about 3 hours, maintained at 1000° C. for 12 hours and rapidly cooled from 1000° C. to room temperature. Then, the ambient temperature was increased to 700° C. for about 1 hour, maintained at 700° C. for 48 hours and decreased from 700° C. to room temperature for 1.5 hours.

Figure 22:
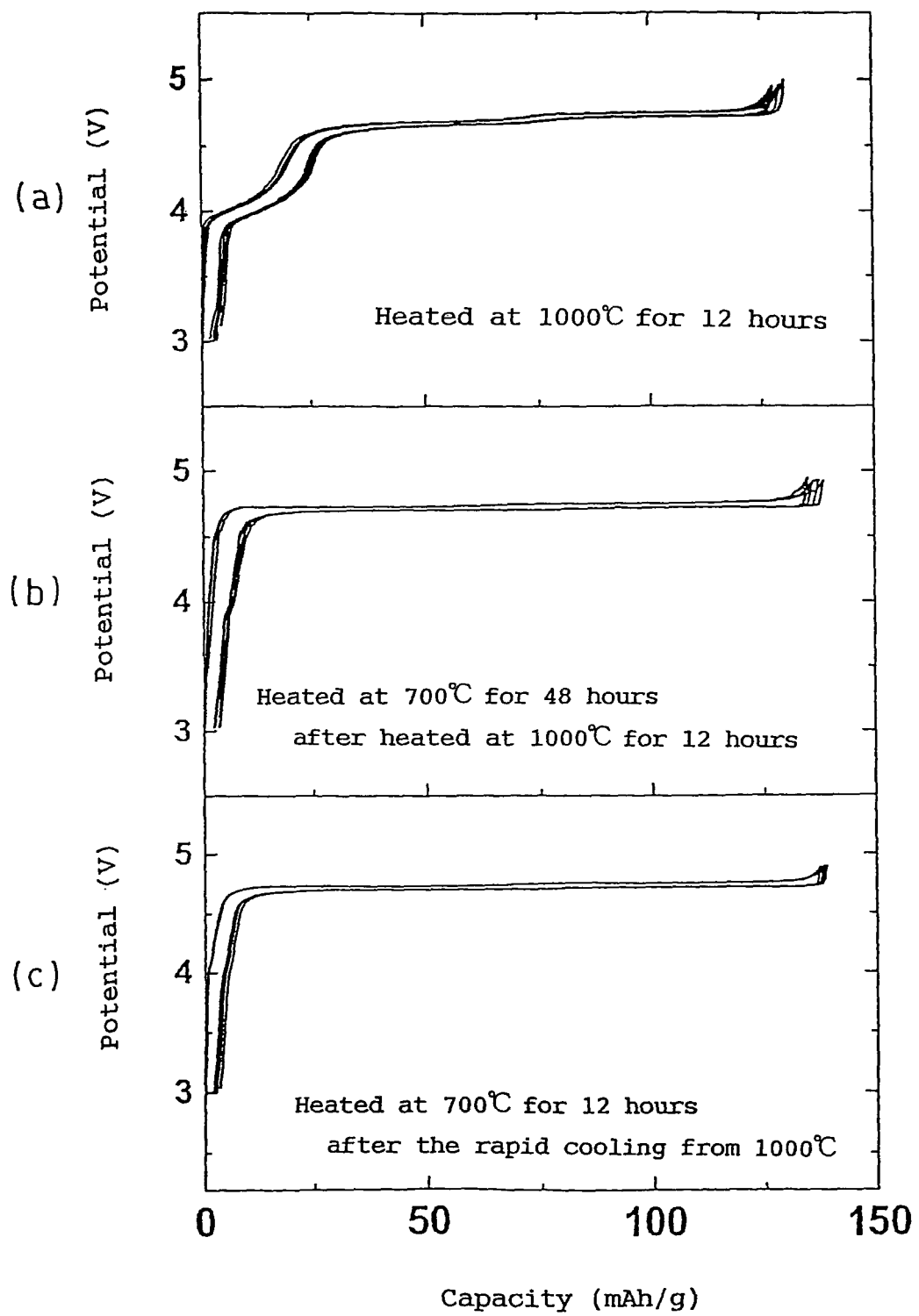
FIG. 22 shows the electrochemical behaviors of the positive electrode active materials in accordance with the present invention produced through a rapid cooling.

The electrochemical behaviors of the positive electrode active materials obtained in Production Examples 1 to 3 are shown as (a) to (c) in FIG. 22. Form FIG. 22, it is understood that all of the positive electrode active materials show small polarization and a flat charge/discharge curve. The positive electrode active material (a) of Production Example 1 exhibits a voltage difference at the end of discharging, which can be utilized for the detection of the remaining capacity. The difference is as small as only several V, so that the effective detection of remaining capacity can be achieved without the occurrence of a power-down due to lack of energy when it is used in a device. The positive electrode active material (b) obtained through the reoxidation at 700° C. does not show the difference. This shows that the voltage difference at the end of discharging can be freely controlled in this range by controlling the temperature and time of the reoxidation process. Similarly, the positive electrode active material (c) obtained through the rapid cooling process first and then the reoxidation process does not show the difference. This shows that a material with enhanced polarization and flatness can be obtained by controlling particles as previously stated in the rapid cooling process. Additionally, high density filling can be achieved.

The foregoing showed the case of using the combination of Ni and Mn. Here, the discharge capacity in the case of using transition metals shown in Table 1 was measured. The baking was performed under the same conditions as in Production Example 3 described above. The ratio of Mn to other transition metal was the same as 3:1. The discharge capacities obtained from each of the positive electrode active materials are shown in Table 1. Table 1 indicates that positive electrode active materials with similar characteristics were obtained although there were differences in capacity.

The result for the case where the ratio of Mn to other transition metal was 3:1 was the best. When the percentage of a transition metal was above or below the above ratio, the capacity at a high potential decreased.

TABLE 1

| $Li[Me_{1/2}Mn_{3/2}]O_4$ | Capacity (mAh/g) |
| --- | --- |
| Me = Ni | 130 |
| Me = Cr | 128 |
| Me = Co | 120 |
| Me = Fe | 118 |
| Me = Cu | 110 |

EXPERIMENT 2

A 3V level battery was produced using the positive electrode active material in accordance with the present invention in the positive electrode and a negative electrode active material $Li_4Ti_5O_{12}(Li[Li_{1/3}Ti_{5/3}]O_4)$ in the negative electrode. The negative and positive electrode plates were produced in the same manner, using the same compound ratio. As the separator, a 25 μm non-woven fabric made of polybutylene terephthalate was used. The electrode area was set to 3 cm². As the electrolyte, an organic electrolyte solution prepared by dissolving 1 mol of $LiPF_6$ in a solvent mixture of EC and DEC in a ratio of 3:7 was used. The positive electrode active material used here was the one obtained in the above-mentioned Case 3.

Figure 23:
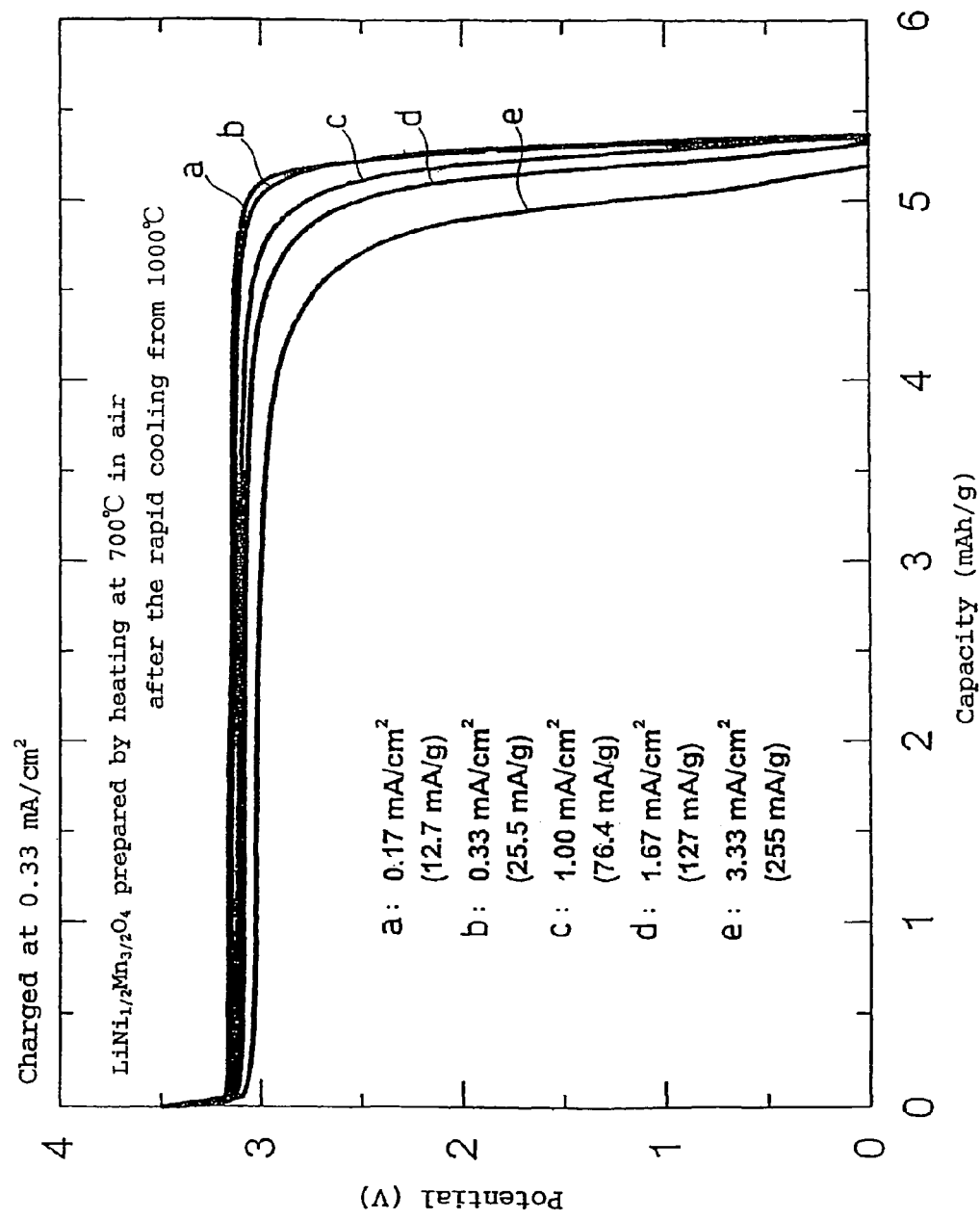
FIG. 23 shows the discharge behavior of a battery system in accordance with the present invention.
Figure 24:
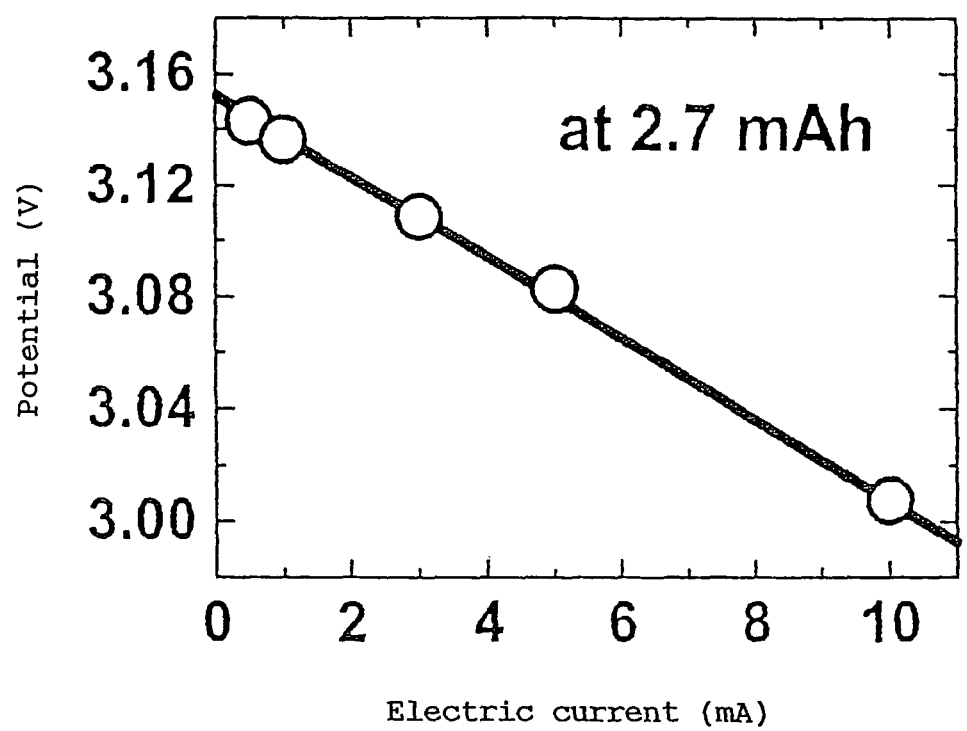
FIG. 24 shows the high rate characteristics of a battery system in accordance with the present invention.

FIG. 23 shows the discharge behavior of this battery system, and FIG. 24 shows the high rate characteristics of the same. FIGS. 23 and 24 illustrate that the battery system of the present invention is a 3V level battery with excellent polarization characteristics. Further, the potential shape is unprecedentedly flat.

Figure 25:
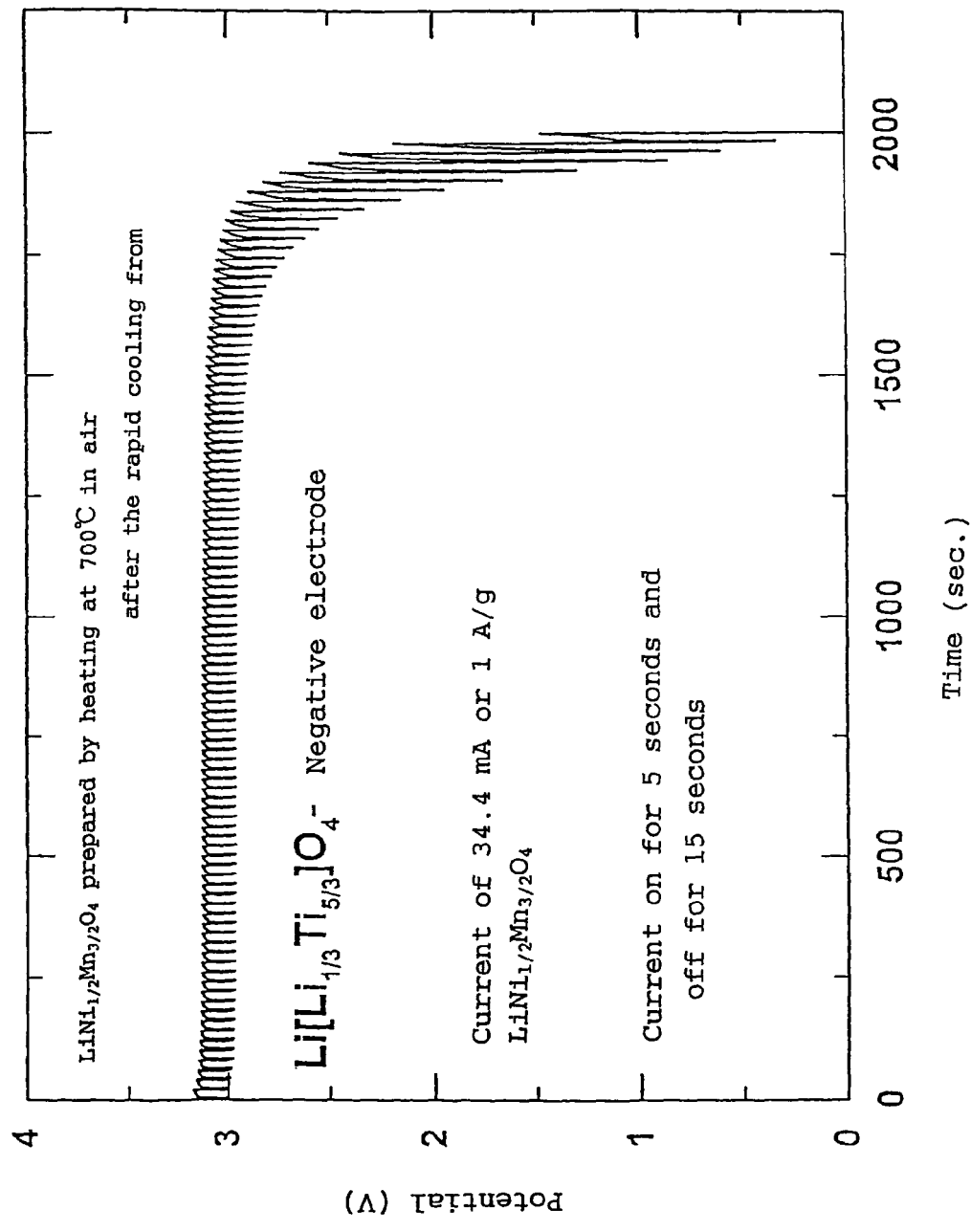
FIG. 25 shows the pulse discharge characteristics of a battery system in accordance with the present invention.

FIG. 25 shows the pulse discharge characteristics. In FIG. 25, the pulse characteristics with the same width can be seen from the start of discharging to almost the end of discharging, which is clearly different from the conventional battery which shows gradually increased pulse polarization at the end of discharging. Accordingly, it is surmised that the potential flatness and excellent polarization characteristics like this have resulted from the optimization of the method for synthesizing the positive electrode active material and the realization of topotactic two-phase reactions throughout the discharging.

EXPERIMENT 3

Figure 26:
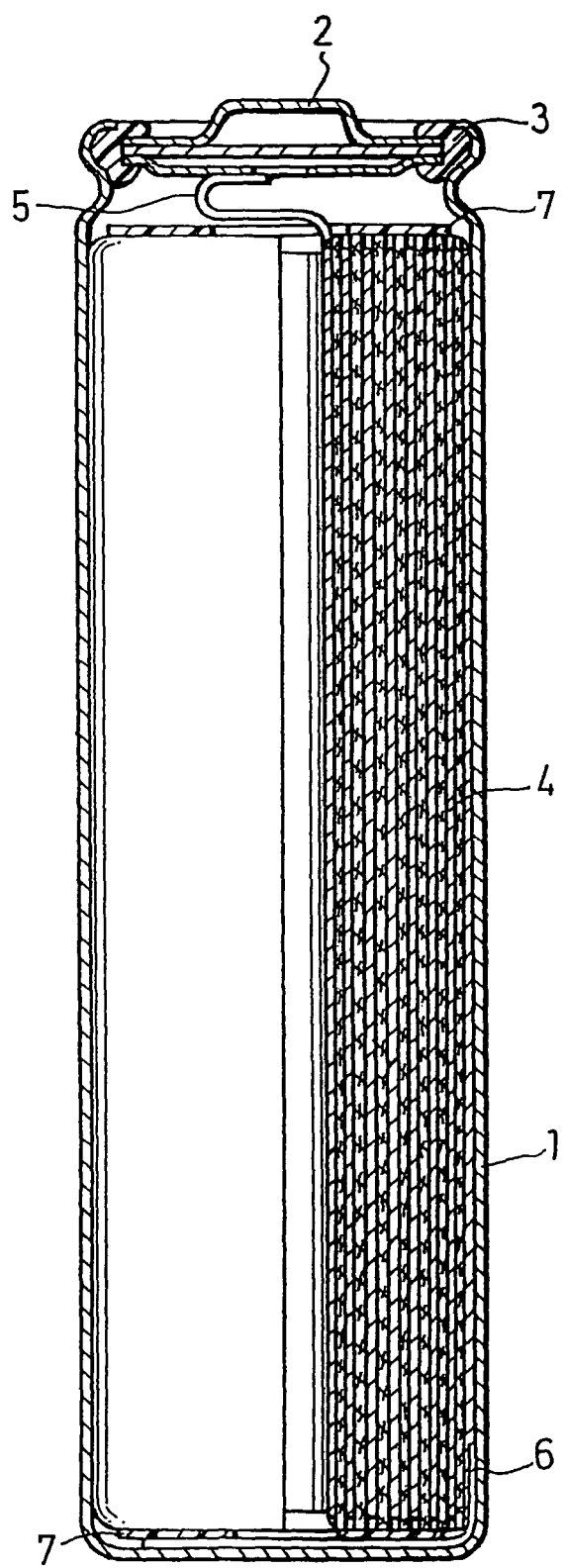
FIG. 26 shows a front view, in vertical cross section, of a cylindrical battery produced in examples of the present invention.

FIG. 26 shows a front view, in vertical cross section, of a cylindrical battery produced in this example. An electrode assembly 4 obtained by spirally winding positive and negative electrode plates with a separator is housed in a battery case 1. A positive electrode lead 5 attached to the positive electrode plate is connected to a sealing plate 2, and a negative electrode lead 6 attached to the negative electrode plate is connected to the bottom of the battery case 1. The battery case and the lead plate can be formed using a metal or alloy with electronic conductivity and chemical resistance to organic electrolyte. For example, a metal such as iron, nickel, titanium, chromium, molybdenum, copper, aluminum, or an alloy made of these metals can be used. In particular, the battery case is preferably made of a stainless steel plate or a processed Al—Mn alloy plate, the positive electrode lead is preferably made of aluminum, and the negative electrode lead is preferably made of nickel or aluminum. It is also possible to use various engineering plastics or the combination of the engineering plastic and a metal for the battery case in order to reduce the weight of the battery.

Insulating rings 7 are respectively provided on both top and bottom of the electrode assembly 4. Subsequently, an electrolyte is charged thereinto, and the battery case is sealed with the sealing plate. Here, the sealing plate can be provided with a safety valve. Instead of the safety valve, it may be provided with a conventional safety device. For instance, as an overcurrent-preventing device, fuse, bimetal, PTC device or the like is used. Besides the safety valve, as a method for preventing the internal pressure of the battery case from increasing, making a notch in the battery case, cracking the gasket or the sealing plate, or cutting the lead plate can be employed. Alternatively, a protective circuit including means for preventing overcharge and overdischarge may be contained in a charger, or may be independently connected to the battery.

As the method for welding the cap, the battery case, the sheet and the lead plate, any well-known method (i.e. AC or DC electric welding, laser welding or ultrasonic welding) can be used. For the sealing agent for sealing, a conventional compound or mixture such as asphalt can be used.

A positive electrode plate was produced as follows. Ten parts by weight of carbon powder as the electrically conductive material and 5 parts by weight of polyvinylidene fluoride resin as the binder were mixed with 85 parts by weight of powdered positive electrode active material of the present invention. The resulting mixture was then dispersed into dehydrated N-methylpyrrolidinone to obtain a slurry, which was then applied on the positive electrode current collector formed from an aluminum foil, followed by drying and pressing, and the foil was cut into the specified size. A negative electrode plate was produced in the same manner as the positive electrode plate was produced except that $Li_4Ti_5O_{12}$ ($Li[Li_{1/3}Ti_{5/3}]O_4$) was used instead of the positive electrode active material.

Styrene-butadiene rubber based binder could also be used. Although a titanium oxide was used as the negative electrode material in the present invention, a negative electrode plate could be produced in the following manner when a carbonaceous material was mainly used. A carbonaceous material and a styrene-butadiene rubber based binder were mixed in a weight ratio of 100:5 to give a mixture and the obtained mixture was applied onto the both faces of a copper foil, which was then dried, rolled and cut into the specified size to give a negative electrode plate.

As the separator, a non-woven fabric or a microporous film made of polyethylene was used.

An organic electrolyte solution was prepared by dissolving $LiPF_6$ in a solvent mixture of ethylene carbonate (EC) and diethyl carbonate in a volume ratio of 3:7 at a concentration of 1.0 mol/l. The obtained cylindrical battery had a diameter of 14.1 mm and a height of 50.0 mm.

The use of the positive electrode active material in accordance with the present invention makes it easier to alarm the remaining capacity. In view of this, the degree of the voltage difference at the end of discharging was adjusted by the reoxidation temperature.

Cylindrical batteries analogous to the above were produced using $Li_4Ti_5O_{12}$ ($Li[Li_{1/3}Ti_{5/3}]O_4$) in the negative electrode except that only the reoxidation (second baking) temperature was changed in the above-mentioned Case 3. These batteries were discharged at 1 C rate until the battery voltage reached 2.7 V, and the remaining capacity at that voltage was measured. Subsequently, the remaining capacity when discharged to 2 V was also measured. Table 2 shows the results. The values are shown in the ratio of the remaining capacity to the whole battery capacity.

The results of Table 2 indicate that, in the battery system of the present invention, the remaining capacity alarm can be easily realized without complicated electronic circuits and calculation. At the same time, it is possible to freely set the timing of the remaining capacity alarm.

TABLE 2

| Reoxidation (second baking) temperature (° C.) | Remaining capacity (mAh/g) |
|---|---|
| 700 | 2.1 |
| 800 | 8.4 |
| 900 | 15.8 |
| 1000 | 17.9 |

EXPERIMENT 4

The capacity design of the positive and negative electrodes was studied. The cycle life of the cylindrical batteries was measured by changing the amount ratio between the positive and negative electrode active materials per unit area. The results are shown in Table 3. Regarding the charge/discharge cycle conditions, the charging was performed at a constant voltage 3.5 V and a constant current with the maximum current of 1 C, which was completed 2 hours after charging. The discharging was performed at a constant current of 2 C until the voltage reached 2.0 V. Table 3 shows the number of cycles until the remaining capacity was reduced to 95% of the initial capacity. Table 3 illustrates that the cycle life decreased when the capacity ratio was 1.2 or more. Accordingly, from the viewpoint of balancing the capacities of the positive and negative electrodes, it is preferred to substantially regulate capacity of the negative electrode. If the amount of the positive electrode material is increased more than necessary, the battery capacity will decrease. Therefore, the capacity ratio is preferably 0.5 to 1.2.

TABLE 3

| Negative electrode active material/Positive electrode active material | Number of cycles until the capacity ratio of 95% (cycles) |
|---|---|
| 0.3 | 280 |
| 0.5 | 302 |
| 0.8 | 305 |
| 1.0 | 299 |
| 1.2 | 290 |
| 1.5 | 260 |

EXPERIMENT 5

This example examined the current collector for the positive and negative electrodes. When graphite is used in the negative electrode, the current collector (core member) is usually made of copper because of potential and the like.

When $Li_4Ti_5O_{12}$ ($Li[Li_{1/3}Ti_{5/3}]O_4$) is used in the negative electrode as previous stated, it is possible to use an aluminum core member. According to the present invention, it was found that this provides the advantage of improving safety other than the reduction in weight and cost. The reason for this is as follows. When the battery is overcharged due to the failure of a charger or the like, lithium metal is deposited on the surface of the negative electrode, which causes a lowering of safety. When $Li_4Ti_5O_{12}$ ($Li[Li_{1/3}Ti_{5/3}]O_4$ is used in the negative electrode, the charge/discharge potential is as high as 1.5 V, much higher than 0 V at which lithium is deposited. However, when copper is used in the core member, lithium metal may be deposited on the surface of the negative electrode. When aluminum is used, on the other hand, the core member absorbs lithium, inhibiting lithium from being deposited in the form of lithium metal. Cylindrical batteries produced using each of the current collectors shown in Table 4 were put through an overcharging test, and the highest temperature of the battery surface at that time was measured. In the overcharging test, the overcharging was performed at a constant current of 1.5 C.

Table 4 indicates that the use of an aluminum core member reduced the battery heating at the time of overcharging. As describe above, it is possible to produce a lightweight and highly safe 3V level battery with low cost by using an aluminum core member in the battery system of the present invention.

TABLE 4

| Material for current collector | Battery surface temperature(° C.) |
|---|---|
| Copper | 45 |
| Aluminum | 81 |

EXPERIMENT 6

In this example, the preferred electrolyte solution for the battery system in accordance with the present invention was examined.

Batteries in which graphite is used in the negative electrode have many limitations regarding the electrolyte. Particularly, the use of a lactone type organic solvent has been regarded as difficult from the viewpoint of reduction resistance. Likewise, the use of propylene carbonate has been regarded as difficult because it is also decomposed during the charging/discharging of graphite. These solvents are advantageous because they are inexpensive, have a high dielectric constant, are capable of completely dissolving a solute (salt) and are superior in oxidation resistance. For the same reason, the use of trimethyl phosphate and tryethyl phosphate has been regarded as difficult. These solvents are effective in extinguishing fire and superior in safety. In the present invention, these useful solvents can be used.

Currently, a conventional electrolyte solution is prepared based on ethylene carbonate (EC) with extremely high viscosity due to the necessity to form a protective film on the surface of graphite and to dissolve a solute (salt). The present invention does not require the EC. Although the battery system of the present invention can exhibit a voltage as high as 3V, the scope of selection of electrolyte solution can be greatly expanded because graphite is not used in the present invention. The preferred electrolyte solutions for the battery system of the present invention is shown in FIG. 5. In FIG. 5, the capacity obtained by changing the electrolyte is indicated in an index where the capacity obtained from the conventional electrolyte system is taken as 100. For comparison, cylindrical batteries were produced in the same manner using lithium cobalt oxide in the positive electrode and a graphite material in the negative electrode. The evaluation results thereof are also shown in the table.

It is to be noted that, the indication "EC/DEC (3/7)" in the row of solvent mixture means a solvent mixture of EC and DEC in a composition ratio of 3:7. The capacity obtained from this electrolyte solution was taken as 100 in each of the battery systems.

Table 5 illustrates that the present invention can use electrolyte systems that was unable to be used before without any problem and provide an inexpensive and highly safe battery whereas the conventional battery systems using graphite did not exhibit a high capacity at all. Further, it is also possible to use a solvent mixture of these solvents or a combination of conventionally used solvents.

TABLE 5

| Composition of solvent mixture | Solute (salt) | Battery system of the present invention | $LiCoO_2$/Graphite type battery |
|---|---|---|---|
| EC/DEC (3/7) | 1 M $LiPF_6$ | 100 | 100 |
| GBL | 1 M $LiBF_4$ | 102 | 10 |
| GVL | 1 M $LiBF_4$ | 101 | 12 |
| PC | 1 M $LiPF_6$ | 102 | 2 |
| Methyl diglyme | 1 M $LiPF_6$ | 100 | 20 |
| MethoxyEMC | 1 M $LiPF_6$ | 100 | 87 |
| Trimethyl phosphate | 1 M $LiPF_6$ | 98 | 18 |
| Triethyl phosphate | 1 M $LiPF_6$ | 97 | 20 |
| Sulfolane | 1 M $LiPF_6$ | 87 | 30 |
| PC/DEC | 1 M $LiPF_6$ | 100 | 13 |
| PC/EMC | 1 M $LiPF_6$ | 100 | 12 |
| GBL/PC | 1 M $LiPF_6$ | 101 | 8 |

EXPERIMENT 7

In this example, the preferred separator for the present invention was examined.

The battery system of the present invention does not require a separator with high functionality such as porous film. The use of a non-woven fabric may decrease the safety against overcharging because the shutdown function is decreased. However, since a non-woven fabric is capable of retaining a larger amount of electrolyte than a porous film, the improvement in pulse characteristics, in particular, can be expected.

Cylindrical batteries in accordance with the present invention were produced in the same manner as above using a non-woven fabric made of different kinds of polymer materials shown in Table 6. Table 6 shows the pulse discharge characteristics and the highest battery surface temperature during overcharging. In the pulse discharge, a simple pulse in which a current of 1 A was on for 5 seconds and off for 5 seconds was performed. The pulse discharge time of the battery using the separator shown in Table 6 is indicated in an index where the pulse discharge time obtained when a conventional PE porous film was used is taken as 100. The overcharging was performed at a constant current of 1.5 C.

Table 6 indicates that, the battery systems in accordance with the present invention can greatly improve the pulse discharge time by using the non-woven fabric while the safety against overcharging analogous to conventional ones is maintained. It is also apparent that the voltage decrease due to pulse current can be enhanced by using the non-woven fabric.

TABLE 6

| Separator Material | Pulse time index | Battery surface temperature (° C.) |
|---|---|---|
| Polyethylene porous film | 100 | 42 |
| Polyethylene non-woven fabric | 178 | 45 |
| Polypropylene non-woven fabric | 180 | 46 |
| Polybutylene terephthalate non-woven fabric | 181 | 50 |

EXPERIMENT 8

In this experiment, five different assembled batteries were produced. Each assembled battery was produced as follows.

Three cylindrical batteries (unit cells) were first produced in the same manner as in Experiment 3 except that one of the non-aqueous electrolytes listed in Table 7 was used. Then, the three unit cells thus produced were connected in series to produce the assembled battery.

Each assembled battery was placed in a thermostatic chamber at 0° C. and cycled (charged and discharged) 100 times under the following conditions with a rest interval of 5 minutes between charge and discharge. Then, the capacity retention rate after 100 cycles was determined.

Because the charge condition for one unit cell was constant voltage of 3.5 V and constant current, that for the assembled battery was constant voltage of 10.5 V and constant current with a maximum current of 2 C. The assembled battery was then maintained at a constant voltage for 12 hours. The discharge was performed with a constant current of 2 C and an end-of-discharge voltage of 2 V.

TABLE 7

| Non-aqueous electrolyte | Capacity retention rate (%) |
|---|---|
| 1 M LiBF$_4$ Acetonitrile (AN) | 99 |
| 1 M LiBF$_4$ Acetonitrile/GBL | 97 |
| 1 M LiBF$_4$ GBL | 83 |
| 1 M LiPF$_6$ PC | 80 |
| 1 M LiBF$_4$ EC/DEC (3/7: volume ratio) | 75 |

Table 7 illustrates the use of the non-aqueous electrolyte comprising a solvent containing acetonitrile can certainly prevent the cycle life (capacity retention rate) from decreasing. The reason is that temperature difference in the assembled battery is suppressed and the battery degradation is reduced resulting from the temperature difference.

Particularly, because, in each of the non-aqueous electrolyte secondary batteries of this experiment, the capacity of the battery is restricted by the capacity of the negative electrode. So the potential of the negative electrode is polarized toward the negative side from 1.5 V during charge. The potential decreases rapidly when charged over full charge (overcharge), and this decrease tends to be more pronounced when the polarization is large. When the potential decreases to 1.0 V or lower, a side reaction involving $Li_4Ti_5O_{12}$ contained in the negative electrode starts, which may reduce cycle life.

At this point, because acetonitrile contained in the non-aqueous electrolyte of this experiment has excellent conductivity, the polarization does not become large even in the unit cells disposed at the outer side, so that the degradation of $Li_4Ti_5O_{12}$ can be certainly prevented.

Industrial Applicability

According to the battery system of the present invention, it is possible to greatly improve the balance of the flatness of discharge voltage, the high rate discharge characteristics, the pulse characteristics and the cycle life during the high rate charging/discharging. In the above examples, the secondary battery of the present invention was described on the premise that it would be used for a portable device. However, the present invention is applicable to a power source for electric tools which strongly demand the charging/discharging at a high rate and the cycle life during the high rate charging/discharging, and to a large battery of driving system which can be used as a power source for hybrid cars and electric vehicles.

According to the present invention, an inexpensive nickel-manganese composite oxide which exhibits flat high voltage can be effectively used as a positive electrode active material, and by using a titanium oxide in the negative electrode, it is possible to provide a 3V level non-aqueous secondary battery with excellent high rate characteristics and good cycle life.

Further, according to the present invention, it is possible to achieve a non-aqueous electrolyte secondary battery particularly having excellent overcharge cycle characteristic in the case of being connected in series to form an assembled battery. Because the assembled battery does not have temperature difference.

The invention claimed is:

1. An assembled battery comprising a plurality of non-aqueous electrolyte secondary batteries, each of said non-aqueous secondary batteries comprising a positive electrode containing a positive electrode active material; a negative electrode containing a titanium oxide; a non-aqueous electrolyte and a separator, wherein:
    said positive electrode active material is represented by a composition formula: $Li_{2\pm\alpha}[Me]_4O_{8-x}$, where $0\leq\alpha<0.4$, $0\leq x<2$, and Me is a transition metal containing Mn and at least one selected from the group consisting of Ni, Cr, Fe, Co and Cu, said active material exhibiting topotactic two-phase reactions during charge and discharge,
    said titanium oxide has a spinel structure,
    said positive and negative electrodes have a current collector made of aluminum or an aluminum alloy, said non-aqueous electrolyte is a non-aqueous electrolyte solution containing acetonitrile as a solvent, and
    the capacity of each of said non-aqueous electrolyte secondary batteries is regulated by a capacity of said negative electrode of each of said non-aqueous electrolyte secondary batteries.

2. The assembled battery in accordance with claim 1, wherein said titanium oxide is $Li_4Ti_5O_{12}$.

3. The assembled battery in accordance with claim 1, wherein each of said non-aqueous electrolyte secondary batteries has an operating discharge curve with a potential difference of 0.2 to 0.8 V.

4. The assembled battery in accordance with claim 1, wherein said non-aqueous electrolyte comprises at least one selected from the group consisting of propylene carbonate, γ-butyrolactone, γ-valerolactone, methyl diglyme, sulfolane, trimethyl phosphate triethyl phosphate and methoxymethyl-ethyl carbonate.

5. The assembled battery in accordance with claim 1, wherein said separator is made of non-woven fabric.

6. The assembled battery in accordance with claim 5, wherein said non-woven fabric comprises at least one selected from the group consisting of polyethylene, polypropylene and polybutylene terephthalate.

7. The assembled battery in accordance with claim 1, wherein the weight ratio of said negative electrode active material to said positive electrode active material is not less than 0.5 and not greater than 1.2.

8. The assembled battery in accordance with claim 1, wherein each of said non-aqueous electrolyte secondary batteries has a usable charging/discharging region of 2.5 to 3.5 V and a practical average voltage of 3V level.

9. The assembled battery in accordance with claim 1, wherein, in said positive electrode active material, the phase of the transition metal has a 2×2 superlattice.

10. The assembled battery in accordance with claim 1, wherein, in said positive electrode active material, the ratio between Mn and other transition metal is substantially 3:1.

11. The assembled battery in accordance with claim 1, wherein said positive electrode active material has a spinel-framework-structure and the Li and/or Me exist in the 16(c) site in the space group Fd3m.

12. The assembled battery in accordance with claim 1, wherein said positive electrode active material has a lattice constant attributed to a cubic crystal of not greater than 8.3 Å.

13. The assembled battery in accordance with claim 1, wherein said positive electrode active material comprises a mixture of crystal particles with a particle size of 0.1 to 8 μm and secondary particles of said crystal particles with a particle size of 2 to 30 μm.

14. The assembled battery in accordance with claim 1, wherein said non-aqueous electrolyte secondary batteries are connected in series, in parallel, or in series-parallel.

* * * * *